United States Patent [19]

Sibuya et al.

[11] Patent Number: 5,581,522
[45] Date of Patent: Dec. 3, 1996

[54] LIBRARY APPARATUS HAVING ACCESSOR WITH BAR CODE READER WHICH ROTATES AT A DIFFERENT HORIZONTAL POSITION WHEN READING A BAR CODE FAILED AT A FIRST POSITION

[75] Inventors: Hiroshi Sibuya, Yokohama; Yukio Katsuyama, Kawasaki; Keisuke Hoshino, Kawasaki; Katsumi Inazawa, Kawasaki, all of Japan

[73] Assignee: Fujitsu Limited, Japan

[21] Appl. No.: 418,864

[22] Filed: Apr. 7, 1995

Related U.S. Application Data

[63] Continuation of Ser. No. 63,275, May 18, 1993, abandoned.

[30] Foreign Application Priority Data

May 20, 1992 [JP] Japan .................................. 4-127192

[51] Int. Cl.⁶ ..................... G11B 17/22; G11B 15/68; G06K 7/10
[52] U.S. Cl. ..................... 369/36; 360/92; 235/462
[58] Field of Search ..................... 360/92, 98.06, 360/98.04; 369/36, 178, 179, 192, 193; 235/462

[56] References Cited

U.S. PATENT DOCUMENTS

| | | |
|---|---|---|
| 3,775,751 | 11/1973 | Anderson ............................ 340/172.5 |
| 4,812,629 | 3/1989 | O'Neil et al. ........................... 235/462 |
| 4,963,721 | 10/1990 | Kohno et al. ........................... 235/462 |
| 5,036,503 | 7/1991 | Tomita ..................................... 369/36 |
| 5,056,073 | 10/1991 | Fitzgerald et al. ....................... 369/36 |
| 5,059,772 | 10/1991 | Younglove ............................... 360/92 |
| 5,187,353 | 2/1993 | Metlitsky et al. ..................... 235/462 |
| 5,323,327 | 6/1994 | Carmichael et al. ..................... 360/92 |

*Primary Examiner*—Robert S. Tupper
*Assistant Examiner*—George J. Letscher
*Attorney, Agent, or Firm*—Greer, Burns & Crain, Ltd.

[57] ABSTRACT

A library apparatus having an accessor equipped with a bar code reader. The library apparatus includes a recording medium drive unit for writing and reading data to and from a recording medium cartridge; a cartridge entry unit for entering recording medium cartridges into the apparatus; and an automatic cartridge exit unit for automatically ejecting recording medium cartridges from inside the apparatus. The accessor transports cartridges through the cell unit, the recording medium drive unit, the cartridge entry unit and the automatic cartridge exit unit. The library apparatus also includes a door for allowing a large number of recording medium cartridges to enter all at once into the cells of a given cell column of the cell unit. Because the accessor is equipped with the bar code reader, the bar code of each cartridge is read thereby every time a cartridge is taken out of its cell by the accessor.

16 Claims, 65 Drawing Sheets

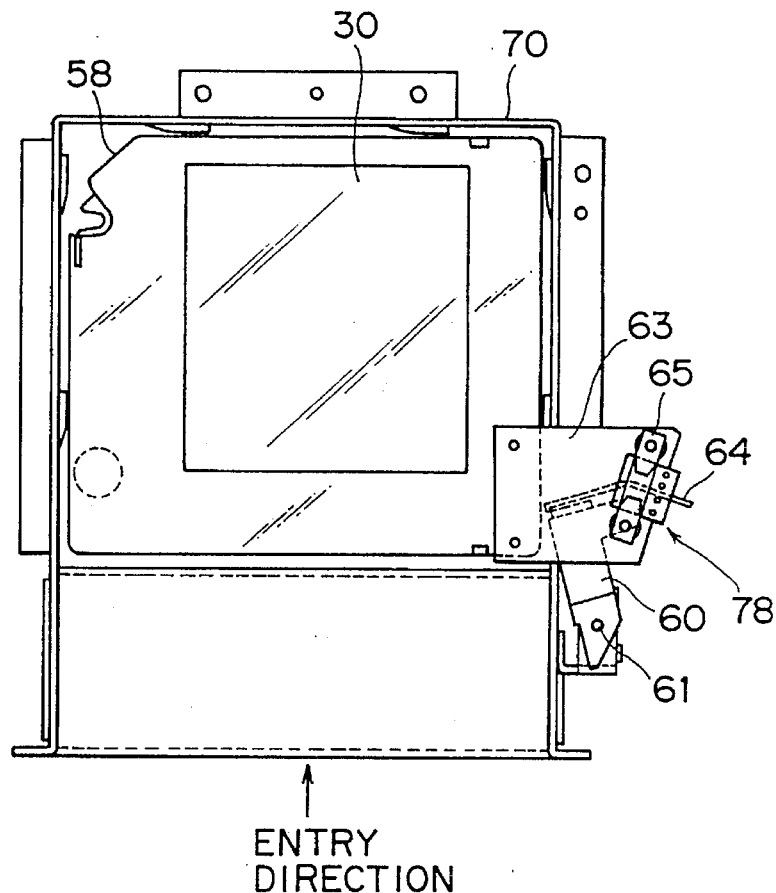
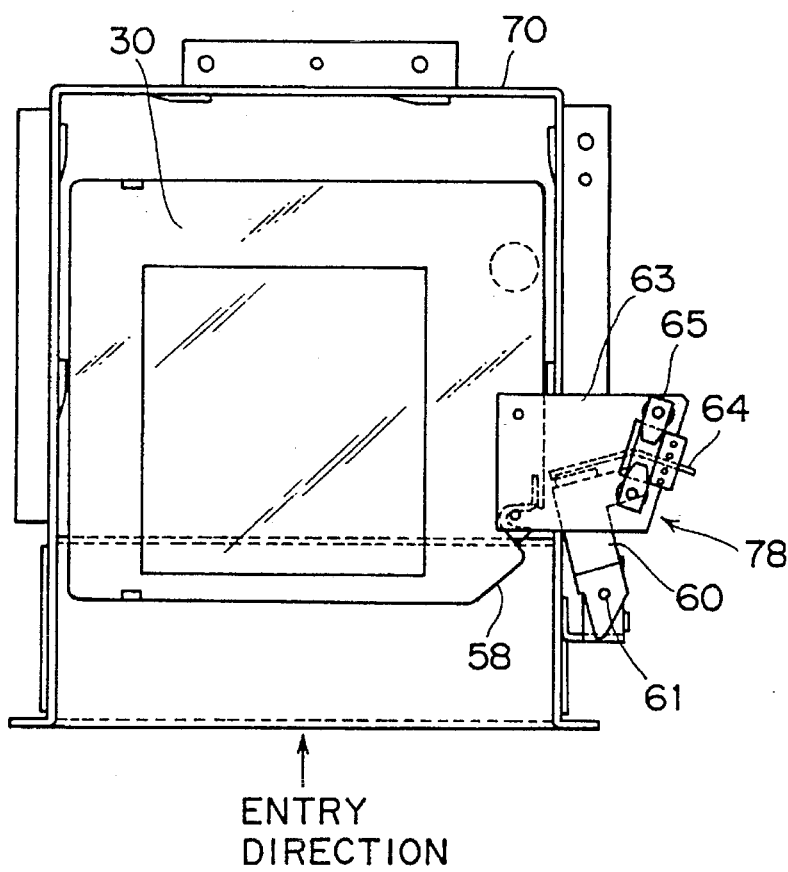

ENTRY DIRECTION

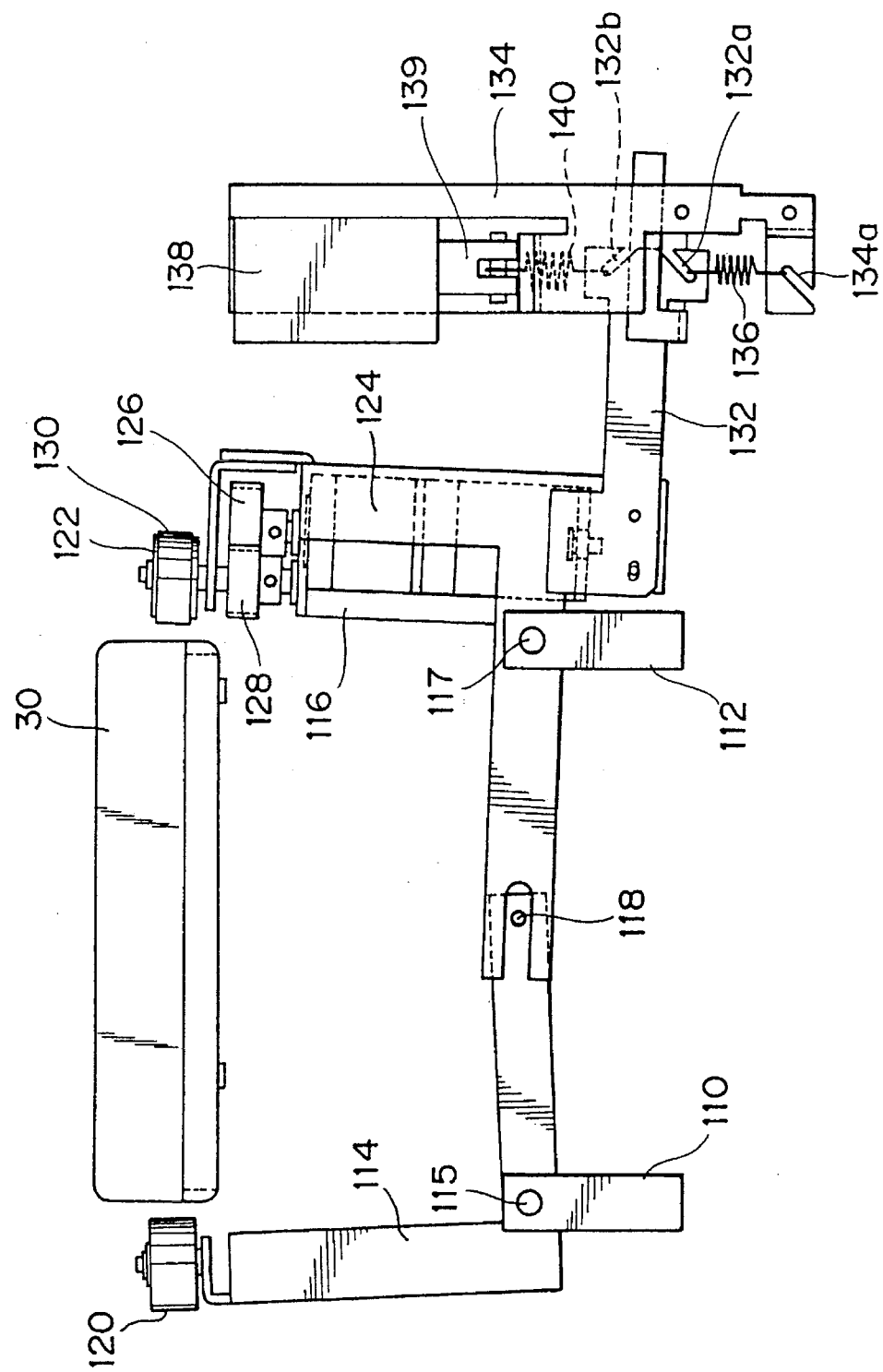

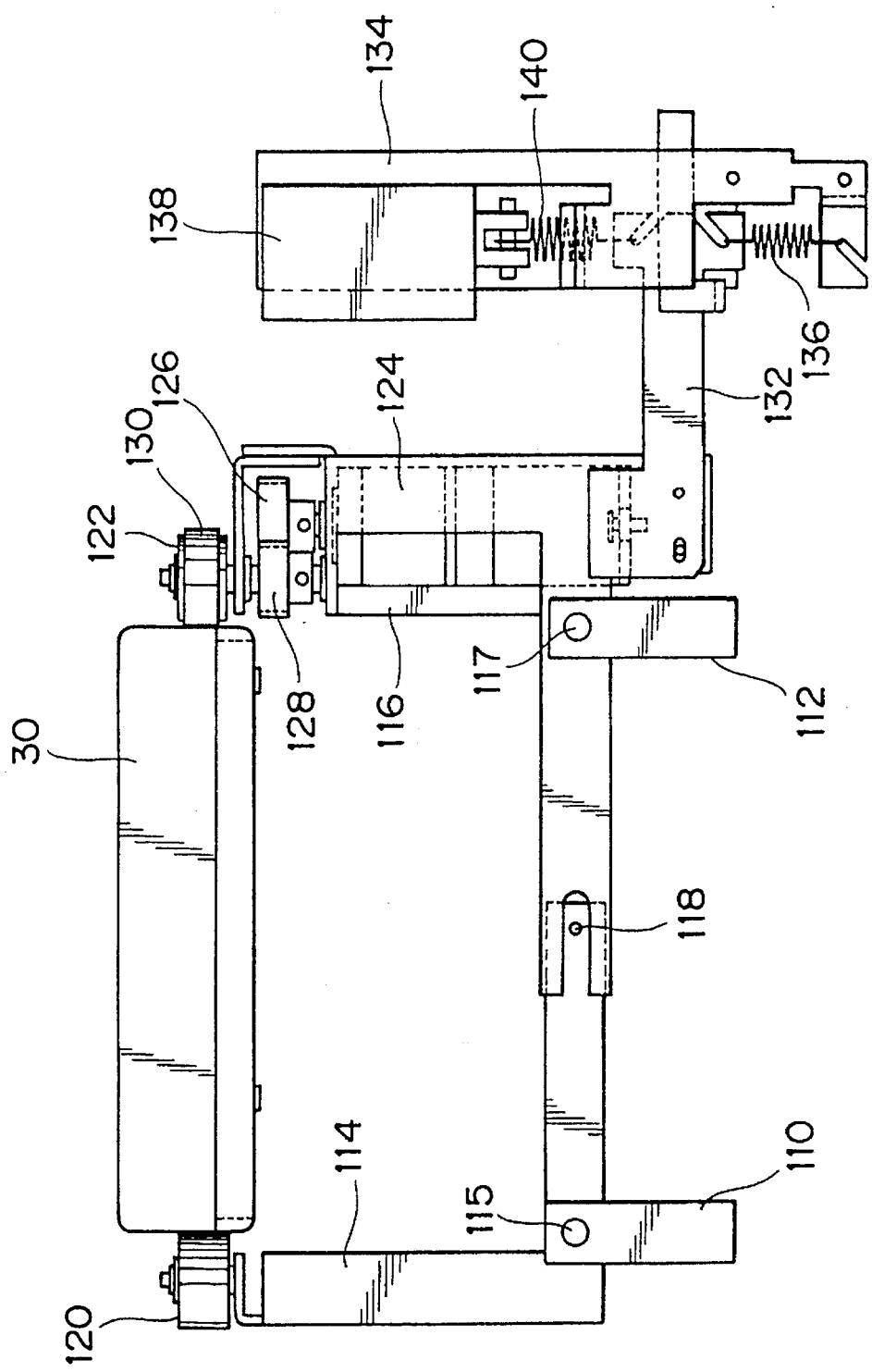

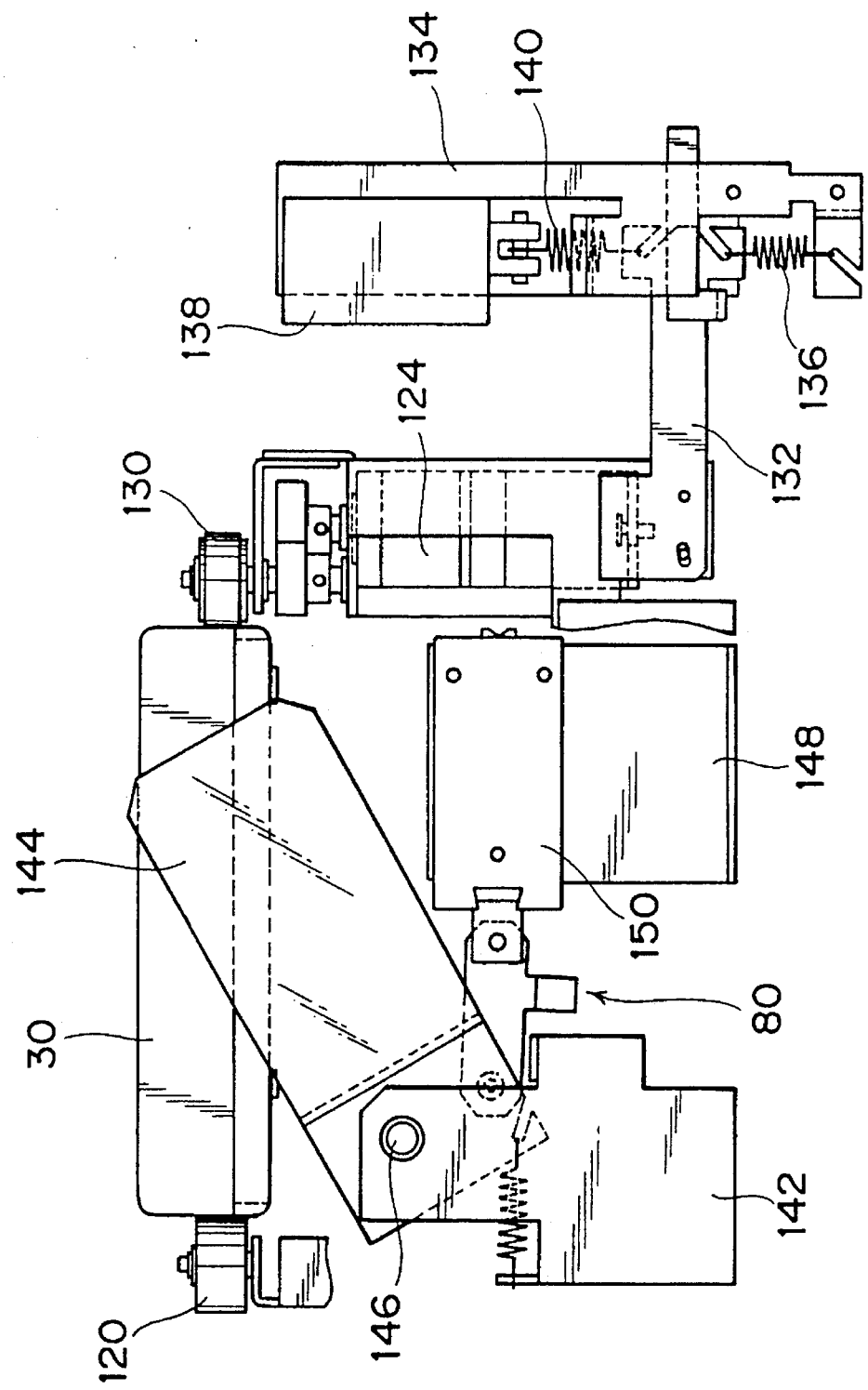

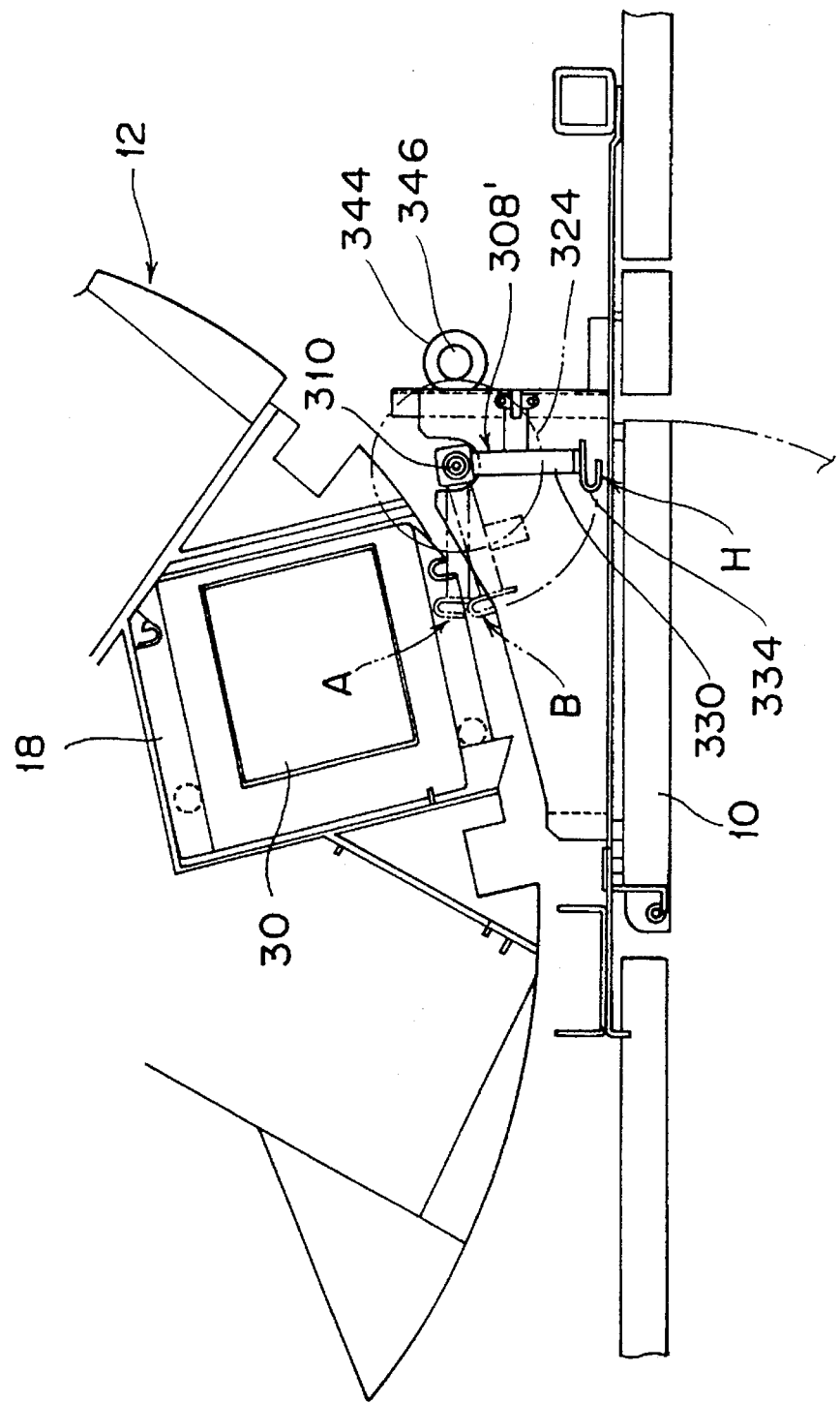

FIG. 51

| 385 — Column No. | 00 = no cartridge switched<br>FF = cartridges switched |
|---|---|
| Column 1 | OO |
| Column 2 | FF |
| Column 3 | FF |
| Column 4 | OO |
| Column 5 | OO |
| Column 6 | OO |
| Column 7 | OO |
| Column 8 | OO |
| Column 9 | OO |

LIBRARY APPARATUS HAVING ACCESSOR WITH BAR CODE READER WHICH ROTATES AT A DIFFERENT HORIZONTAL POSITION WHEN READING A BAR CODE FAILED AT A FIRST POSITION

RELATED APPLICATION

This is a continuation of application Ser. No. 08/063,275, filed on May 18, 1993, now abandoned.

BACKGROUND OF THE INVENTION

1. Field of the Invention

The present invention relates to a recording medium library apparatus and, more particularly, to a magnetic tape library apparatus having an accessor equipped with a bar code reader.

2. Description of the Related Art

Magnetic tape-units are one of diverse kinds of external storage devices for use with computers. The magnetic tape units operate most commonly on what is known as the open reel system using 0.5-inch wide tapes. The chores of manually loading the open reels have been alleviated by widening acceptance of automatic tape loading devices. With these devices, the operator need only set a desired tape reel onto a receptor which then causes the tape to be loaded automatically. Today, operators' burdens are further alleviated by the widespread use of magnetic tape cartridges. A magnetic tape cartridge, accommodating a tape having the same width as that of open reel tapes, allows the tape to be threaded out of the reel within for automatic tape loading.

A plurality of magnetic tape cartridges are entered in the magnetic tape library apparatus. Any one of the cartridges is selected and loaded to a magnetic tape drive unit for data recording and reproduction. The magnetic tape library apparatus comprises a cell unit having a plurality of cells each accommodating a magnetic tape cartridge; a magnetic tape drive unit for recording and reproducing data; and an accessor for automatically switching magnetic tape cartridges between cell unit and magnetic tape drive unit. The magnetic tape library apparatus further comprises a cartridge entry unit for entering magnetic cartridges into the library apparatus, and an automatic cartridge ejection unit for automatically ejecting magnetic tape cartridges from inside the library apparatus.

The accessor transports magnetic tape cartridges through the magnetic tape drive unit, cell unit, cartridge entry unit and automatic cartridge ejection unit. Magnetic tape library apparatuses of this kind are widely used as an external mass storage device for computers. These apparatuses are required to operate unfailingly when unattended.

The cartridge entry unit transports one by one a plurality of cartridges entered by the operator. The accessor receives each cartridge and stores it into the appropriate cell of the cell unit. More specifically, the cartridge entry unit has a bar code reader that reads a bar code off each of the cartridges entered. The bar code data thus read are sent to a host computer via an accessor controller. In turn, the host computer specifies the address of the cell into which the accessor places the applicable cartridge. For writing and reading of data to and from a magnetic tape cartridge, the host computer first designates the address of the cell from which the accessor extracts the cartridge. The extracted cartridge is loaded into the magnetic tape drive unit. After data are written to and/or read from the magnetic tape cartridge, the accessor takes out the cartridge from the magnetic tape drive unit and brings it into the cell whose address is again specified by the host computer.

With prior art magnetic tape library apparatuses, a plurality of cartridges in the cartridge entry unit are separated one by one for delivery to the accessor. The accessor brings each separated cartridge into the appropriate cell. The procedure takes time if there are a large number of cartridges to be accommodated into the cell unit. One proposed solution to this drawback is to provide an opening on the housing close to the cell unit, the opening allowing a large number of cartridges to be entered all at once into the cell unit. One disadvantage of this solution is as follows: because the bar code reader is provided in the cartridge entry unit, each of the numerous cartridges entered into the cells of the cell unit must be extracted one by one by the accessor and brought to the bar code reader that reads a bar code off each cartridge. With its bar code read, each cartridge must be stored again into the applicable cell. In this case, too, it takes time to read the bar code off each of the numerous cartridges entered and to direct them to the cells having the appropriate addresses.

SUMMARY OF THE INVENTION

It is therefore an object of the present invention to provide a library apparatus capable of quickly reading bar codes off a large number of cartridges entered directly and all at once into a cell unit, whereby the time required for addressing the cartridges in the cell unit is shortened.

In accordance with an aspect of the present invention, there is provided a library apparatus comprising: a housing; a cell unit having a plurality of cell columns each including a plurality of cells, each cell accommodating a recording medium cartridge having a bar code attached thereto; a recording medium drive unit for writing and reading data to and from a recording medium cartridge; a cartridge entry unit for entering recording medium cartridges into the library apparatus; an automatic cartridge exit unit for automatically ejecting recording medium cartridges from inside the library apparatus; an accessor for transporting cartridges through the cell unit, the recording medium drive unit, the cartridge entry unit and the automatic cartridge exit unit, the accessor including a hand mechanism for gripping a cartridge in a substantially horizontal manner; and a bar code reader attached to the hand mechanism for reading the bar code off each recording medium cartridge.

In a preferred structure according to the invention, the library apparatus further comprises a door for allowing a large number of recording medium cartridges to enter all at once into the cells of a given cell column of the cell unit. The door is attached pivotably to the housing adjacent to the cell unit. The hand mechanism of the accessor comprises a base attached swingingly about a vertical axis, and grip means for gripping the recording medium cartridge disposed movably on the base between an advanced position and retracted position. The bar code reader reads a bar code off the recording medium cartridge after the grip means gripping the cartridge has moved to the retracted position.

In accordance with another aspect of the present invention, there is provided a library apparatus comprising: a housing; a cell unit having a plurality of cell columns each including a plurality of cells, each cell accommodating a recording medium cartridge having a bar code attached thereto; a recording medium drive unit for writing and reading data to and from a recording medium cartridge; a cartridge entry unit for entering recording medium cartridges into the library apparatus; an automatic cartridge exit unit for automatically ejecting recording medium cartridges from inside the library apparatus; an accessor for transporting cartridges through the cell unit, the recording medium drive unit, the cartridge entry unit and the automatic cartridge exit unit, the accessor including a hand mechanism for gripping a cartridge in a substantially horizontal manner; a bar code reader attached to the hand mechanism for reading the bar code off each recording medium cartridge; and accessor control means for controlling the accessor, the accessor control means including baud rate varying means; the bar code reader comprising a nonvolatile memory for storing baud rates, write control means for writing to the nonvolatile memory a desired baud rate relevant to the communication with the accessor control means in accordance with commands therefrom, and baud rate setting means for setting for the bar code reader the desired baud rate written in the nonvolatile memory.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 12A through 12C are plan views of the gate sensor mechanism, FIG. 12A showing a cartridge being entered inversely, FIG. 12B depicting a cartridge being incompletely entered, FIG. 12C portraying a cartridge being normally entered;

FIGS. 16A and 16B are schematic side views of a feeder mechanism in the cartridge entry unit FIG. A showing the feeder being opened, FIG. 16B depicting the feeder being closed;

FIGS. 17A and 17B are schematic side views of a shutter mechanism in the cartridge entry unit, FIG. 17A showing the shutter being opened, FIG. 17B portraying the shutter being closed;

FIGS. 26A through 29A and 26B through 29B are plan and side views, respectively, showing how the hand mechanism inserts a cartridge into the magnetic tape drive unit;

FIGS. 30A through 33A and 30B through 33B are plan and side views, respectively, depicting how the hand mechanism inserts a cartridge into a cell of the cell drum;

FIG. 46 is a schematic plan view showing an alternative faulty cartridge entry detecting mechanism;

FIG. 51 is a view of a typical cartridge switching table;

Figure 1:
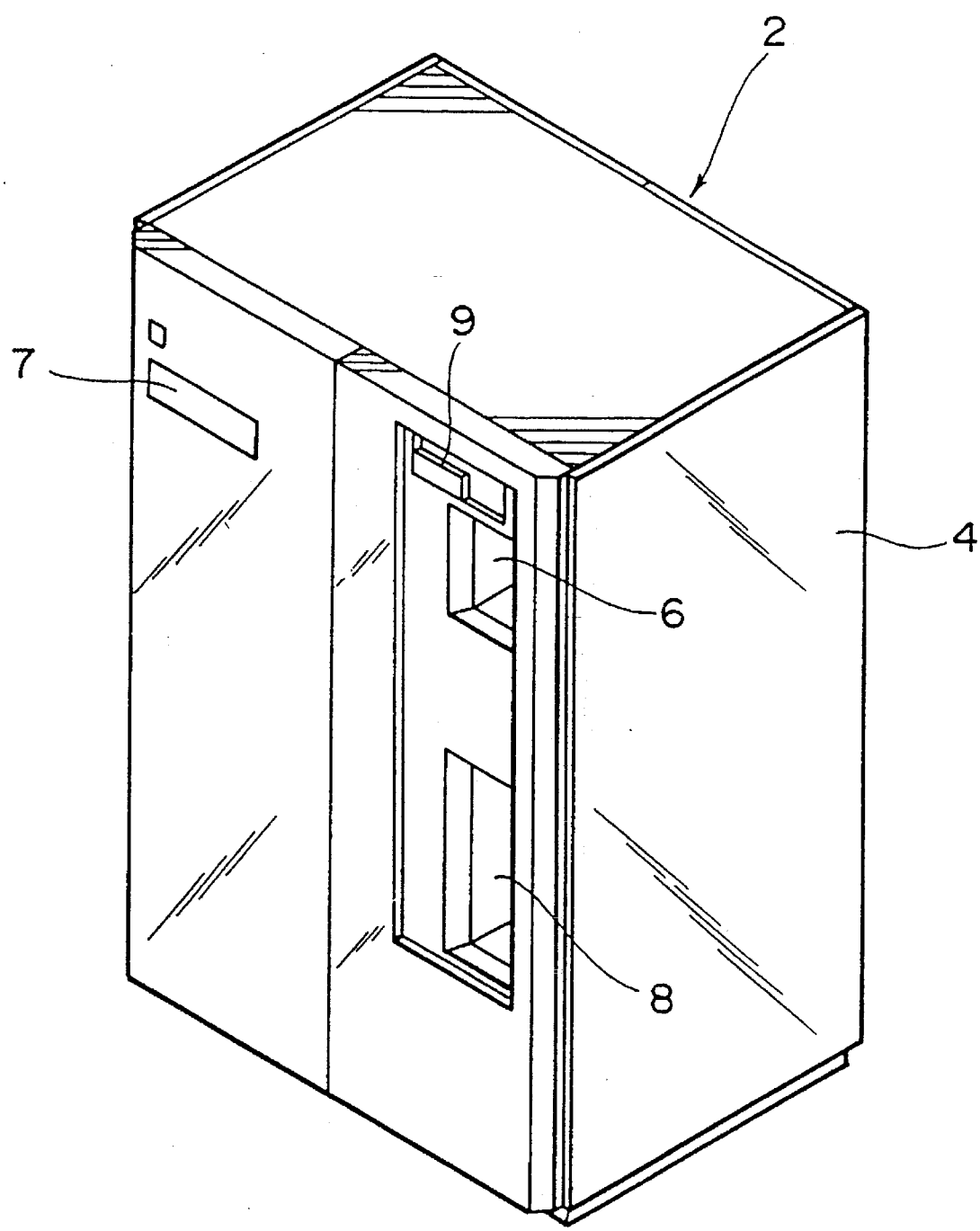
FIG. 1 is a front perspective view of a magnetic tape library apparatus embodying the invention.
Figure 2:
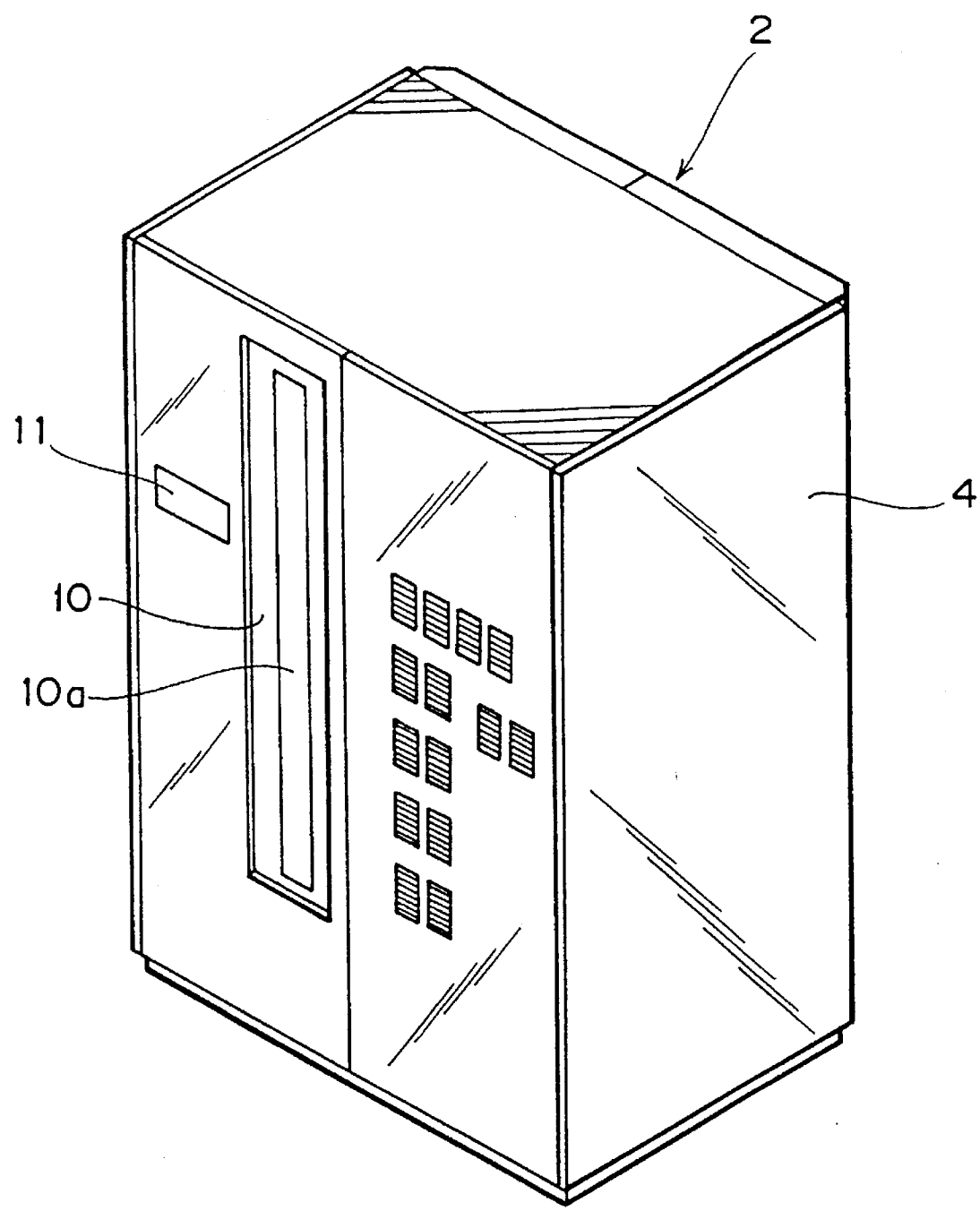
FIG. 2 is a rear perspective view of the embodiment of FIG. 1.
Figure 3:
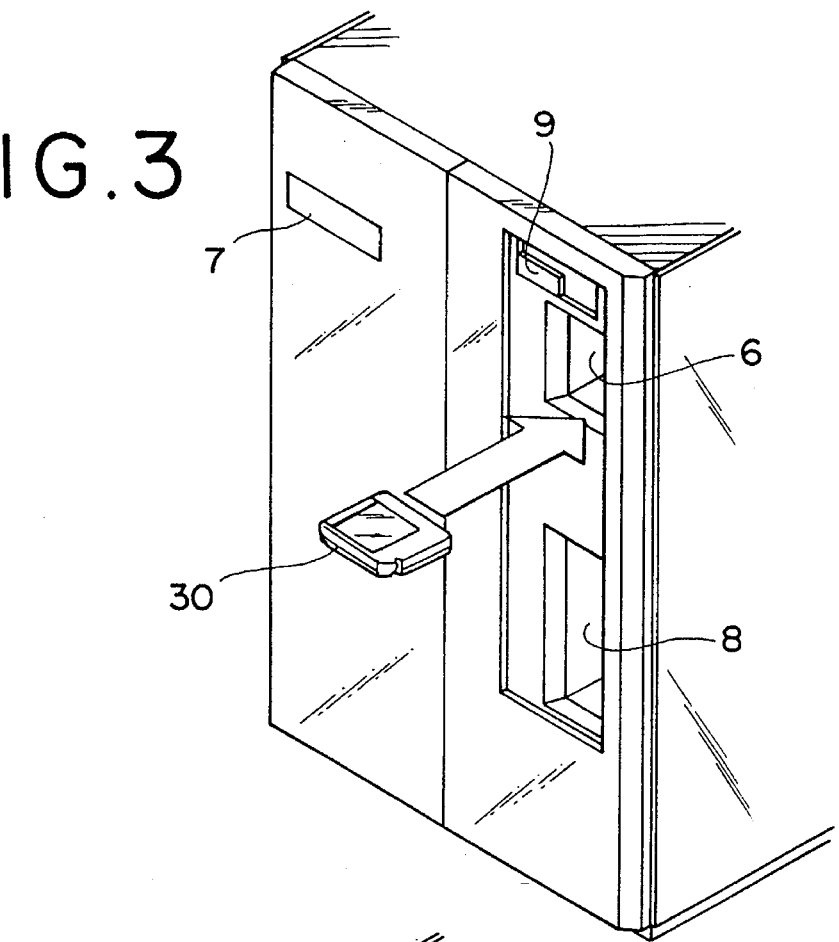
FIG. 3 is a perspective view showing how a magnetic tape cartridge is entered into the library apparatus through a cartridge entry opening.
Figure 4:
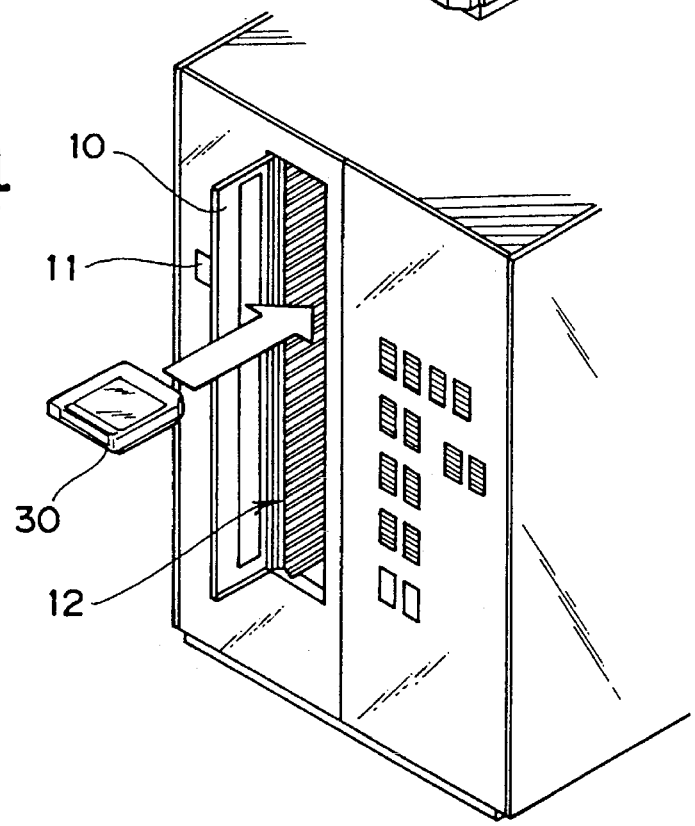
FIG. 4 is a perspective view depicting how a magnetic tape cartridge is entered directly into a cell of a cell drum.

DESCRIPTION OF THE PREFERRED EMBODIMENTS:

FIG. 1 is a front perspective view of a magnetic tape library apparatus 2 practiced as one preferred embodiment of the invention, and FIG. 2 is a rear perspective view of the embodiment. A housing 4 of the magnetic tape library apparatus 2 has at its front a cartridge entry opening 6, a cartridge exit opening 8, and operation panels 7 and 9. The cartridge entry opening 6 is capable of admitting up to, say, 10 magnetic tape cartridges at a time. The cartridge exit opening 8 stacks up to, say, 15 cartridges at a time. At the back of the housing 4 are a door 10 and another operation panel 11. The door 10 allows a large number of cartridges to move into and out of a row of cells in a cell drum, to be described later. The door 10 has a transparent window 10a that permits observation of the cell drum inside. FIG. 3 shows how a magnetic tape cartridge 30 is entered through the cartridge entry opening 6, and FIG. 4 depicts how a magnetic tape cartridge 30 is entered directly into a cell of the cell drum when the door 10 is left open.

Figure 5:
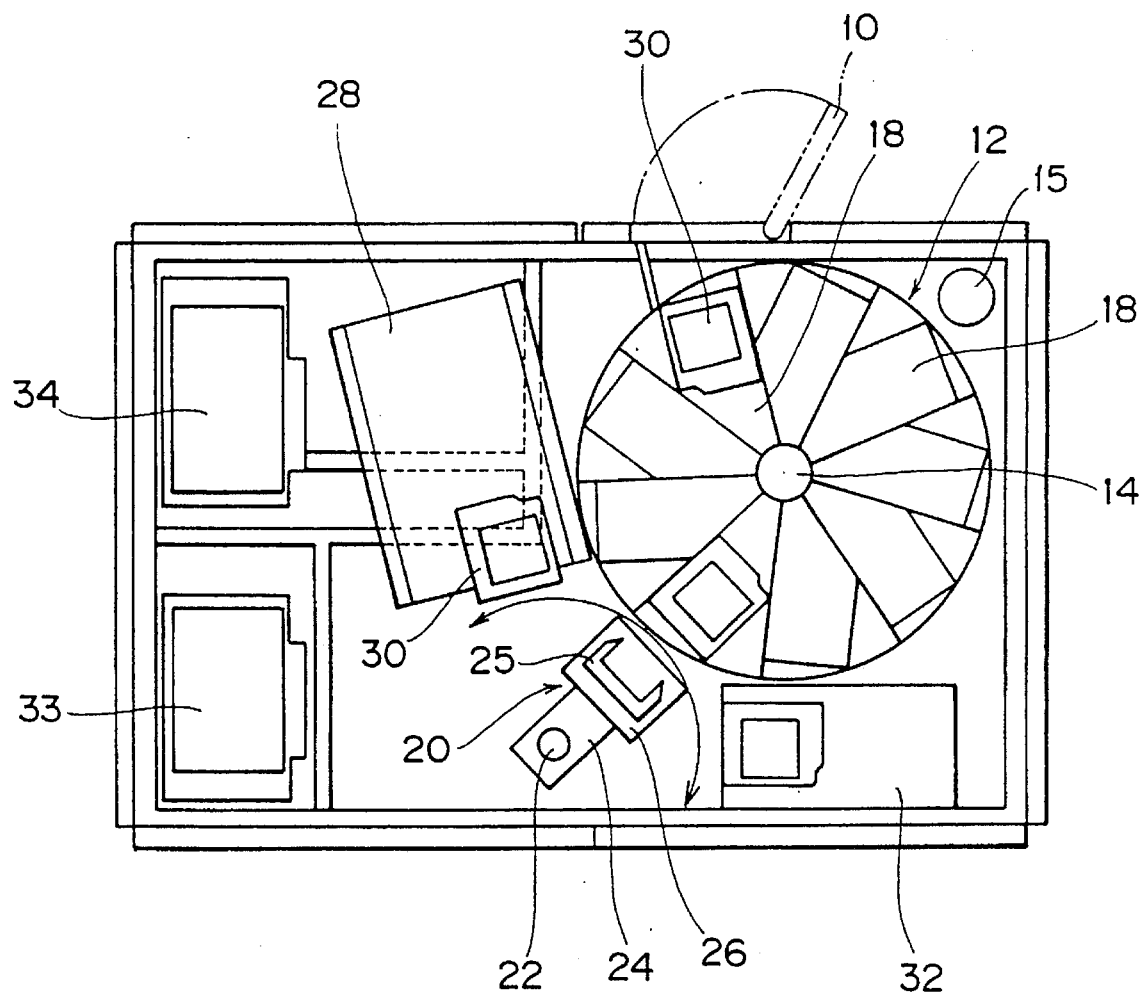
FIG. 5 is a schematic plan view of the library apparatus with a top plate of its housing removed.
Figure 6:
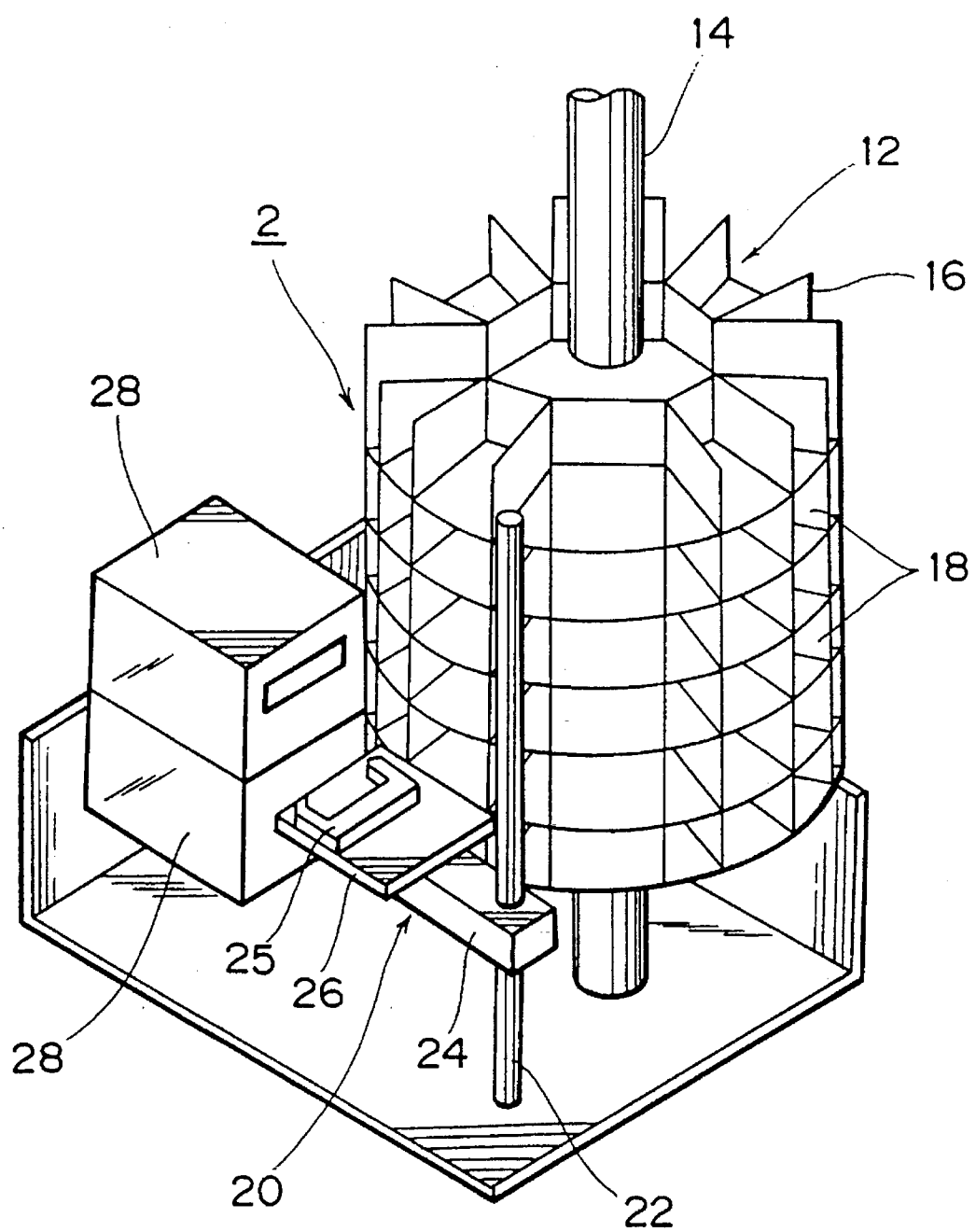
FIG. 6 is a schematic perspective view showing the inside of the library apparatus.

In FIGS. 5 and 6, the cell drum 12 is attached fixedly to a rotatably driven shaft 14, the drum having a plurality of cells 18 separated by partitions 16. The cell drum 12 is driven by a motor 15 via a gear train, not shown. Adjacent to the cell drum 12 are two magnetic tape drive units 28 for writing and reading data to and from magnetic tapes. Between the cell drum 12 and the magnetic tape drive units 28 is an accessor 20 that automatically switches magnetic tape cartridges 30 therebetween; the cartridges 30 are loaded into the magnetic tape drive units 28 for read and write operations. In FIG. 5, reference numeral 32 indicates a cartridge entry/exit mechanism connected to the cartridge entry opening 6 and cartridge exit opening 8 of FIG. 1. An accessor controller 33 controls the operation of the accessor 20, cell drum 12, and cartridge entry/exit mechanism 32. A director 34 controls the write and read operations of data to and from magnetic tape cartridges in the magnetic tape drive unit 28.

Figure 7:
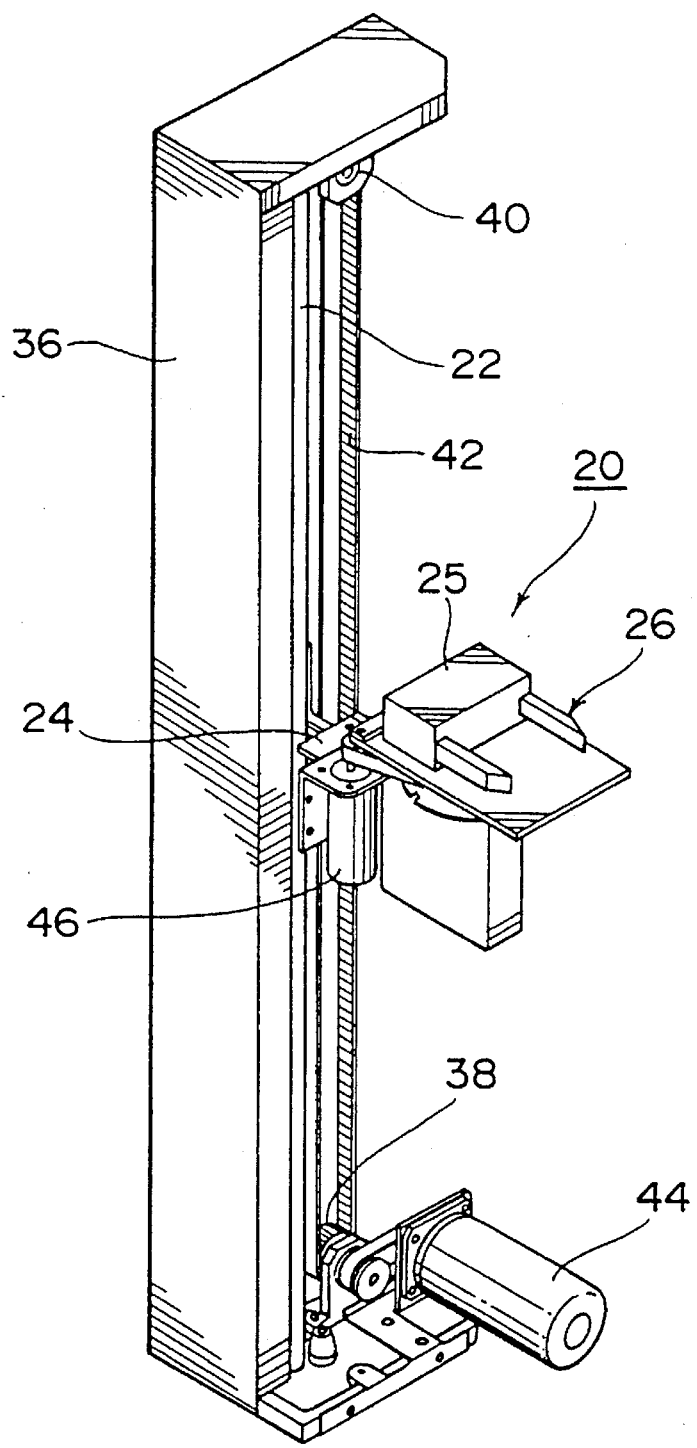
FIG. 7 is a schematic perspective view of an accessor drive mechanism.

The drive mechanism of the accessor 20 is constructed as shown in FIG. 7. A driving pulley 38 and a driven pulley 40 are attached rotatably to an approximately C-shaped support member 36. A timing belt 42 is threaded around the pulleys 38 and 40 in an endless manner. The C-shaped support member 36 is secured with a guide member 22 extending perpendicularly. Another support member 24 is fixed to the timing belt 42. One end of the support member 24 is engaged with the guide member 22. A hand mechanism 26 with a grip hand 25 is mounted on the support member 24.

When a motor 44 is activated, the support member 24 fixed to the timing belt 42 moves up and down, guided by the guide member 22. That in turn moves vertically the hand mechanism 26 mounted on the support member 24. When a motor 46 is activated, the support member 24 swings horizontally, with the guide member 22 acting as the center of the swing motion. That is, the hand mechanism 26 also swings horizontally. Where the motors 44 and 46 are activated selectively under appropriate control, the hand mechanism 26 is led to gain access to a selected cell 18 in the cell drum 12 as well as to a selected magnetic tape drive unit 28.

The drive mechanism of the accessor 20 is appreciably simplified because it is composed only of the above-described vertical direction drive mechanism and of the swing mechanism centering on the guide member 22. In practice, the cell drum 12, magnetic tape drive units 28 and cartridge entry/exit mechanism 32 are located around the accessor 20 in such a manner that largely the swing motion of the accessor 20 alone (along with a limited vertical movement) will effect delivery of magnetic tape cartridges among these components.

Figure 8A:
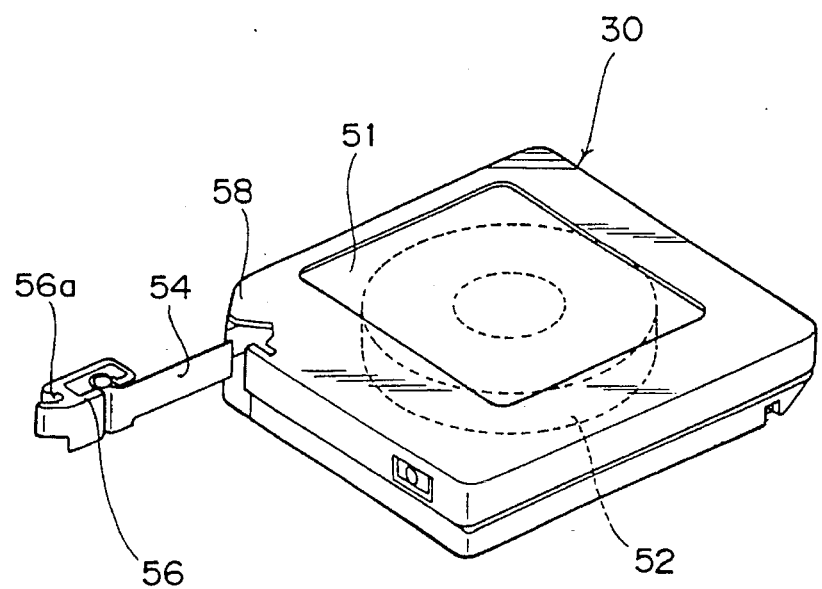
FIG. 8A is an external perspective view of a magnetic tape cartridge.
Figure 8B:
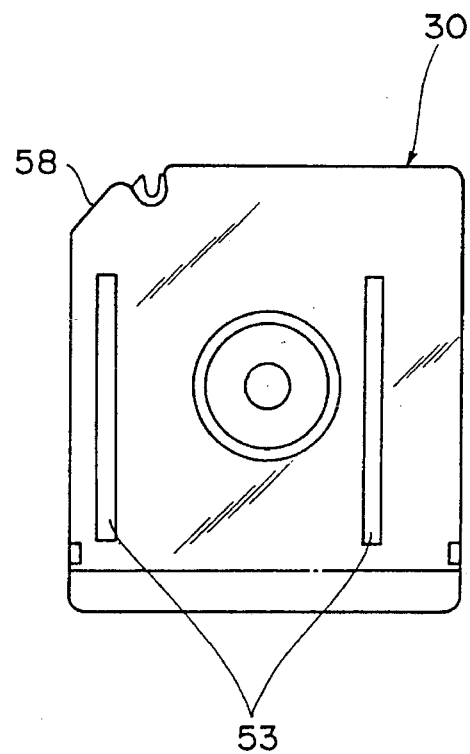
FIG. 8B is a bottom view of the magnetic tape cartridge.

Referring to FIG. 8A, a tape reel 52 is housed rotatably inside a magnetic tape cartridge 30. The base of a magnetic tape 54 is secured to the tape reel 52, and the intermediate tape portion starting from the base is wound around the reel 52. The tip of the magnetic tape 54 is equipped fixedly with a leader block 56. The leader block 56 has an engagement groove 56a with which a sled pin of the magnetic tape drive unit 28 is to be engaged. A cutout 58 is formed in one corner of the magnetic tape cartridge 30. The magnetic tape cartridge 30 has on its top a depression 51 on which a label is pasted. The bottom of the cartridge 30 has a pair of parallel ridges 53 that engages with the depression 51, as depicted in FIG. 8B.

Figure 9:
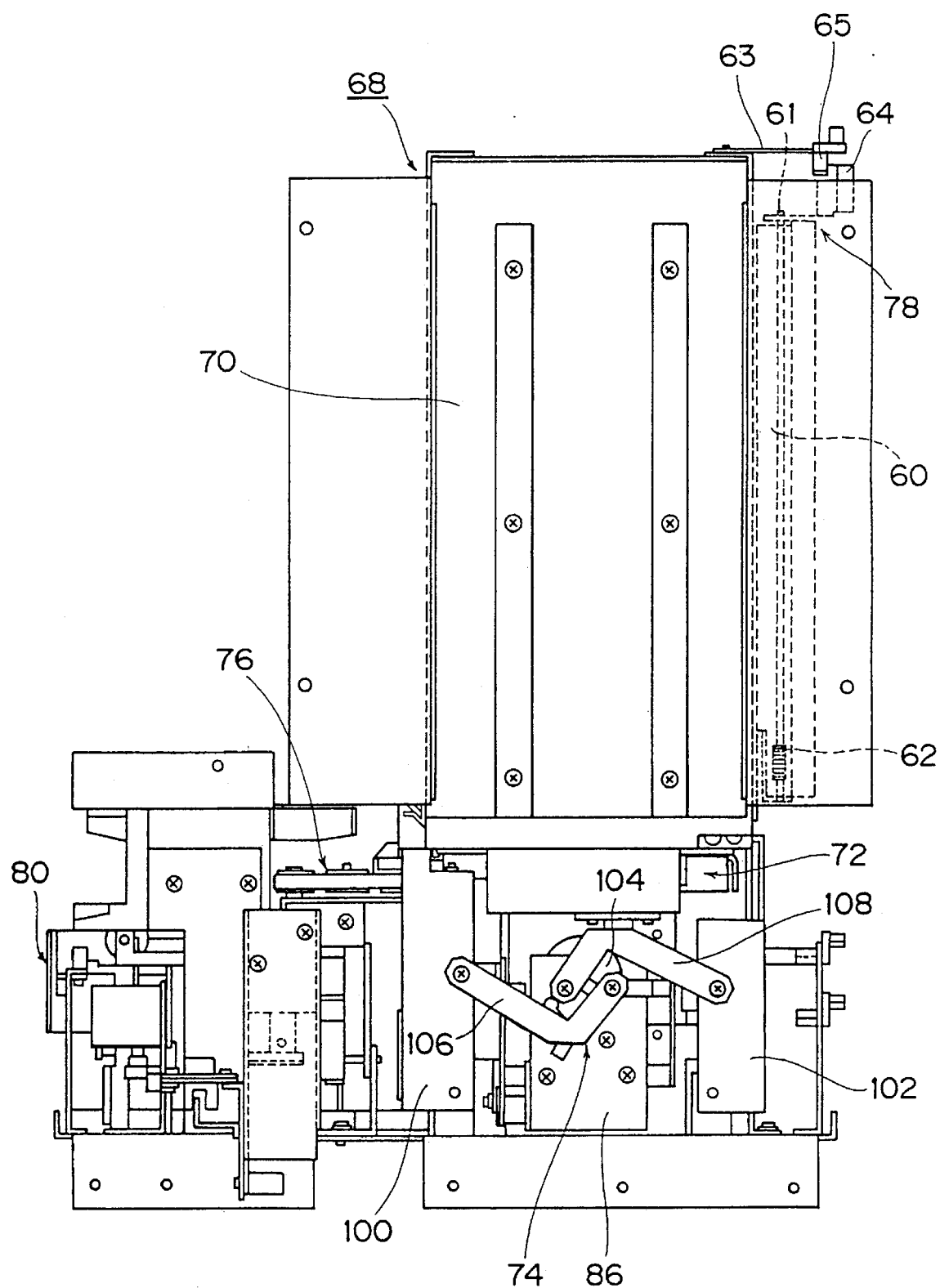
FIG. 9 is a front view of a magnetic tape cartridge entry unit.

FIG. 9 is a front view of a cartridge entry unit 68 for entering magnetic tape cartridges into the magnetic tape library apparatus 2. The cartridge entry unit 68 comprises a stacker 70 for stacking a plurality of magnetic tape cartridges, a stage mechanism 72, a hook mechanism 74, a feeder mechanism 76, a gate sensor mechanism 78 and a shutter mechanism 80. The stacker 70 is a box-like part that admits a plurality of magnetic tape cartridges 30 entered by an operator. The stacker 70 is connected to the cartridge entry opening 6 shown in FIG. 1. Cartridges 30 entered into the stacker 70 are stacked thereby onto a stage 82 of the stage mechanism 72. The gate sensor mechanism 78 checks to see if the stacked cartridges 30 are correctly entered.

As will be explained later in more detail, the stage mechanism 72 moves the stage 82 up and down. The hook mechanism 74 separates the lowest-positioned cartridge alone from the remaining multiple cartridges 30 stacked on the stage 82. The feeder mechanism 76 transports to the accessor 20 the single cartridge 30 separated from the cartridge stack by the hook mechanism 74. The shutter mechanism 80 stops temporarily the cartridge fed by the feeder mechanism 76 so as to keep the cartridge from falling off the feeder mechanism 76.

Figure 10:
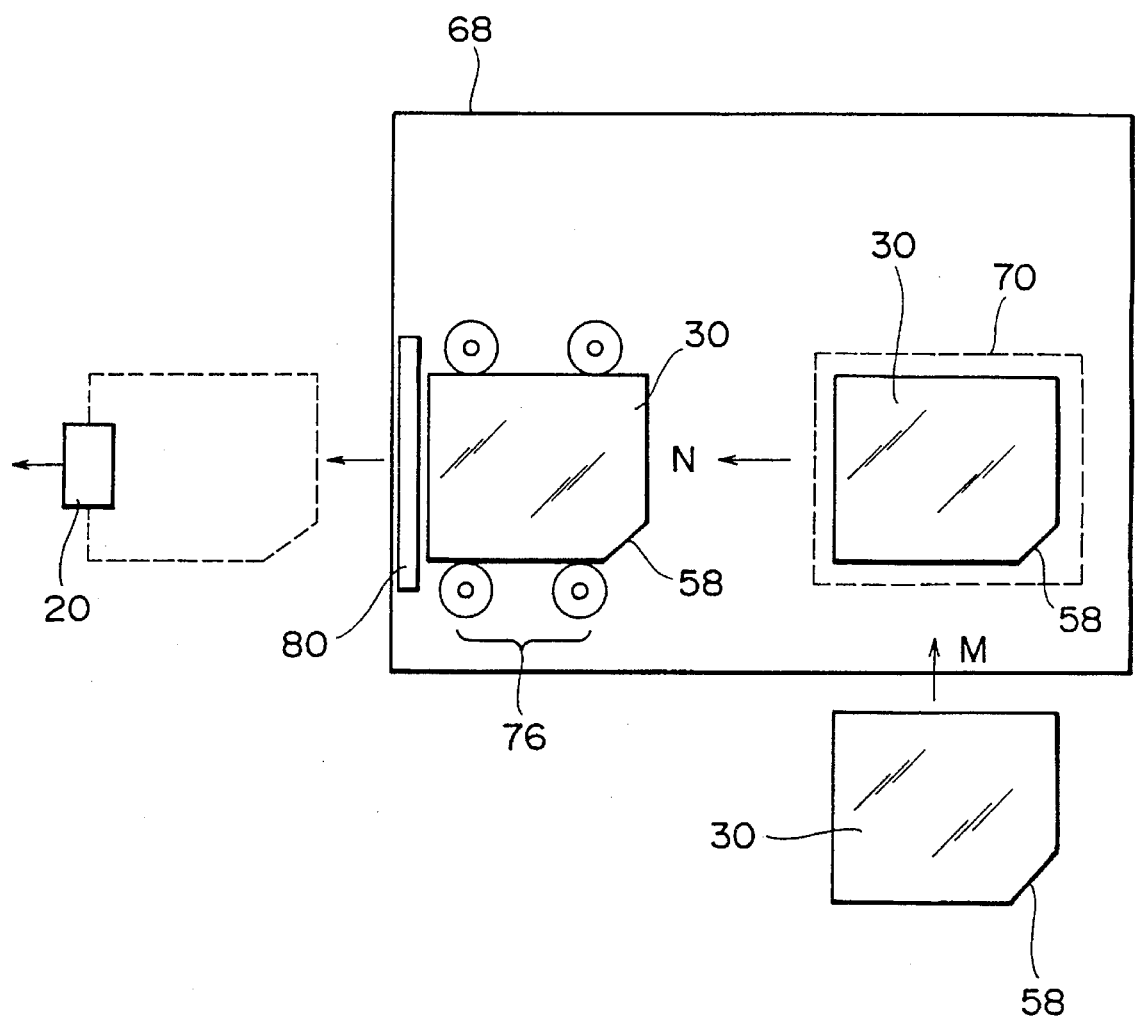
FIG. 10 is a view showing the path through which a cartridge is transported by the magnetic tape cartridge entry unit.

FIG. 10 is a view showing the path through which a cartridge is transported by the magnetic tape cartridge entry unit that is part of the embodiment. The cartridge 30 is entered into the stacker 70 in the arrowed direction M with its cutout 58 facing the front right side. Inside the stacker 70, the lowest-positioned cartridge alone is separated from those thereabove by the stage mechanism 72 and hook mechanism 74, to be described later in more detail. The separated cartridge 30 is transported by the feeder mechanism 76 in the arrowed direction N with the direction of the cartridge at its entry kept unchanged. After getting stopped temporarily by the shutter mechanism 80, the cartridge 30 is delivered to the accessor 20.

Figure 11A:
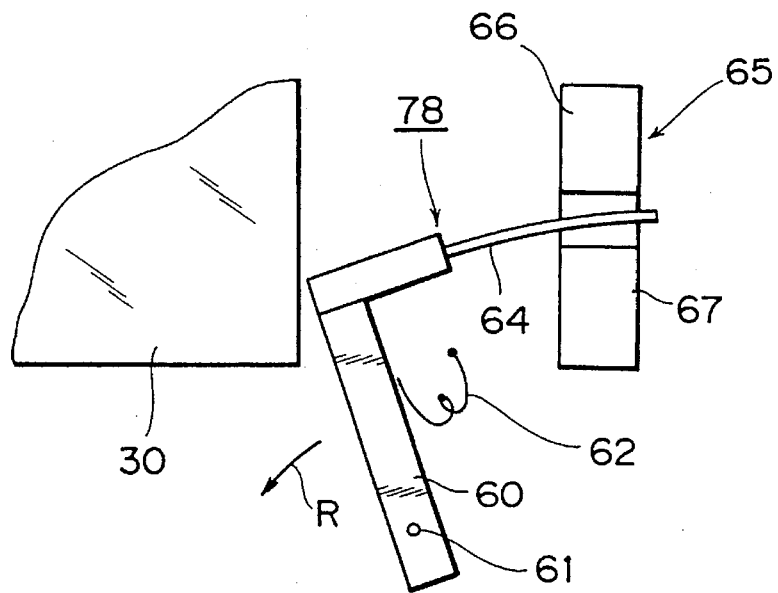
FIGS. 11A and 11B illustrate how a gate sensor mechanism of the embodiment works, FIG. 11A showing a cartridge being erroneously entered, FIG. 11B depicting a cartridge being normally entered.
Figure 11B:
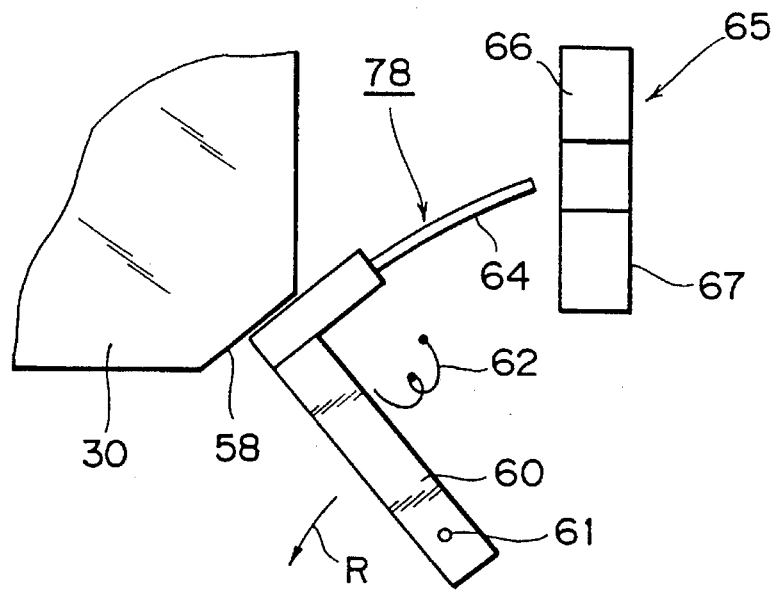

The gate sensor mechanism 78 for detecting a faulty entry of cartridges will now be described with reference to FIGS. 9, 11A and 11B. As shown in FIG. 9, a gate actuator 60 is fixed to a shaft 61 which is adjacent to one side of the stacker 70 and which, supported rotatably thereby, extends in the vertical direction. The gate actuator 60 extends along the entire length of the stacker 70 and is biased rotatably with a spring 62 in the arrowed direction R. The top of the gate actuator 60 is equipped with a flag piece 64. A transmission type photo sensor 65 having a light-emitting diode 66 and a photo-diode 67 is provided in the position into which the flag piece 64 may be inserted.

With no cartridge entered, the gate actuator 60 remains pushed by the spring 62 to rotate sufficiently in the arrowed direction R. In this state, the photo-diode 67 receives light from the light-emitting diode 66 and turns on the photo sensor 65. When the cartridge 30 is entered, the gate actuator 60 is pushed by the cartridge to rotate clockwise.

If the cartridge 30 is not fully entered into the stacker 70 or is entered in an incorrect direction, the gate actuator 60 is pushed by the erroneously entered cartridge to rotate clockwise. This causes the flag piece 64 to be inserted into the photo sensor 65 before the gate actuator 60 stops. In this state, the flag piece 64 shields light from the light-emitting diode 66 and thereby turns off the photo sensor 65. The faulty entry of the cartridge 30 is detected in the manner above.

When the cartridge 30 is entered fully into the stacker 70 in the correct direction, the cutout 58 on the cartridge 30 allows the gate actuator 60, which was rotated clockwise earlier by the push from the cartridge 30, to rotate counterclockwise, i.e., in the arrowed direction R pushed by the spring 62. The action pulls the flag piece 64 out of the photo sensor 65 and thereby turns it on. This allows the normal entry of the cartridge 30 to be detected. At this point, the cartridge 30 is locked to prevent its inadvertent fall from the stacker 70 because the gate actuator 60 interferes with the cutout 58 of the cartridge 30.

How the gate sensor mechanism 78 is illustratively practiced will now be described with reference to FIGS. 9 and 12A through 12C. The photo sensor 65 is attached to a plate member 63 fixed to the top plate constituting part of the stacker 70. The photo sensor as practiced here checks only for a faulty entry of the cartridge 30; whether or not the cartridge 30 is placed on the stage 82 will be detected by a separately provided stage sensor. When the cartridge 30 is stacked on the stage 82, the stage sensor made illustratively of a photo sensor is turned off. This signals the detection of a cartridge entry into the stacker 70. That is, the combination of the gate sensor mechanism 78 with the stage sensor makes it possible to ascertain whether or not a plurality of cartridges have been entered normally into the stacker 70.

If the cartridge 30 is inserted into the stacker 70 in an incorrect direction, as depicted in FIG. 12A, the gate actuator 60 is pushed by the side wall of the cartridge 30 and fails to return to its home position. This leaves the flag piece 64 inserted in the photo sensor 65. As a result, the photo-diode 67 does not receive light from the light-emitting diode 66 and thus turns off the photo sensor 65. This signals the detection of a faulty entry of the cartridge 30. FIG. 12B shows a case in which the cartridge 30 is entered insufficiently into the stacker 70 in the correct direction; the cartridge 30 has not reached the far side of the stacker 70. In this case, as with the case of FIG. 12A in which the cartridge was entered in the reverse direction, the gate actuator 60 fails to return to its home position, leaving the flag piece 64 inserted in the photo sensor 65. Consequently, the photo-diode 67 does not receive light from the light-emitting diode 66 and turns off the photo sensor 65. This also signals the detection of a faulty cartridge entry.

Figure 12C:
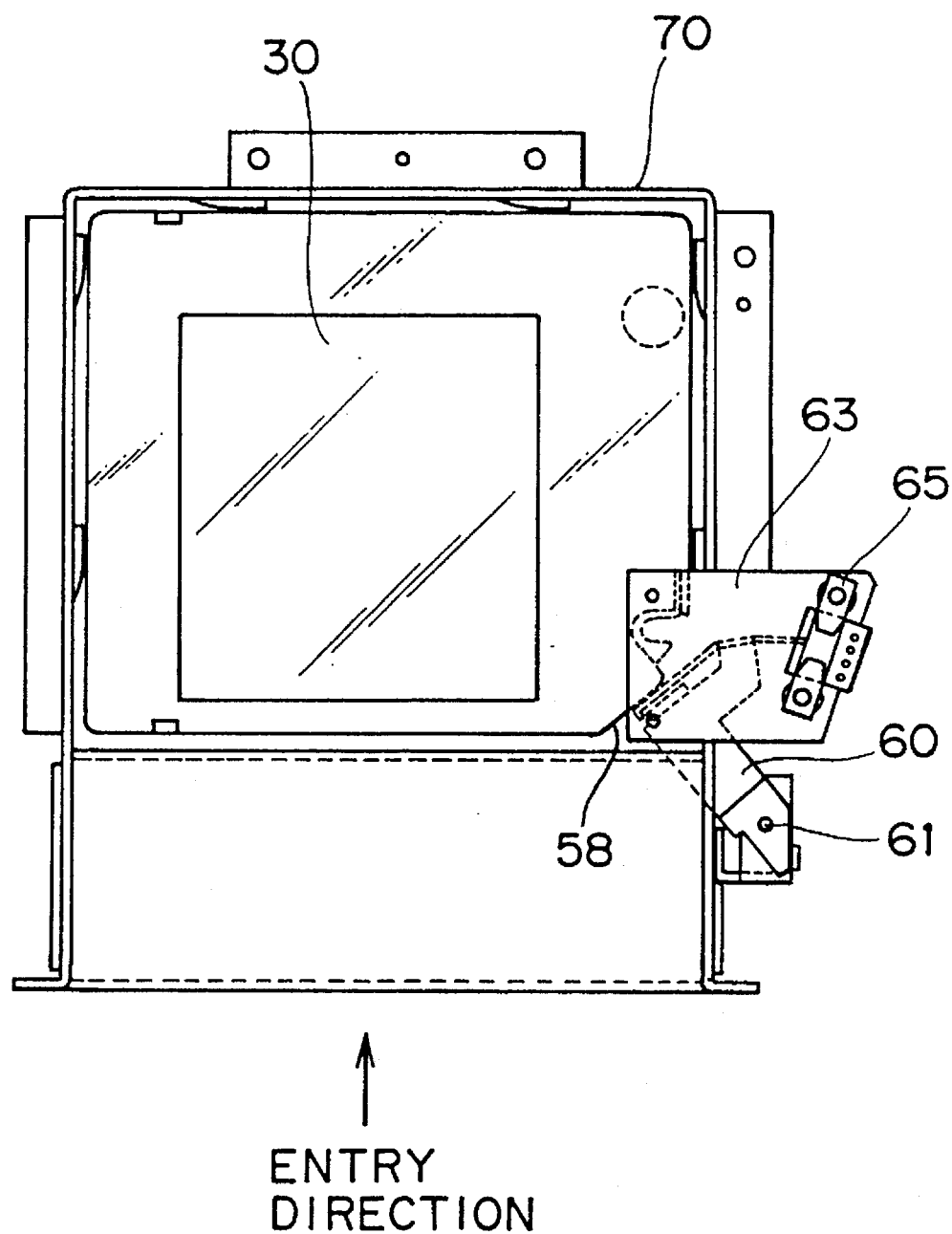

FIG. 12C portrays the cartridge 30 as it is entered correctly into the stacker 70. In this state, the cutout 58 formed in the front right corner of the cartridge 30 allows the gate actuator 60, which was rotated clockwise earlier by the push from the cartridge 30, to return to its home position biased by the spring 62. The tip of the gate actuator 60 comes into contact with the cutout 58. The contact pulls the flag piece 64 out of the photo sensor 65. Extracting the flag piece 64 allows the photo-diode 67 to receive light from the light-emitting diode 66, thereby turning on the photo sensor 65. This signals the detection of a correct entry of the cartridge 30 into the stacker 70. In this state, the tip of the gate actuator 60 is kept in contact with the cutout 58 of the cartridge 30 by the spring 62. Thus the cartridge 30 is locked as entered into the stacker 70. As described, the gate sensor mechanism 78 of the embodiment is capable of detecting a faulty entry of any one of a plurality of (e.g., 10) cartridges 30 entered at a time.

Figure 13:
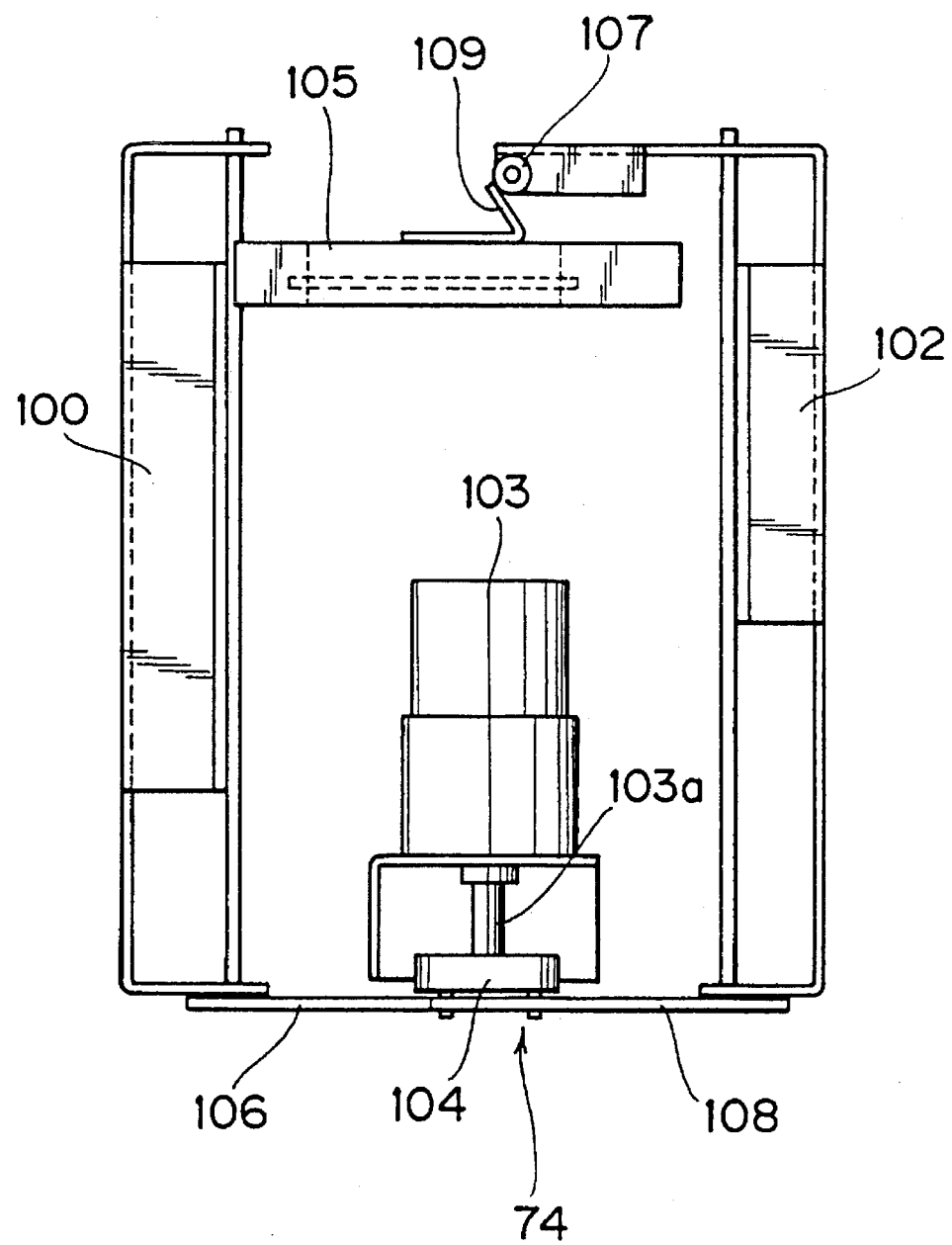
FIG. 13 is a schematic plan view of a hook mechanism.

The constitution and operation of the hook mechanism 74 will now be described with reference to FIGS. 13, 14A and 14B. The hook mechanism 74 comprises a front hook 100 and a rear hook 102 whose bottoms are attached pivotably to brackets 96 and 98 fixed to an apparatus frame 84. The tips 100a and 102a of the front and rear hooks 100 and 102 are bent as illustrated. As show in FIG. 13, the hook mechanism 74 has a side hook 105 to which a bracket 109 is fixed. The bracket 109 can come into contact with a roller 107 attached to the rear hook 102. FIG. 13 shows the state in which the hooks 100, 102 and 105 are all closed. The side hook 105 is closed by the push from the rear hook 102.

Figure 14A:
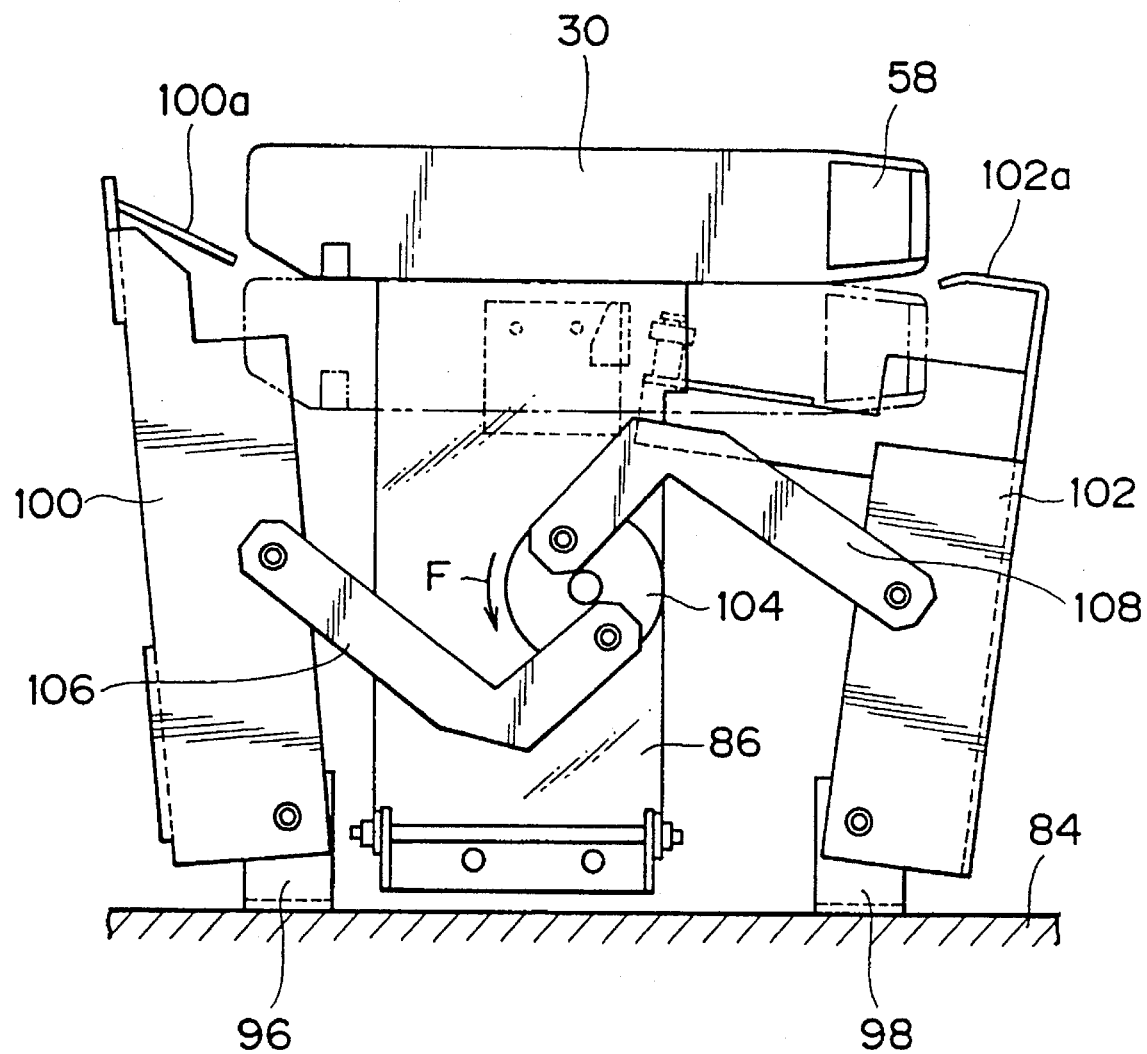
FIGS. 14A and 14B are schematic front views of the hook mechanism in the cartridge entry unit, FIG. 14A showing the hooks being opened, FIG. 14B depicting the hooks being closed.
Figure 14B:
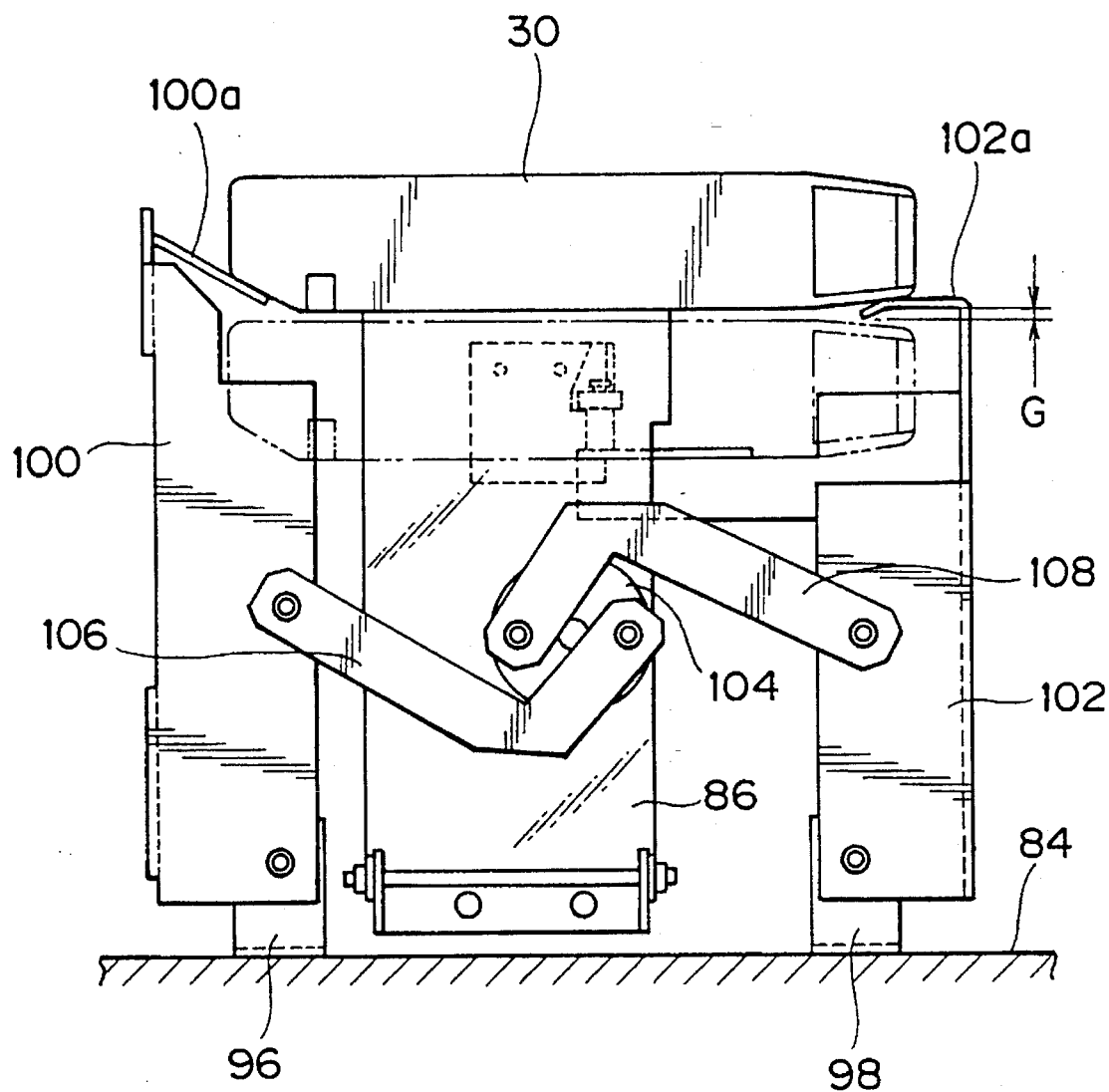

As depicted clearly in FIGS. 14A and 14B, one end of an L-shaped arm 106 is attached pivotably to the front hook 100; one end of an L-shaped arm 108 is also attached pivotably to the rear hook 102. The other ends of the arms 106 and 108 are attached pivotably to eccentrically positioned shafts on a rotor 104. The rotor 104 is fixed to an output shaft 103a of a hook motor 103, as depicted in FIG. 13.

FIG. 14A portrays the front hook 100 and rear hook 102 rotated in a direction in which the tips of the hooks move away from each other. With the roller 107 leaving the bracket 109, the side hook 105 also moves to an opened position. In this state, the hook motor 103 is activated to rotate the rotor 104 in the arrowed direction F of FIG. 14A. The rotation of the rotor 104 turns the front hook 100 and rear hook 102 via the arms 106 and 108 so that the tips of the hooks move closer to each other. As shown in FIG. 14B, the tips 100a and 102a of the front hook 100 and rear hook 102 are inserted between the lowest-positioned cartridge 30 and the next-lowest cartridge 30. The stacked cartridges above the lowest-positioned cartridge 30 are raised therefrom by the hooks by about 2 mm. In this manner, the lowest cartridge 30 is separated from the remaining cartridges.

The constitution and operation of the stage mechanism 72 will now be described in detail together with the operation of the hook mechanism 74 with reference to FIGS. 15A and 15B. A bracket 86 fixed to the apparatus frame 84 supports a shaft 90 rotatably. A gear 88, fixed to the shaft 90, engages with a gear 87 coupled to a stage motor, not shown. A stage cam 92 is fixed eccentrically to the shaft 90. A cam follower 94 that follows the stage cam 92 is attached rotatably to the stage 82.

Figure 15A:
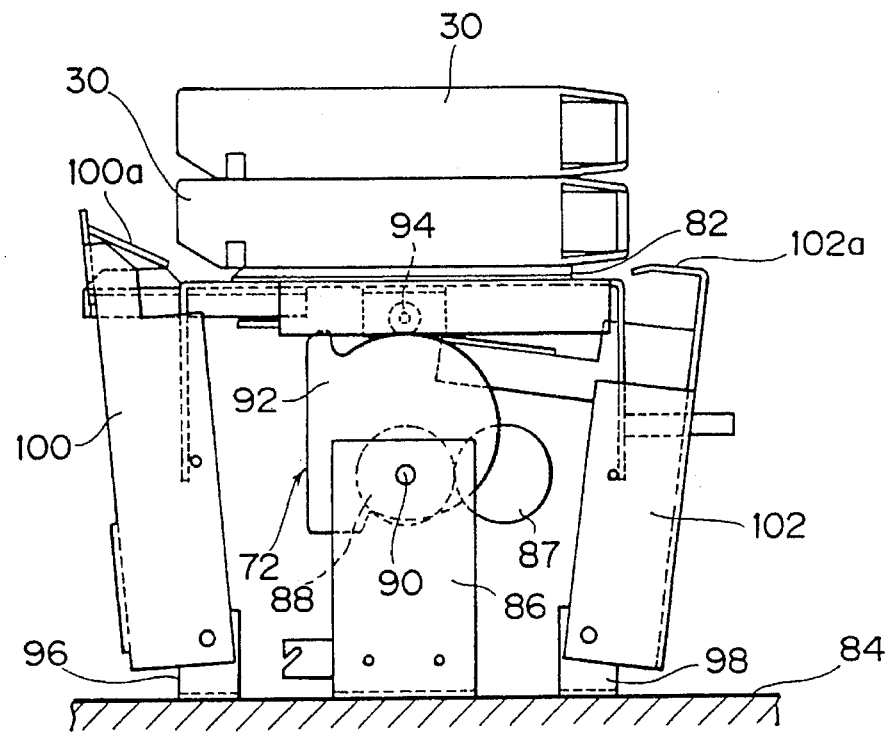
FIGS. 15A and 15B are schematic front views of the stage and hook mechanisms in the cartridge entry unit, FIG. 15A showing the stage at its highest position, FIG. 15B depicting the stage at its lowest position with the lowest-positioned cartridge being separated from the other cartridges.
Figure 15B:
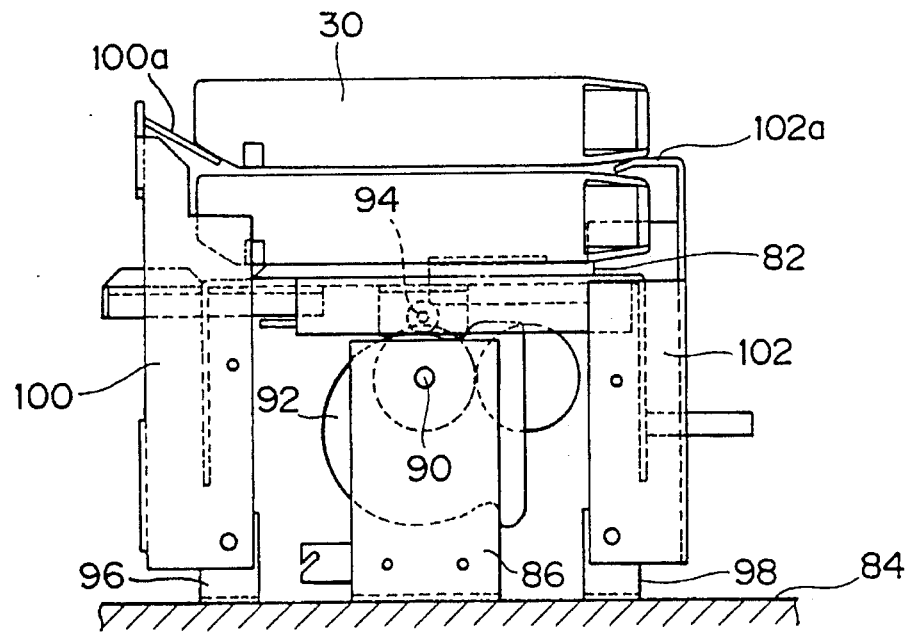

FIG. 15A shows the stage 82 at its highest position. The front hook 100, rear hook 102 and side hook 105 are all opened. These hooks are thus positioned away from the cartridges 30 placed on the stage 82. In this state, the stage 82 is pushed to its highest position by the stage cam 92. Activating the stage motor in this state causes the stage cam 92 to rotate counterclockwise via the gears 87 and 88, whereby the stage 82 starts coming down. The cartridges 30 placed on the stage 82 are also lowered along with the stage.

With the stage 82 lowered to its lowest position, the hook motor 103 is activated to rotate the rotor 104 counterclockwise, as depicted in FIG. 14A. This in turn rotates the front hook 100 and rear hook 102 so that their tips 100a and 102a move closer to each other. As shown in FIG. 15B, the tips 100a and 102a of the front hook 100 and rear hook 102 are inserted between the lowest-positioned cartridge and the second-lowest cartridge stacked on the stage 82. Then the second-lowest and higher cartridges are lifted by about 2 mm, as described, whereby the lowest cartridge is separated from the remaining cartridges. The gap G of about 2 mm is needed by the feeder mechanism 76 to transport the separated cartridge 30, as will be described later. If a sufficient gap G is not obtained, the lowest-positioned cartridge 30, after separation from the other cartridges, will interfere with the cartridge immediately above when transported by the feeder mechanism 76.

The lowest cartridge 30 thus separated is gripped, with its orientation unchanged, by the feeder mechanism 76. The feeder mechanism 76 transports the cartridge 30 to the appropriate position for delivery to the accessor 20. The constitution and operation of the feeder mechanism 76 will now be described with reference to FIGS. 16A and 16B. L-shaped catch arms 114 and 116 are attached with pins 115 and 117 pivotably to brackets 110 and 112, respectively. One end of the catch arm 114 is coupled rotatably with a pin 118 to one end of the catch arm 116. A plurality of feed rollers 120 are attached rotatably to the top of the catch arm 114; a plurality of feed rollers 122 are also attached rotatably to the top of the catch arm 116. An endless belt 130 is threaded around the feed rollers 122. The catch arm 116 is equipped with a feed motor 124. Activating the feed motor 124 rotates one of the feed rollers 122 via gears 126 and 128.

An actuator member 132 is coupled to the catch arm 116. The tip of the actuator member 132 has two engagement grooves 132a and 132b. The bottom of a support member 134 has an engagement groove 134a. The two ends of a coil spring 136 are engaged with the engagement grooves 132a and 134a. A self-holding type feeder solenoid 138 is attached to the support member 134. A coil spring 140 is disposed between a plunger 139 of the feeder solenoid 138 and the engagement groove 132b of the actuator member 132.

When the solenoid 138 is not magnetized, the actuator member 132 is pulled downward by the coil spring 136. This causes the two catch arms 114 and 116 to rotate away from each other. As shown in FIG. 16A, the roller 120 and feed belt 130 are not in contact with the sides of the cartridge 30. In this state, momentarily magnetizing the self-holding type solenoid 138 causes the plunger 139 to spread the coil spring 140 and to raise the actuator member 132 against the force of the coil spring 136. That in turn rotates the two catch arms 114 and 116 toward each other. As depicted in FIG. 16B, the feed roller 120 and feed belt 130 come in elastic contact with the sides of the cartridge 30. In this state, activating the feed motor 124 rotates the feed belt 130 to transport the cartridge 30 to the appropriate position for delivery to the accessor 20.

Figure 17A:
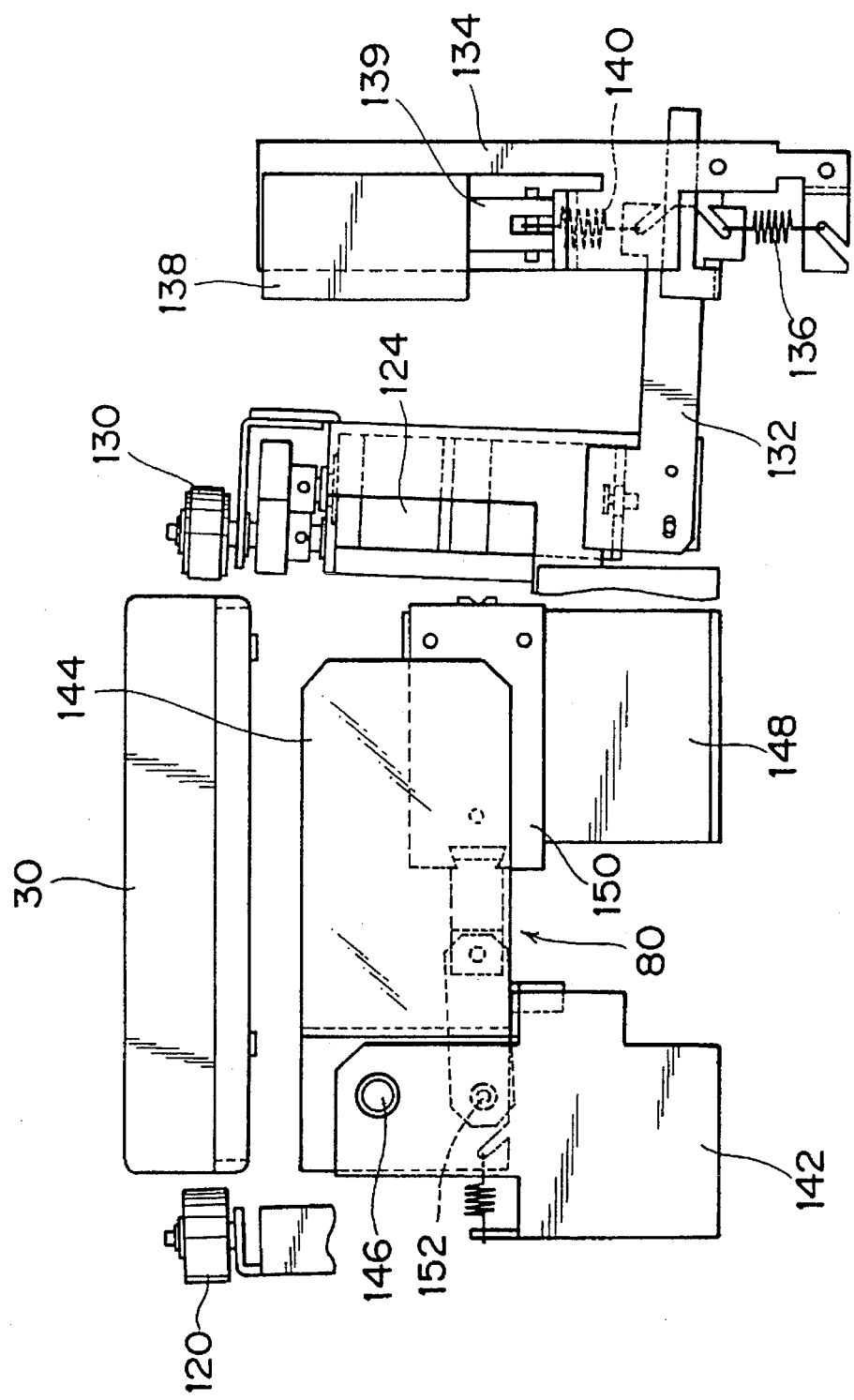

While the cartridge 30 is being transported to the appropriate position for delivery to the accessor 20, an excessively driven feed motor 124 can cause the cartridge to fall off the feeder mechanism 76. Such fall is prevented by the shutter mechanism 80 that positions the cartridge 30 so as to ensure delivery to the accessor 20. The constitution and operation of the shutter mechanism 80 will now be described with reference to FIGS. 17A and 17B. A shutter 144 is attached pivotably to a shaft 146 of a bracket 142. A bracket 148 is equipped with a solenoid 150. The shutter 144 is coupled pivotably to the solenoid 150 with a pin 152. FIG. 17A depicts the shutter 144 as it is lowered after the solenoid 150 is demagnetized. FIG. 17B shows the shutter 144 rotated counterclockwise by a magnetized solenoid 150 to block the transport path of the cartridge 30.

The solenoid 150 is magnetized at approximately the same time that the feed motor 124 is activated. The magnetized solenoid 150 turns the shutter 144 counterclockwise to block the transport path of the cartridge 30. Halfway through the transport path of the feeder mechanism 76 is a sensor, not shown, which detects passage of the cartridge 30. A predetermined time (e.g., 0.5 sec.) after passage of the cartridge 30 is detected by the sensor, the feed motor 124 is deactivated. During that time, the cartridge 30 collides with the shutter 144, slips for a while and stops there. Thereafter, the solenoid 150 is demagnetized, and the shutter 144 is rotated back to its lowered position that does not block the transport path of the cartridge 30, as shown in FIG. 17A.

Until the accessor 20 comes to fetch the cartridge 30, the feeder mechanism 76 keeps the cartridge 30 gripped. The cartridge 30 is held gripped as follows. First, the self-holding type solenoid 138 is momentarily magnetized. This raises the plunger 139 and keeps it there. Then the feed roller 120 and endless belt 130 laterally grip the cartridge in elastic fashion. When the accessor 20 has gripped the cartridge 30, the self-holding type solenoid 138 is supplied with a current that flows in the direction opposite to that used when the plunger 139 is attracted. The flow of the current releases the plunger 139 from its attracted position. With the cartridge 30 thus disengaged from the feeder mechanism 76, the accessor 20 grips the cartridge 30 and brings it to the appropriate cell of the cell drum 12.

Figure 18:
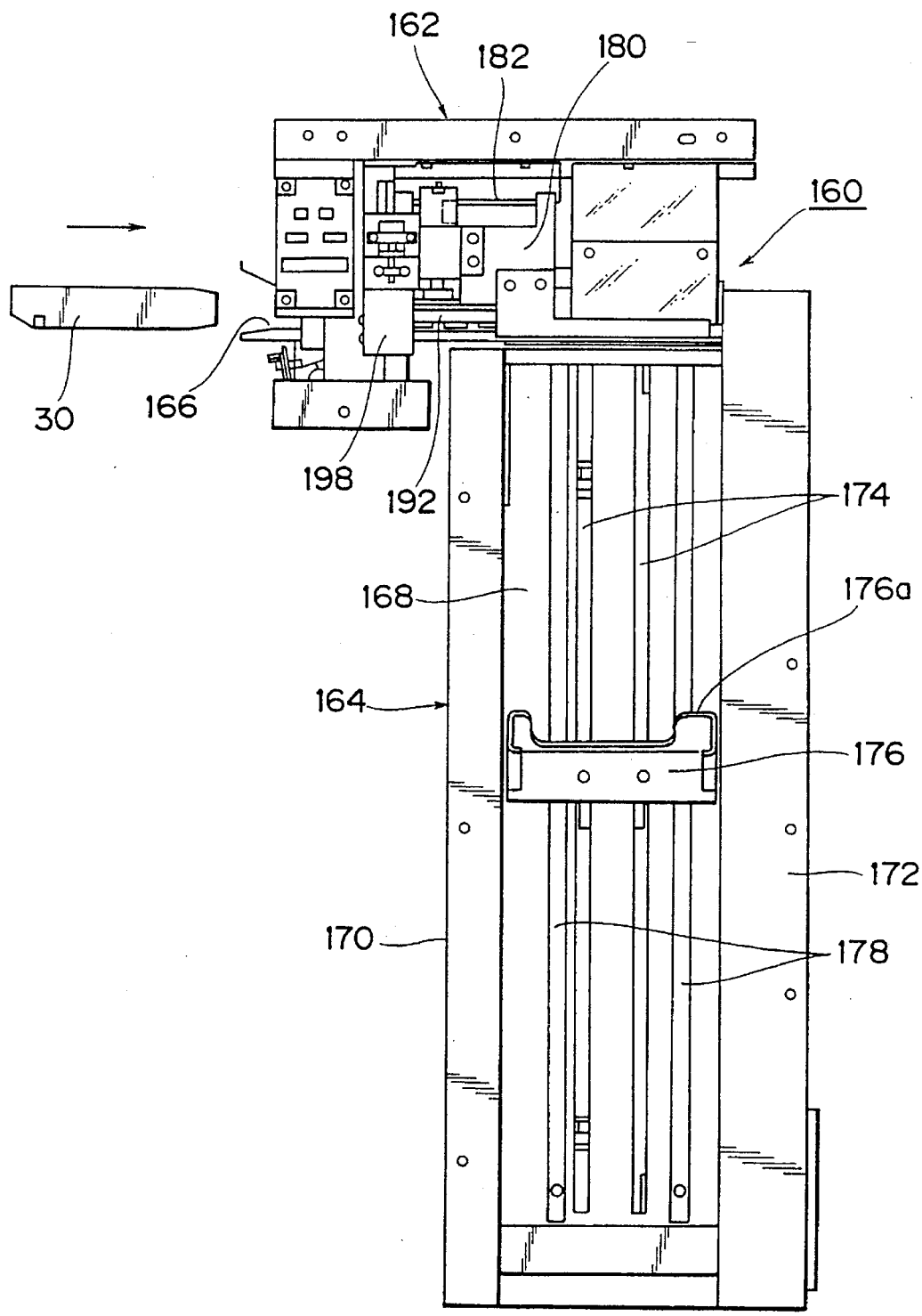
FIG. 18 is a front view of an automatic cartridge exit unit.

How an embodiment of the automatic magnetic tape cartridge exit unit is practiced will now be described with reference to FIGS. 18 through 23. The automatic magnetic tape cartridge exit unit 160 is communicated to the cartridge exit opening 8 shown in FIG. 1. FIG. 18 is a front view of the automatic cartridge exit unit 160 in its entirety. The automatic cartridge exit unit 160 comprises a cartridge transport mechanism 162 and a tray assembly 164 disposed under the cartridge transport mechanism 162. The cartridge transport mechanism 162 receives the magnetic tape cartridge 30 delivered by the accessor 20, transports the cartridge 30 to an appropriate position and releases it there. The magnetic tape cartridge 30 is inserted into the cartridge transport mechanism 162 through an insertion opening 166.

The tray assembly 164 includes a rear wall 168 and a pair of side walls 170 and 172. A tray 176 on which to receive the magnetic tape cartridge 30 is connected to a tray driving mechanism 205, to be described later, via a pair of longitudinal slits 174 formed on the rear wall 168. The magnetic tape cartridge 30 is placed on a cartridge-carrying surface 176a of the tray 176. The rear wall 168 has a pair of projected guides 178 that extend longitudinally.

Figure 19:
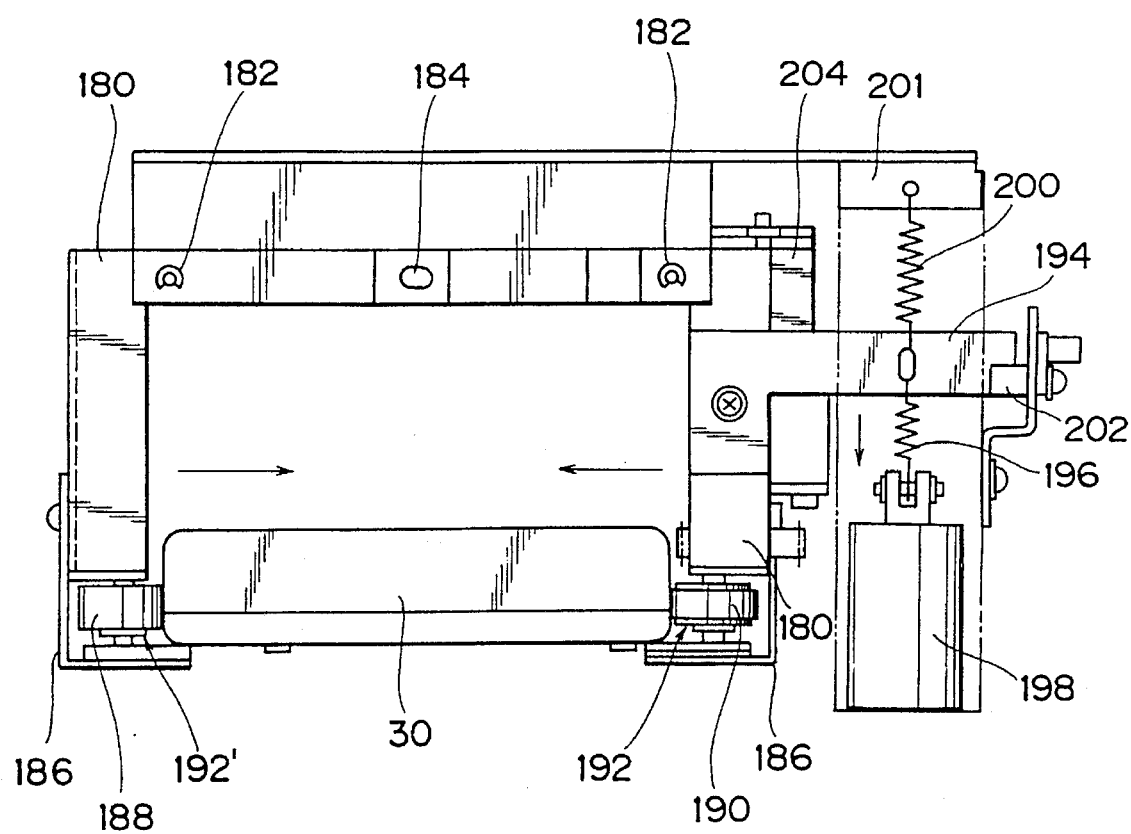
FIG. 19 is a side view of a cartridge transport mechanism in the automatic cartridge exit unit as it grips a cartridge.

The constitution and operation of the cartridge transport mechanism 162 will now be described with reference to FIGS. 19 and 20. A pair of L-shaped catch arms 180 are attached pivotably to shafts 182 that are disposed horizontally. One end of one catch arm 180 is coupled rotatably to one end of the other catch arm 180 with a pin 184. The other ends of the two catch arms 180 are each equipped with a guide bracket 186 that extends horizontally. The guide brackets 186 are in turn provided with feed mechanisms 192 and 192' which feed the magnetic tape cartridge 30. The right-hand side feed mechanism 192 comprises a plurality of feed rollers 188 and an endless belt 190 threaded around these rollers 188. The left-hand side feed mechanism 192' includes only a plurality of feed rollers 188 attached rotatably to the guide bracket 186.

One catch arm 180 is coupled to an actuator member 194. The actuator member 194 is connected to one end of a push spring 196 as well as to one end of a release spring 200, as illustrated. The other end of the push spring 196 is coupled to a self-holding type solenoid 198 that drives the catch arms 180. The other end of the release spring 200 is fixed to a frame 201 of the cartridge transport mechanism 162. Magnetizing the solenoid 198 rotates the two catch arms 180 around the horizontal shafts 182 toward each other. This causes the feed mechanisms 192 and 192' mounted at the tips of the catch arms 182 to be pressed against the sides of the magnetic tape cartridge 30, as depicted in FIG. 19.

When the solenoid 198 is demagnetized, the release spring 200 pulls up the actuator member 194, rotating the catch arms 180 around the horizontal shafts 182 away from each other. This causes the feed mechanisms 192 and 192' to release the magnetic tape cartridge 30. Adjacent to the actuator member 194 is a sensor 202 that detects the motion of the catch arms 180. An output signal from the sensor 202 permits detection of the opened or closed state of the catch arms 180. A feed motor 204 is provided to drive the feed mechanism 192.

Figure 20:
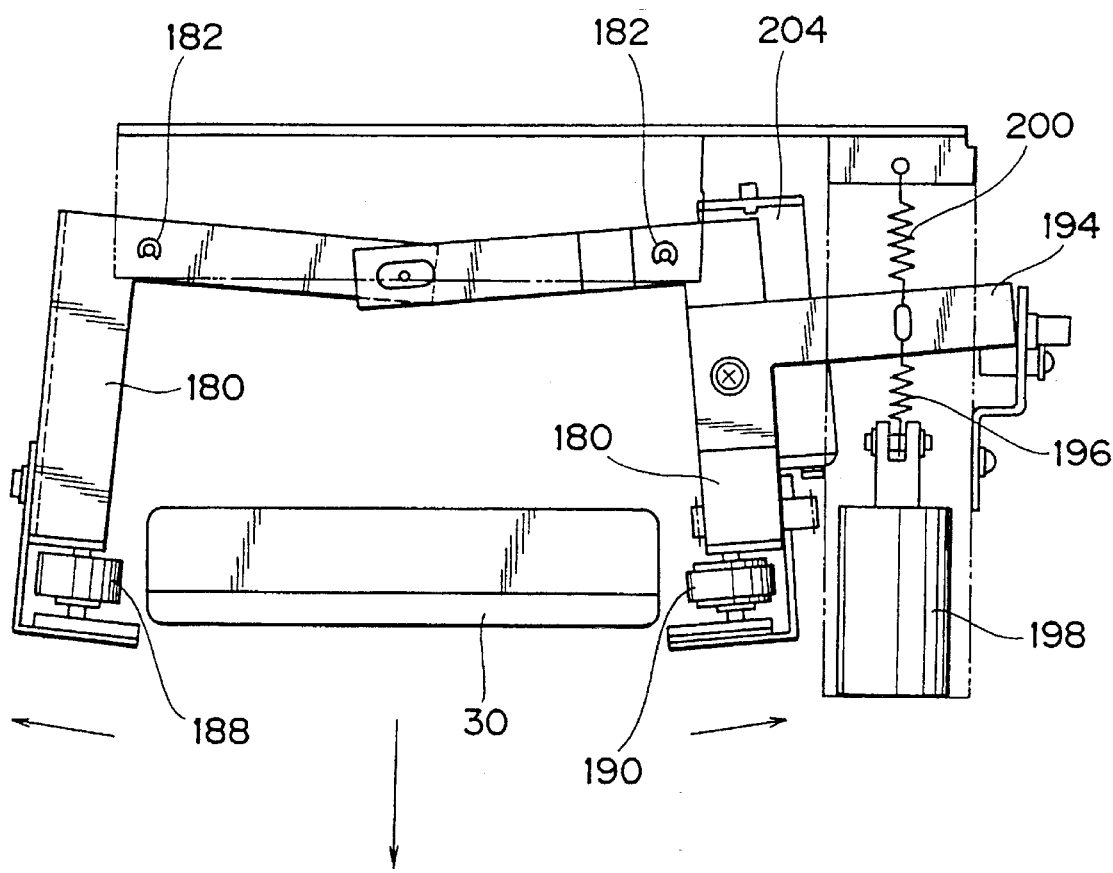
FIG. 20 is a side view of the cartridge transport mechanism as it releases a cartridge.

With the magnetic tape cartridge 30 inserted in the insertion opening 166, the solenoid 198 is demagnetized, and the two catch arms 180 are rotated away from each other, as illustrated in FIG. 20. When the magnetic tape cartridge 30 is inserted between the two feed mechanisms 192 and 192' through the insertion opening 166, the solenoid 198 is magnetized. This rotates the catch arms 180 toward each other, causing the feed mechanisms 192 and 192' mounted at the tips of the arms 180 to grip the sides of the magnetic tape cartridge 30 and keep it in an approximately horizontal state.

Then activating the feed motor 204 causes the feed mechanisms 192 and 192' to transport the magnetic tape cartridge 30 to the right in FIG. 18 until the exit position above the tray assembly 164 is reached. With the exit position attained, the feed mechanism 192 is deactivated and the solenoid 198 is demagnetized. This allows the release spring 200 to force the catch arms 180 into rotation away from each other, as depicted in FIG. 20. The magnetic tape cartridge 30 then falls downward and into the tray assembly 164.

Figure 21:
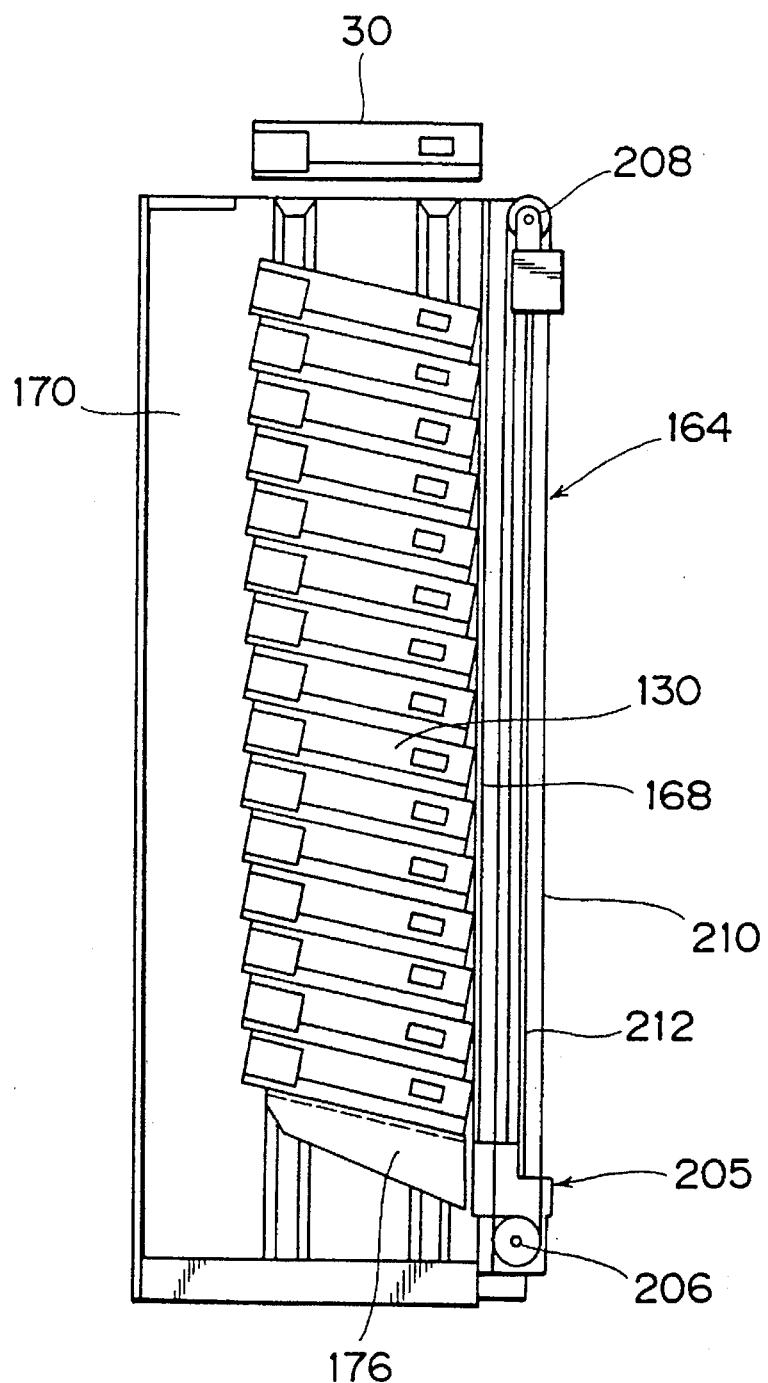
FIG. 21 is a longitudinal sectional view of a tray assembly in the automatic cartridge exit unit.

FIG. 21 is a longitudinal sectional view of the tray assembly 164. As illustrated, a frame 212 is furnished integrally on the rear wall 168. The bottom and the top of the frame 212 have a driving pulley 206 and a driven pulley 208, respectively, both rotatably disposed. An endless belt 210 is threaded around the driving pulley 206 and driven pulley 208. The tray 176 is fixed to the endless belt 210 with a bracket. When the endless belt 210 is rotated by the driving mechanism 205, the tray 176 moves up and down along the rear wall 168.

Figure 22:
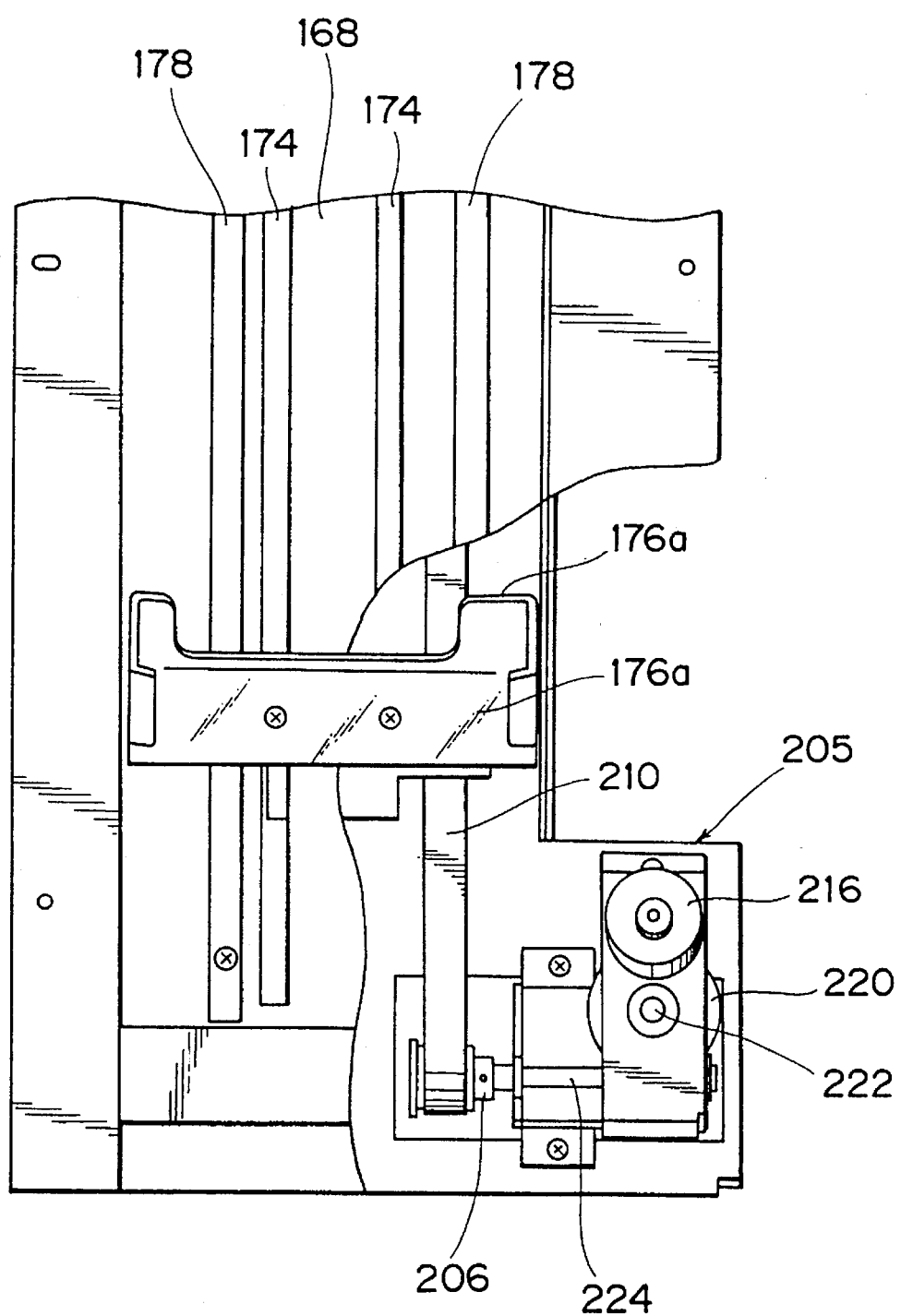
FIG. 22 is a partially broken front view of a tray driving mechanism in connection with the tray assembly.
Figure 23:
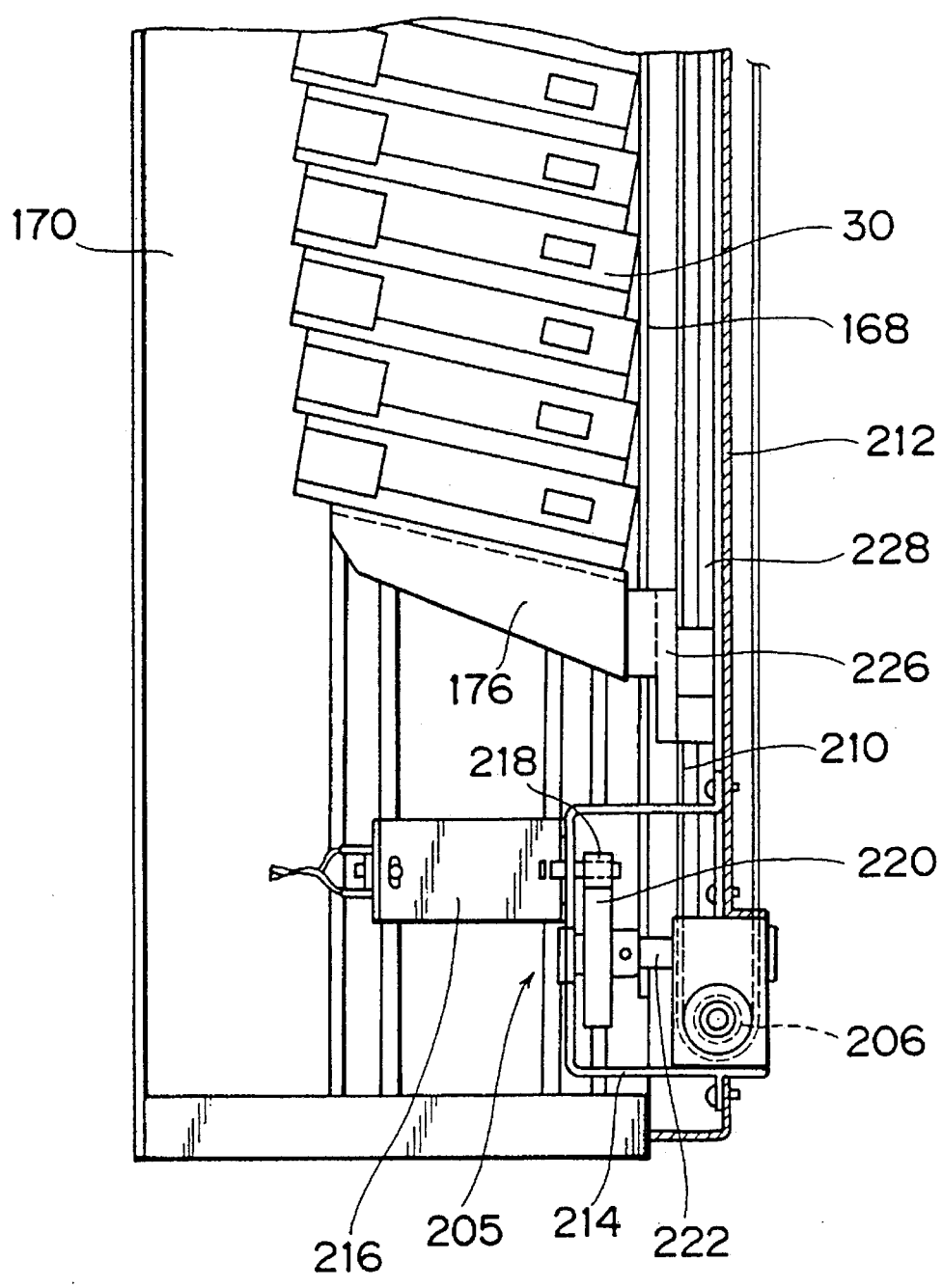
FIG. 23 is a partially broken longitudinal sectional view of the tray driving mechanism in connection with the tray assembly.

Referring now to FIGS. 22 and 23, the tray driving mechanism 205 includes a motor 216 attached to a bracket 214 fixed to the frame 212. A gear 218, fixed to the output shaft of the motor 216, engages with a gear 220 fixed to a shaft 222. A worm gear, not shown, is attached fixedly to the shaft 222. The worm gear engages with a worm wheel fixed to a shaft 224. Activating the motor 216 to rotate the shaft 222 turns the driving pulley 206 attached to one end of the shaft 224, whereby the endless belt 210 is rotated.

As shown in FIG. 23, the tray 176 is fixed to the endless belt 210 using a bracket 226. Driving the motor 216 moves the bracket 226 fixed to the tray 176 in a vertically sliding manner along a guide 228. The tray 176 has on its top the cartridge-carrying surface 176a. The tray 176 is attached slidingly to the rear wall, with the front end of the tray-carrying surface 176a disposed higher than the rear end thereof.

The tray 176 is initially in its raised position so as to receive the cartridge 30 released by the cartridge transport mechanism 162. The height of the cartridges 30 stacked on the tray 176 is detected by a sensor, not shown, so that the tray 176 is lowered gradually and correspondingly. Up to about 15 cartridges are to be stacked on the tray 176. Because the tray 176 is attached slidingly to the rear wall with the front end of its cartridge-carrying surface 176a elevated, the cartridges 30 placed on the tray 176 will not fall forward.

Figure 24:
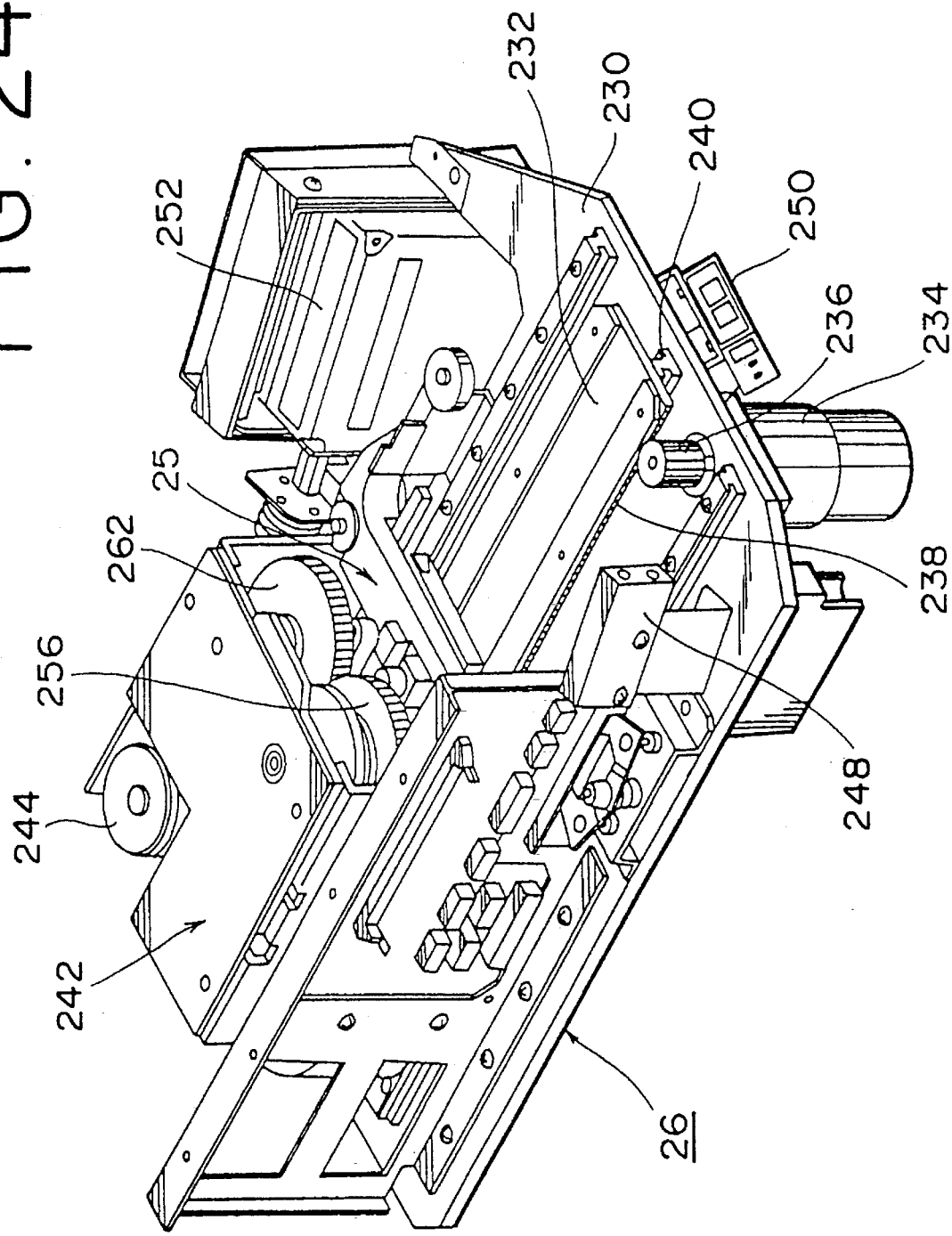
FIG. 24 is a perspective view of a hand mechanism.

The hand mechanism 26 will now be described in more detail with reference to FIG. 24. On a base 230, a tray 232 is provided slidingly. A pinion 236 engages with a rack 238 attached to the side of the tray 222. Activating a motor 234 rotates the pinion 236 to move the tray 232 slidingly along a guide rail 240 between a retracted position shown in FIG. 24 and an advanced position projecting in front of the base 230. A hand unit 242 is provided to grip the magnetic tape Cartridge. Activating a motor 244 moves the hand unit 242 slidingly between an advanced position and a retracted position. When the motor 244 is activated, a pinion not shown coupled to the motor 244 engages with a rack not shown attached to the base 230 to thereby cause the hand unit 242 to move between its advanced and retracted positions.

The hand unit 242 has at its tip the grip hand 25. The grip hand 25 is closed and opened between gripping and releasing positions to grip and release the magnetic tape cartridge. The closing and the opening of the grip hand 25 are effected by a driving mechanism comprising a motor, gear train and coil spring, to be described later. A photo sensor 248 for positional correction is used to position the hand mechanism 26 with respect to the cell drum 12 and magnetic tape drive unit 28. At the front end of the base 230 is a photo sensor 250 for detecting the presence of a cartridge. The base 230 also has a bar code reader 252 mounted thereto that reads a bar code attached to the side of each magnetic tape cartridge gripped by the grip hand 25.

A detailed constitution of the grip hand 25 and the operation of the driving mechanism thereof will now be described with reference to FIG. 25. The grip hand 25 comprises a first L-shaped finger 264 attached rotatably about a shaft 268 and a second L-shaped finger 266 attached rotatably about a shaft 270. The first and the second fingers 264 and 266 have at one end thereof gripping portions 264a and 266a, respectively, and have rotatably furnished rollers 286 at the other end thereof. The first and the second fingers 264 and 266 are attached so that their gripping portions 264a and 266a are oriented outward. The other ends 264b and 266b of these fingers, equipped with a roller 286 each, are positioned in such a way as to cross each other.

A shaft 254 is operatively coupled to a driving motor, not shown. A first gear 256 and a cylindrical block 258 are fixed to the shaft 254. The cylindrical block 258 is furnished with a coil spring 260 that biases the first gear 256 rotatably in the arrowed direction C indicated. The first gear 256 engages with a second gear 262. One end of a link 272 is attached pivotably with a pin 274 to the first finger 264; the other end of the link 272 is attached pivotably with a pin 276 to the first gear 256. One end of a link 278 is attached pivotably with a pin 280 to the second finger 266; the other end of the link 278 is attached pivotably with a pin 282 to the second gear 262.

In operation, deactivating the motor causes the biasing force of the coil spring 260 to rotate the first gear 256 counterclockwise, i.e., in the arrowed direction C. The rotation of the first gear 256 causes the second gear 252 to turn clockwise. As a result, the first finger 264 turns counterclockwise around the shaft 268 and the second finger 266 turns clockwise around the shaft 270, the two fingers coming into position for gripping the sides of a magnetic tape cartridge. In the gripping position, the grip hand 25 grips the sides of the cartridge elastically by the biasing force of the coil spring 260.

Activating the motor turns the first gear 256 to turn clockwise against the biasing force of the coil spring 260. This causes the second gear 262 to rotate counterclockwise. As a result, the first finger 264 turns clockwise around the shaft 268 and the second finger 266 turns counterclockwise around the shaft 270, the grip hand 25 coming into the illustrated position for releasing the cartridge. During transition from gripping position to releasing position of the grip hand 25, the rollers 285 at the ends of the first and the second fingers 264 and 266 push the magnetic tape cartridge into the magnetic tape drive unit 28 or into a cell 18, as will be described later in more detail.

Figure 26A:
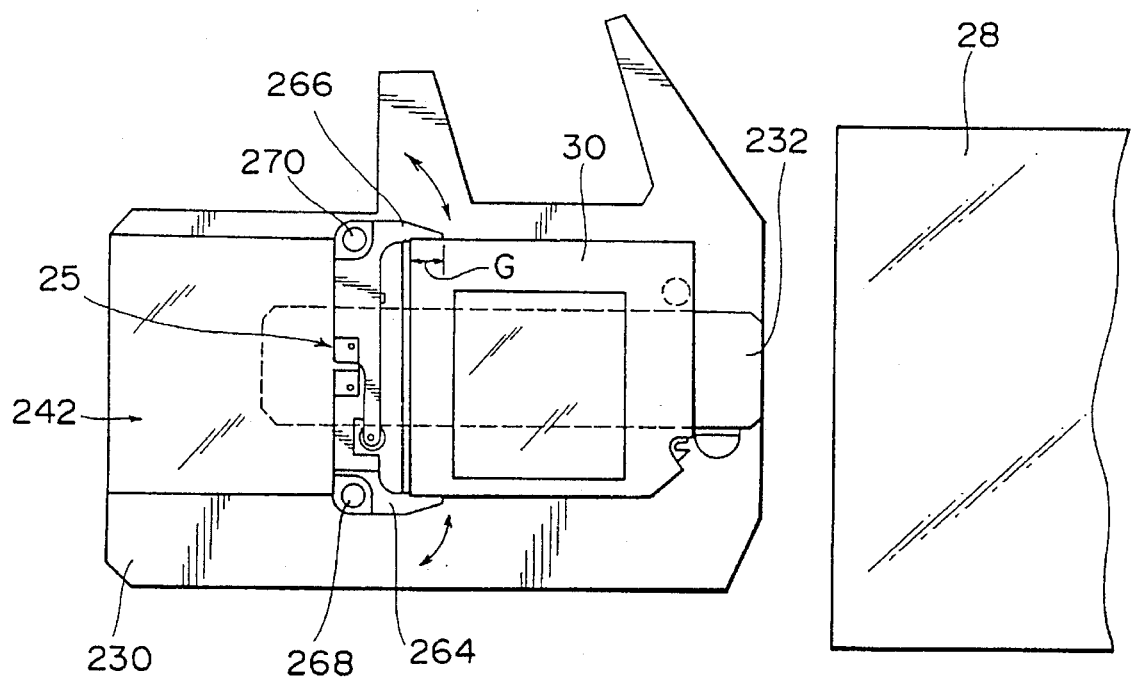
Figure 26B:
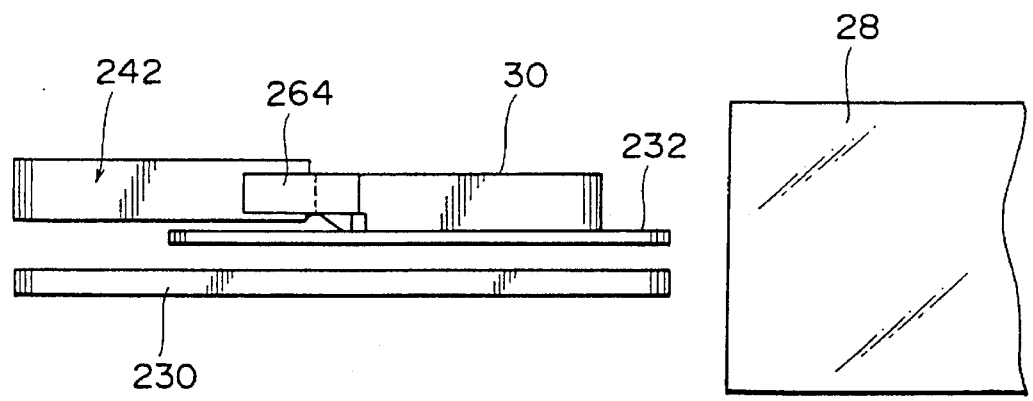

How a cartridge is inserted into the magnetic tape drive unit will now be described with reference to FIGS. 26A and 26B to 29A and 29B. The accessor 20 first extracts the magnetic tape cartridge 30 from a given cell of the cell drum 12 and, as shown in FIGS. 26A and 26B, transports the cartridge up to the front of the magnetic tape drive unit 28. During cartridge transportation, the grip hand 25 grips the rear sides of the cartridge 30 as indicated. The overhang distance G of the gripping portions over the cartridge 30 is preferably about 15 mm.

Figure 27A:
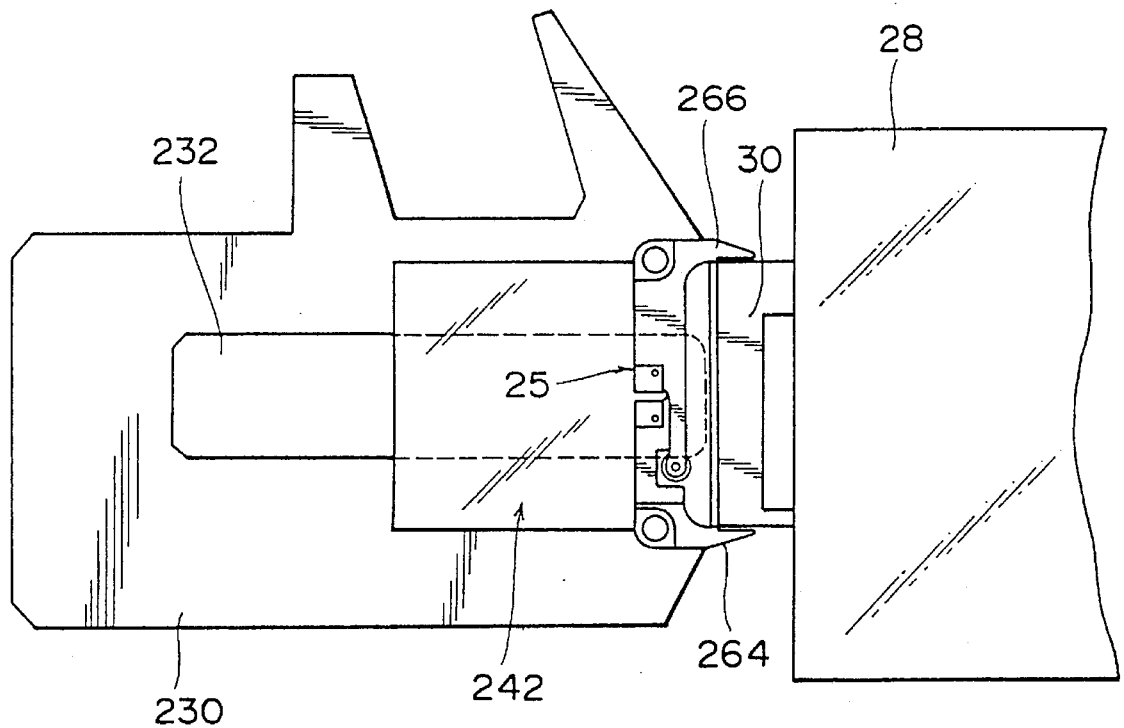
Figure 27B:
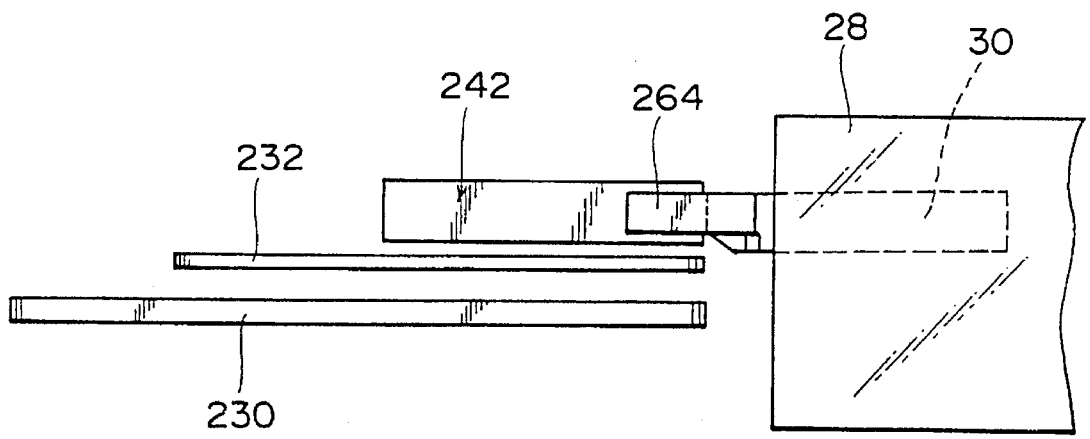

As depicted in FIGS. 27A and 27B, the hand unit 242 then advances with the grip hand 25 gripping the cartridge 30, inserting the cartridge into the entry opening of the magnetic tape drive unit 28. Without operational correction, the first and the second fingers 264 and 266 of the grip hand 25 would collide with the entry opening of the magnetic tape drive unit 28 and would be unable to insert the cartridge 30 all the way into the unit 28.

Figure 25:
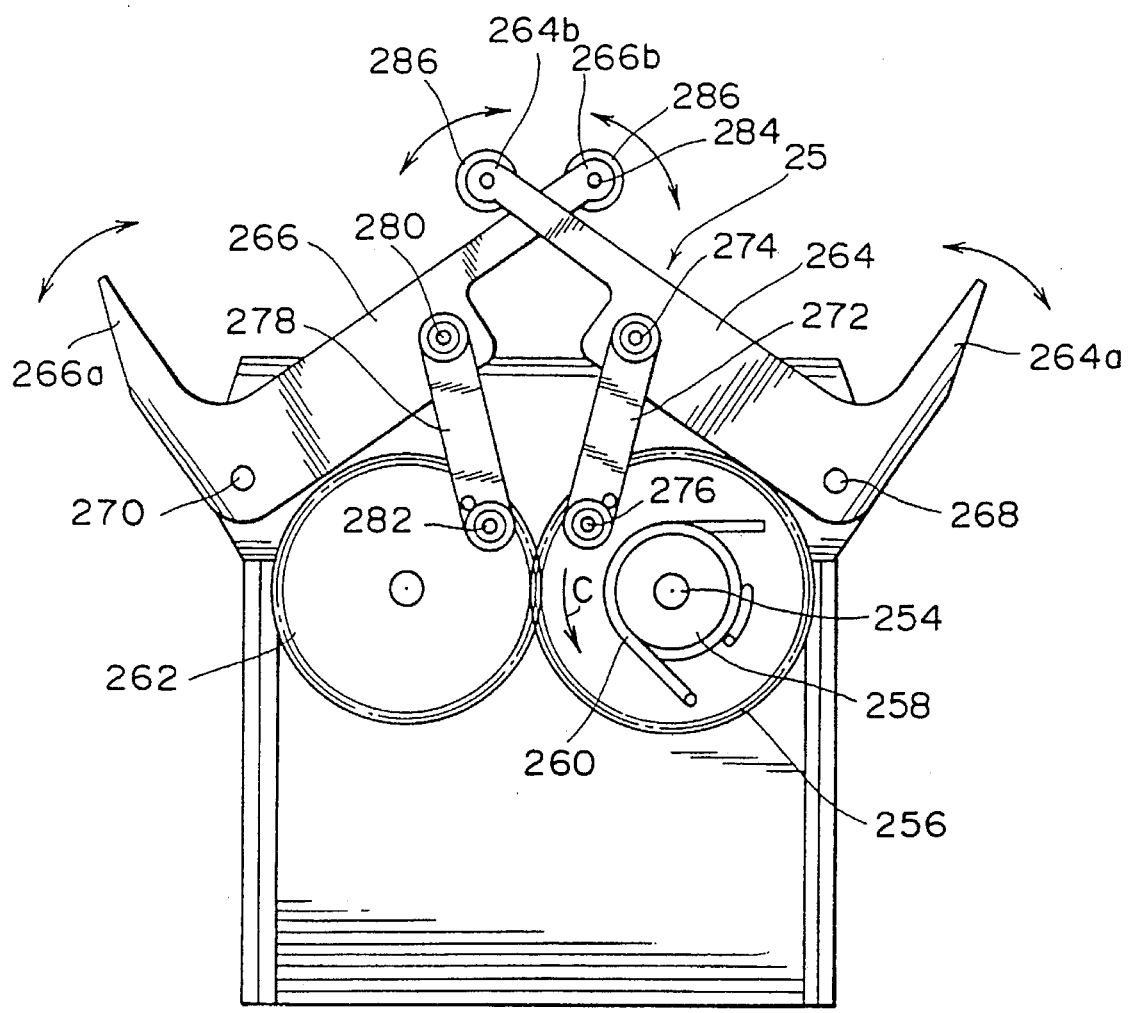
FIG. 25 is a plan view of a grip hand and a mechanism for driving the same.
Figure 28A:
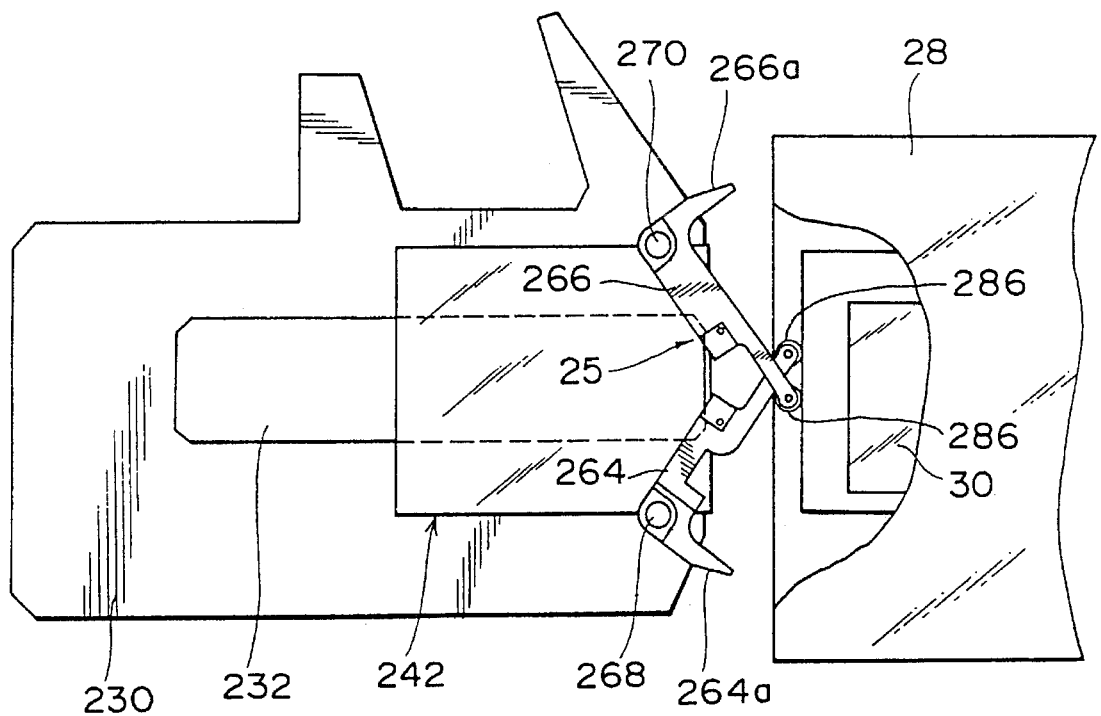
Figure 28B:
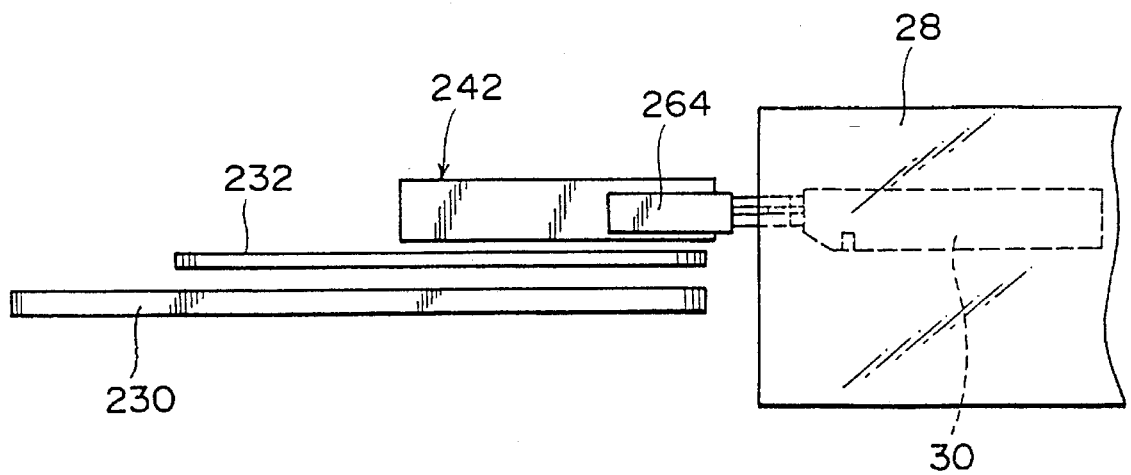

Instead, the cartridge pushing motor is activated to turn the gear 256 of FIG. 25 clockwise against the biasing force of the coil spring 260. This causes the first finger 264 to rotate clockwise around the shaft 268. The gear 262 engaged with the gear 256 is rotated thereby counterclockwise, and the second finger 266 turns counterclockwise around the shaft 270. This causes the grip hand 25 to open and allows the rollers 286 at the tips of the first and the second fingers 264 and 266 to move forward to contact the rear end of the cartridge 30, thereby pushing the cartridge all the way into the magnetic tape drive unit 28, as illustrated in FIGS. 28A and 28B. During the pushing motion, the cartridge 30 is moved forward by the push applied at two points of its rear end, each point being distanced substantially equally from the center line of the cartridge. This makes it possible to push cartridge 30 into the magnetic tape drive unit 28 in a stable manner.

Figure 29A:
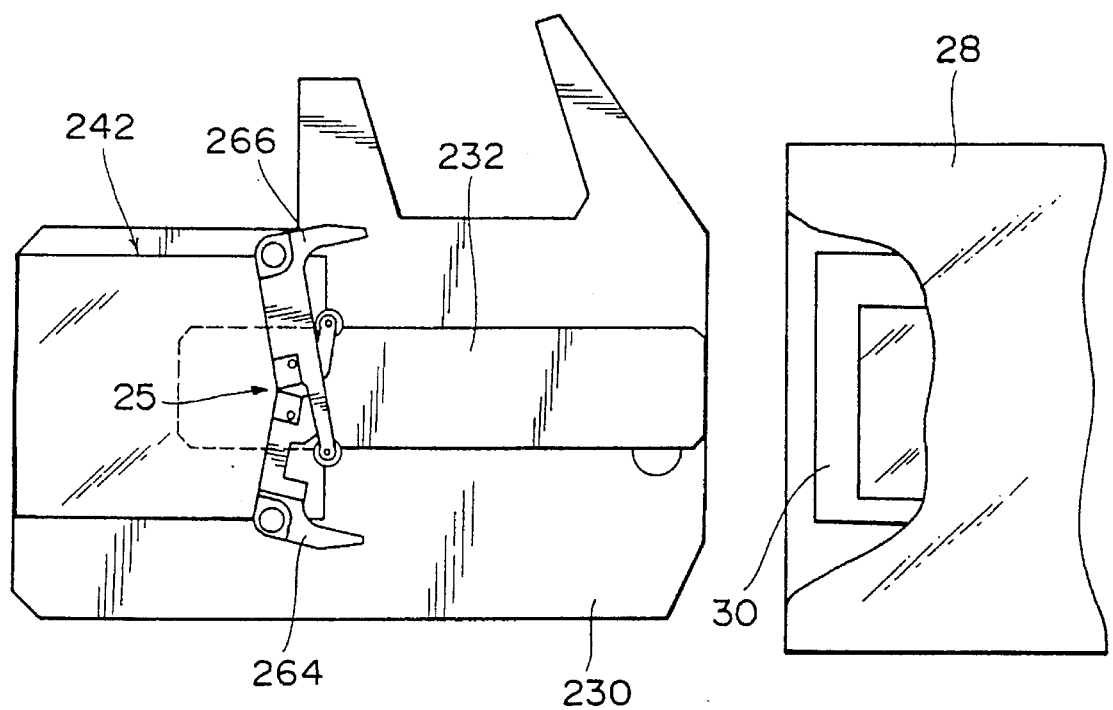
Figure 29B:
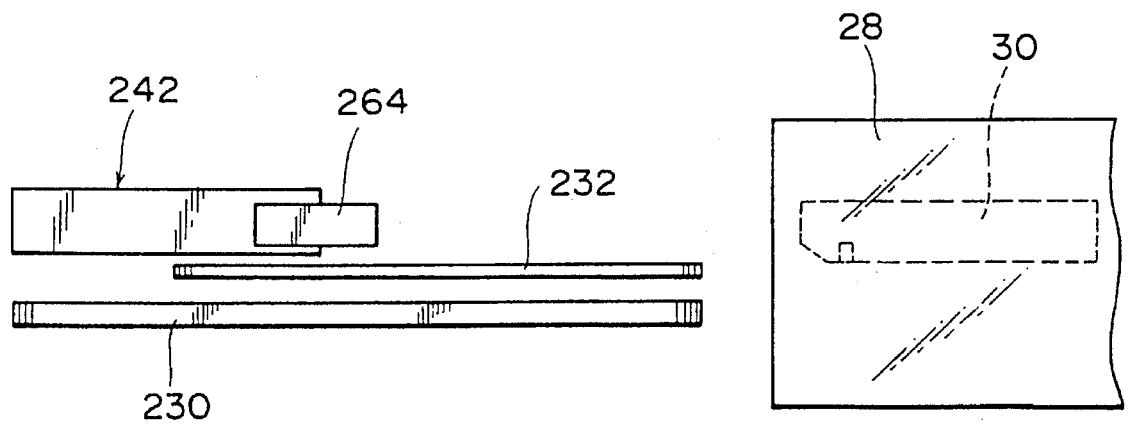

With the cartridge 30 fully inserted into the magnetic tape drive unit 28, the grip hand 35 closes and the hand unit 242 moves back to its retracted position, as indicated in FIGS. 29A and 29B. This completes the operation of pushing the cartridge 30 into the magnetic tape drive unit 28.

If irregularities in assembling have disrupted the positional relationship among the accessor 20, cell drum 12 and magnetic tape drive unit 28, the push by the first and the second fingers 264 and 266 may not be enough for pushing the cartridge 30 all the way in. In such a case, the hand unit 242 is allowed to advance further in the cartridge-pushing state of FIGS. 28A and 28B until the cartridge 30 is fully inserted. As is clear from the description above and from the figures attached, the tray 232 is kept in its retracted position while the cartridge 30 is being pushed into the magnetic tape drive unit 28.

How the cartridge 30 is placed into a cell 18 of the cell drum 12 will now be described with reference to FIGS. 30A and 30B to 33A and 33B. As mentioned, the overhang distance G of the grip hand 25 in gripping condition over the rear sides of the cartridge 30 is about 15 mm. Because the distance G is very short compared with the entire length of the cartridge 30, the cartridge 30 gripped by the grip hand 25 can fall forward as it enters the cell if left unsupported. Such fall is prevented by use of the tray 232. That is, when the cartridge 30 is to be inserted into the cell 18, the tray 232 is moved forward so as to support the cartridge from below.

Figure 30A:
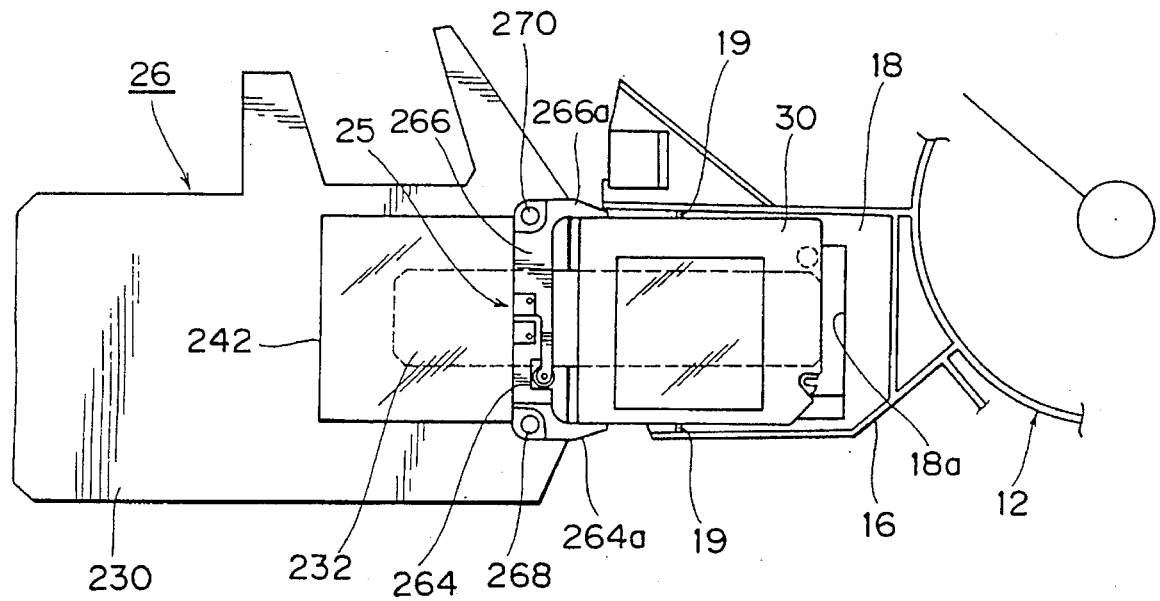
Figure 30B:
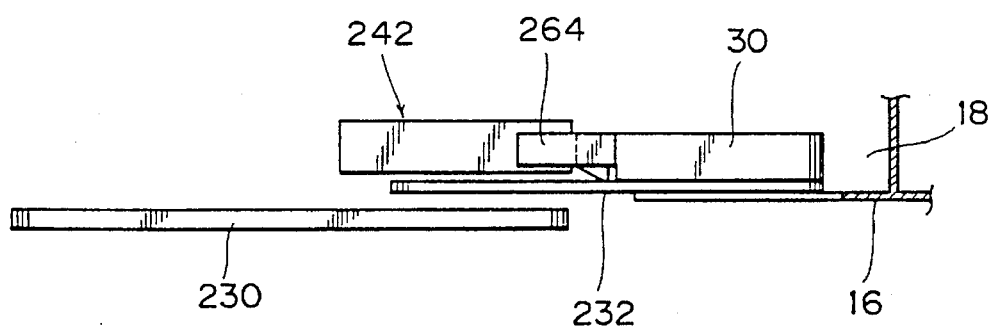

The hand mechanism 26 of the accessor 20 is positioned in front of the target cell 18 into which to place the cartridge 30. Then as shown in FIGS. 30A and 30B, the tray 232 is moved forward to enter the cell 18 all the way. After this, the hand unit 242 is allowed to advance to push the cartridge 30 into the cell 18. Without operational correction, the first and the second fingers 264 and 266 of the grip hand 25 would collide with the entrance to the cell 18 and would be unable to insert the cartridge 30 all the way into the cell 18.

Figure 31A:
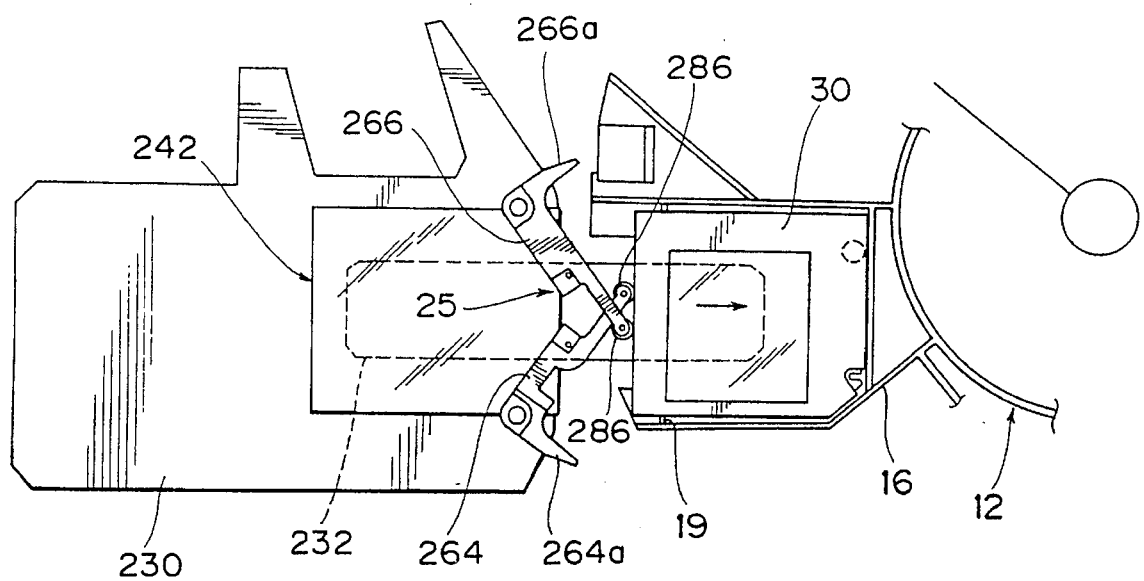
Figure 31B:
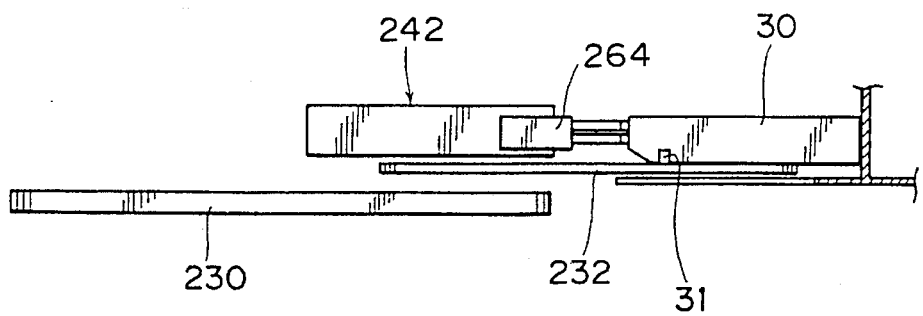

Instead, as depicted in FIGS. 31A and 31B, the driving mechanism of FIG. 25 drives the grip hand 25 to move forward the rollers 286 attached to the first and the second fingers 264 and 266. The rollers 286 push the rear end of the cartridge 30 to insert the cartridge all the way into the cell 18. With the cartridge 30 fully inserted in the cell 18, a pair of ridges 19 provided on the cell 18 engage with grooves 31 of the cartridge 30. The engagement keeps the cartridge 30 from getting dislodged from the cell 18 by vibration or other disturbances.

Figure 32A:
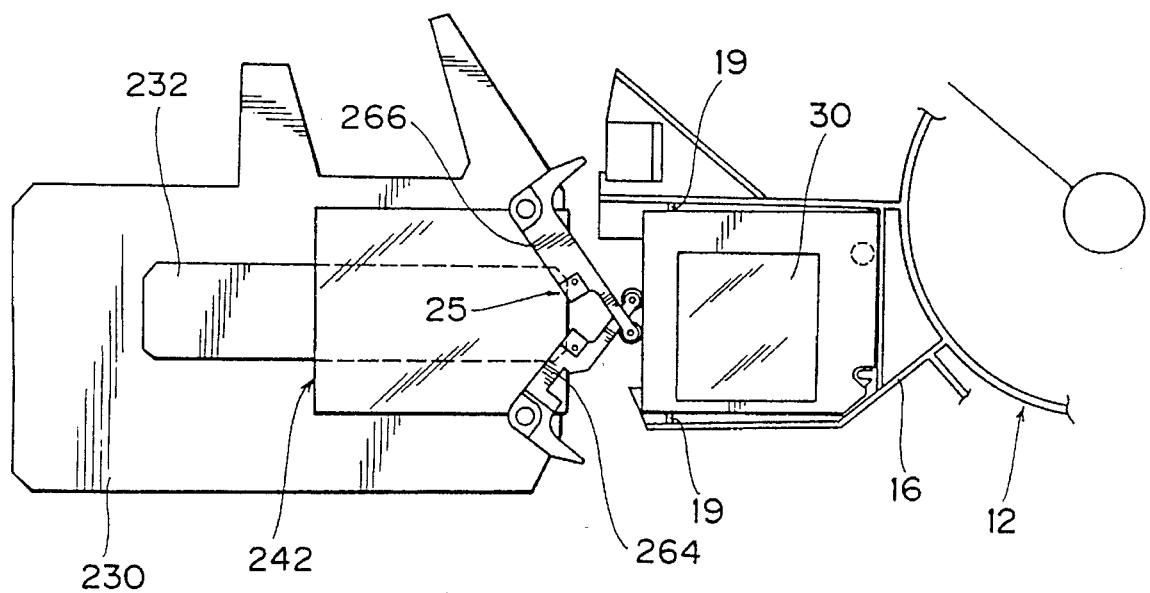
Figure 32B:
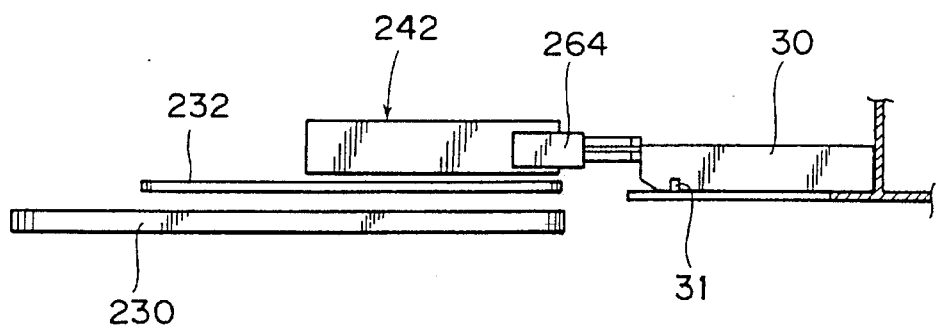
Figure 33A:
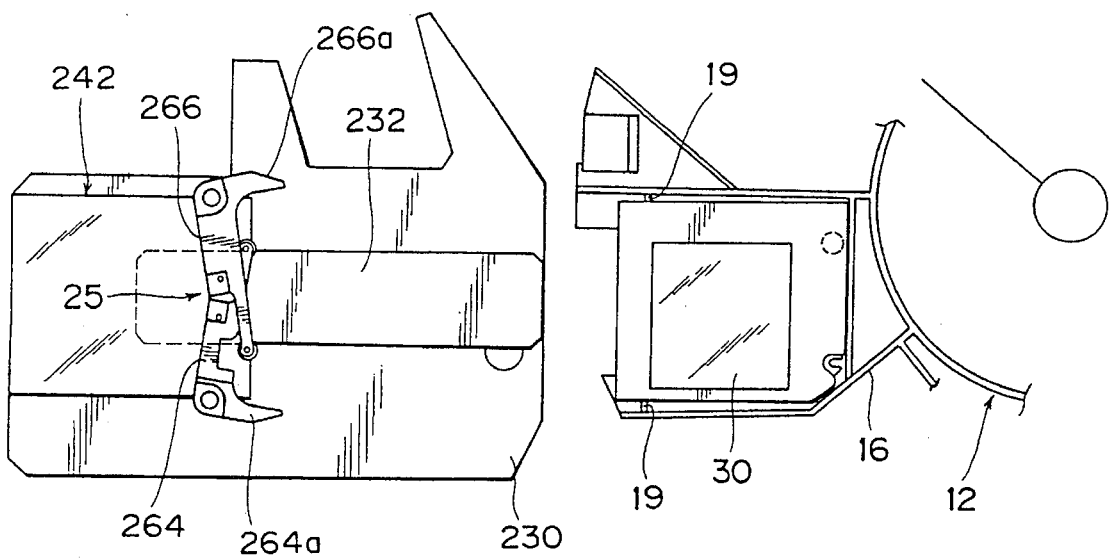
Figure 33B:
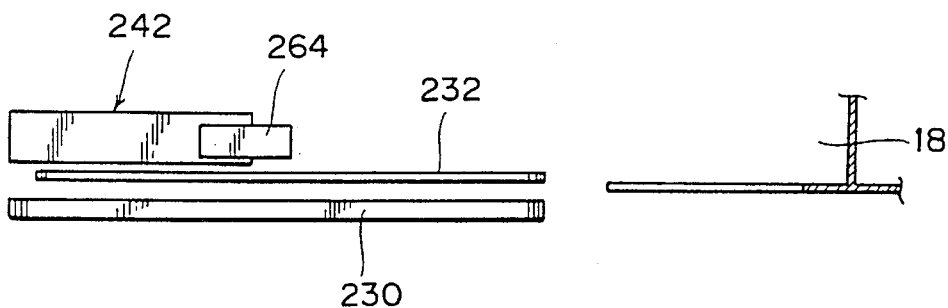

After insertion of the cartridge into the cell 18 is completed, the tray 232 is brought back to its retracted position, as illustrated in FIGS. 32A and 32B. With the tray 232 retracted, the grip hand 25 closes and the hand unit 242 returns to its retracted position, as shown in FIGS. 33A and 33B. This completes the operation of inserting the cartridge 30 into the target cell 18.

If irregularities in assembling have disrupted the positional relationship among the accessor 20, cell drum 12 and magnetic tape drive unit 28, the push by the first and the second fingers 264 and 266 in FIGS. 31A and 31B may not be enough for pushing the cartridge 30 all the way into the cell 18. In such a case, the hand unit 242 is allowed to advance further in the cartridge-pushing state of FIGS. 31A and 31B until the cartridge 30 is fully inserted.

Figure 34A:
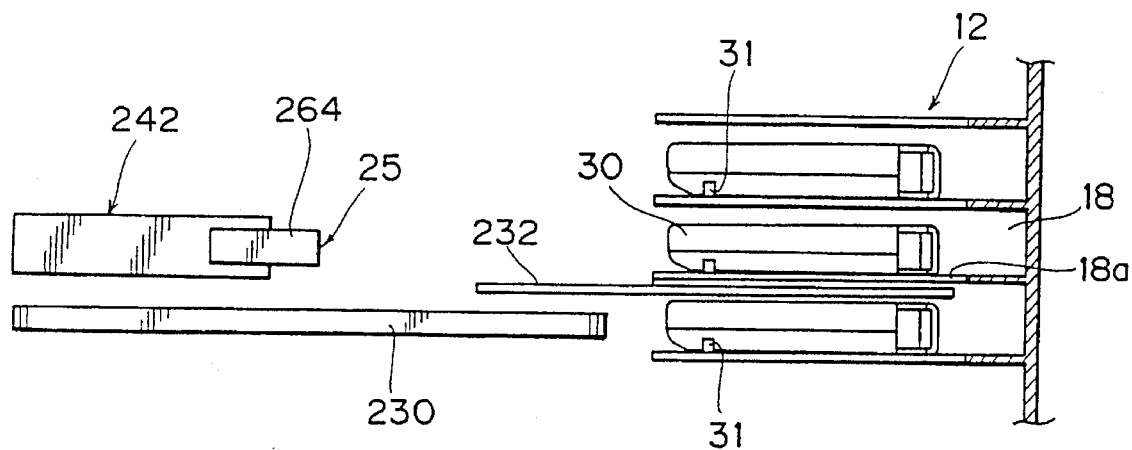
FIGS. 34A and 34B are partial sectional side views illustrating how the hand mechanism extracts a cartridge from inside a cell of the cell drum.
Figure 34B:
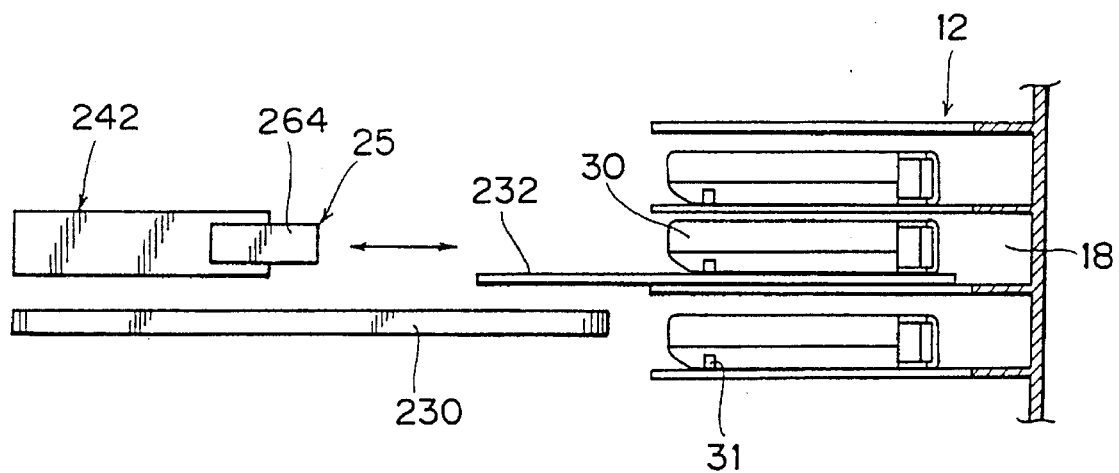

How the cartridge 30 is extracted from the cell 18 will now be described with reference to FIGS. 34A and 34B. With the cartridge 30 accommodated in the cell 18, the grooves 31 on both sides of the cartridge 30 engage with the ridges 19 of the cell 18. The engagement prevents the cartridge 30 from getting dislodged from the cell 18.

The cartridge 30 is extracted from the cell 18 as follows. First the tray 232 is inserted into the cell 18, as depicted in FIG. 34A. Once inside the cell 18, the tray 232 is raised through an opening 18a of the cell 18, as shown in FIG. 34B, to receive on its top the cartridge 30 from above. Then the hand unit 242 advances to have the grip hand 25 grip the sides of the cartridge 30. With its grip hand 25 gripping the cartridge 30, the hand unit 242 will return to its retracted position sliding on the tray 232. Thereafter, the tray 232 is allowed to return to its retracted position.

As described, extracting the cartridge 30 from the cell 18 involves first having the tray 232 receive the cartridge 30 and then getting the grip hand 25 to grip the cartridge 30. This procedure prevents the cartridge 30 from getting inadvertently raised from the tray 232 while the hand unit 242 is placing the cartridge 30 onto the base 230. Thus the cartridge 30 is placed in normal attitude on the base 230.

Figure 35:
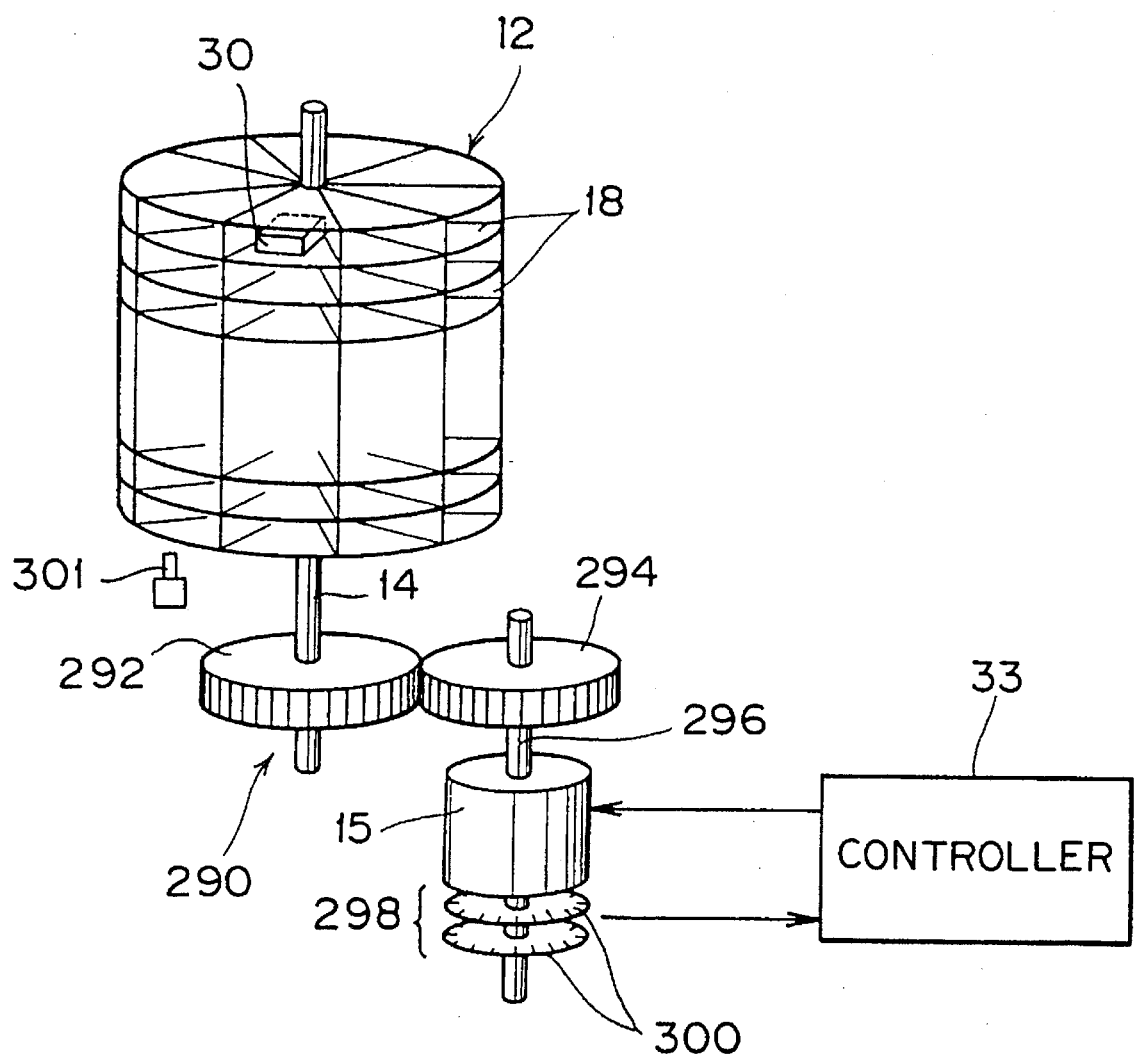
FIG. 35 is a schematic perspective view of a cell drum driving mechanism.

FIG. 35 is a schematic perspective view of a cell drum driving mechanism 290. In FIG. 35, a gear 292 is fixed to the rotary shaft 14. A gear 294 engaging with the gear 292 is fixed to the output shaft 296 of the motor 15. The gear ratio of the gear 292 to the gear 294 is illustratively about 150 to 1. The gear ratio allows the output torque of the motor 15 to be transmitted to the cell drum 12 in magnified fashion. A tachometer 298, coupled directly to the output shaft 296 of the motor 15, outputs signals reflecting the revolutions and the rotating direction of the output shaft 296. The tachometer 298 is a two-phase type comprising two discs 300 having 500 slits each and a photo sensor, not shown. An output signal from the tachometer 298 enters the controller 33. In turn, the controller 33 drives the motor 15 by the amount representing exactly the entire rotation angle desired for the cell drum 12 to revolve. That entire rotation angle is the angle to be traveled for the target cell column of the cell drum 12 to reach its destination.

Figure 36:
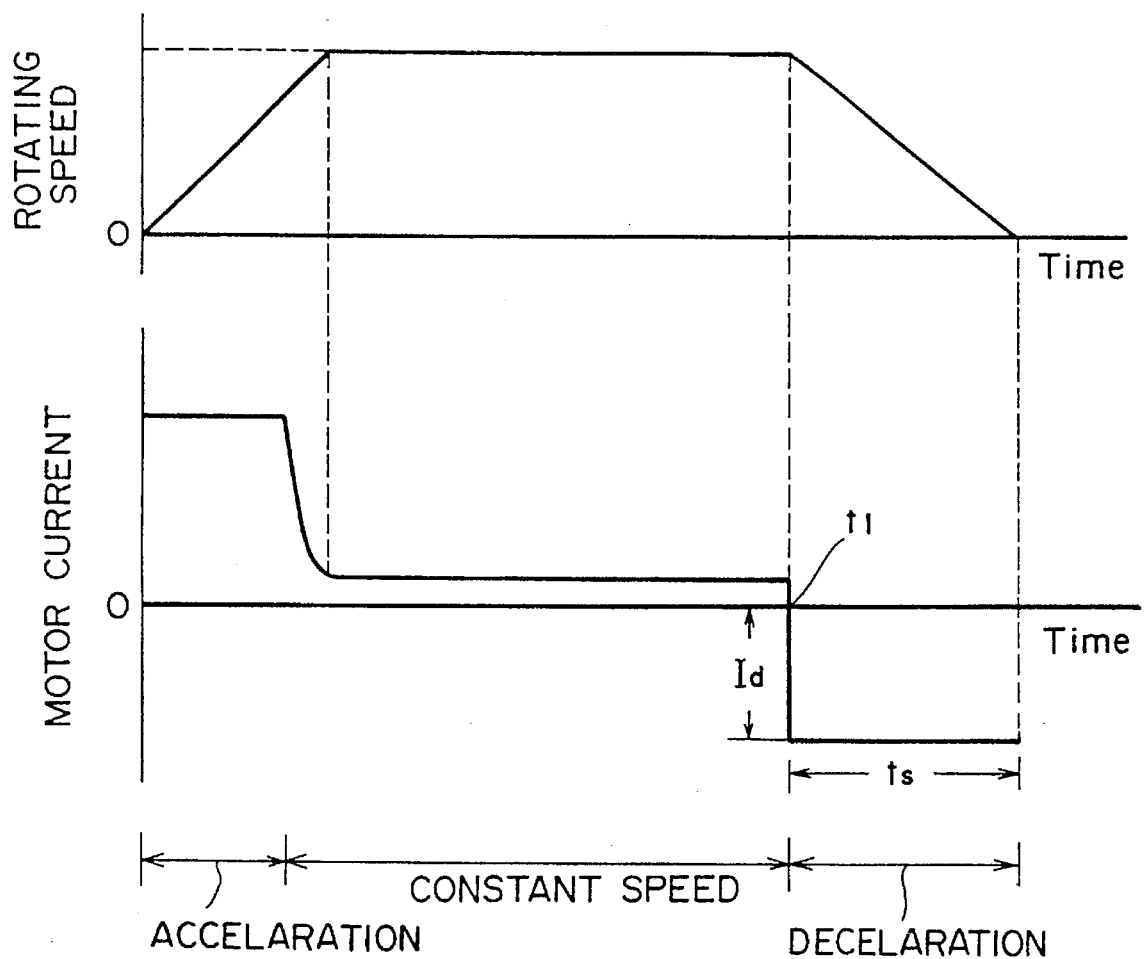
FIG. 36 is a view outlining how the cell drum is controlled in rotation.

FIG. 36 is a view outlining how the revolutions and the motor current of the motor 15 typically vary over time. In the acceleration region indicated in FIG. 36, an acceleration current is supplied to the motor 15 until both the cell drum 12 and the motor 15, starting from their stopped state, reach predetermined speeds. The acceleration current is determined with the inertia and friction factor of the rotating parts taken into account. In the steady or constant speed region indicated, a holding current is fed to the motor 15 so that the cell drum 12 and the motor 15 will rotate at predetermined constant speeds. The holding current is determined as per the friction factor involved. In the deceleration region indicated, a deceleration current Id, which is determined as per the inertial and friction factor involved, is supplied to the motor 15 for a necessary time $t_s$. With the motor 15 stopped, a positioning current is supplied to the motor 15 so that the cell drum 12 will continually stay at the target position. The positioning current is determined as per the displacement of the cell drum 12 relative to the target position. The steady speed region is not mandatory. If the steady speed region is omitted, the supply of the acceleration current to the motor 15 is followed immediately by that of the deceleration current, and the holding current is not supplied. The motor 15 is subject to switching control by pulse width modulation. That is, the motor 15 is fed with controlled pulse currents. The motor current shown in FIG. 36 represents not the current actually flowing through the motor 15 but the current indications corresponding to the driving torque of the motor 15.

A locking mechanism 301 in FIG. 35 is activated when the door 10 for directly entering and ejecting cartridges is opened. Activating the locking mechanism 301 locks the cell drum 12 where it is.

Below is a description of how to enter and eject all at once a large number of cartridges to and from a given cell column of the cell drum 12 through the door 10 for direct cartridge entry and exit. A faulty cartridge entry detecting mechanism 308 of FIG. 40 is provided to keep the cartridges from getting entered erroneously into the cell column.

Each magnetic tape cartridge 30 has in one corner thereof a cutout 58 as shown in FIGS. 8A and 8B. The partition 16 defining each cell 18 has a cutout detecting portion 16a that corresponds to the cutout of the cartridge 30 in physically complementing fashion. When the cartridge 30 is entered with its cutout 58 first into the cell 18, the cutout 58 fits snugly into the cutout detecting portion 16a. This is the normal state of cartridge entry. Here, this side of the cartridge 30 which faces the outside is substantially flush with the edge 16b of the partition 16 defining the cell 18; the cartridge 30 will not protrude from the edge 16b.

Figure 37A:
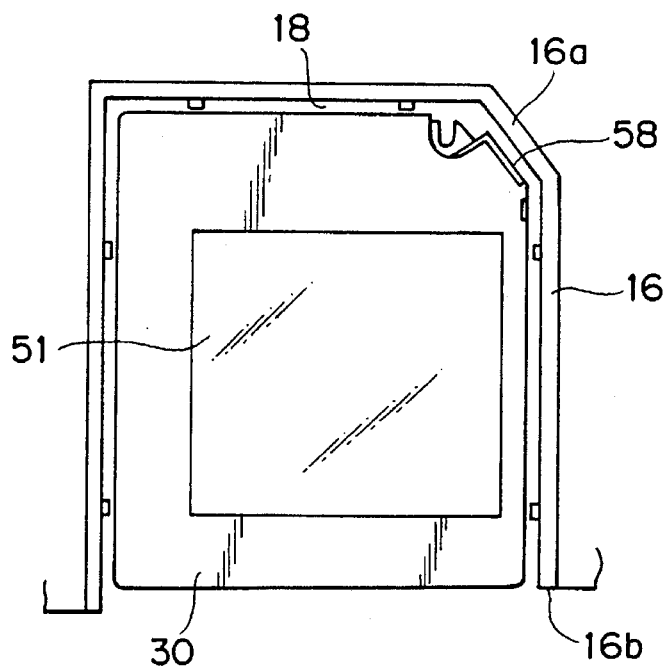
FIG. 37A is a view showing how a cartridge is accommodated normally in a cell.
Figure 37B:
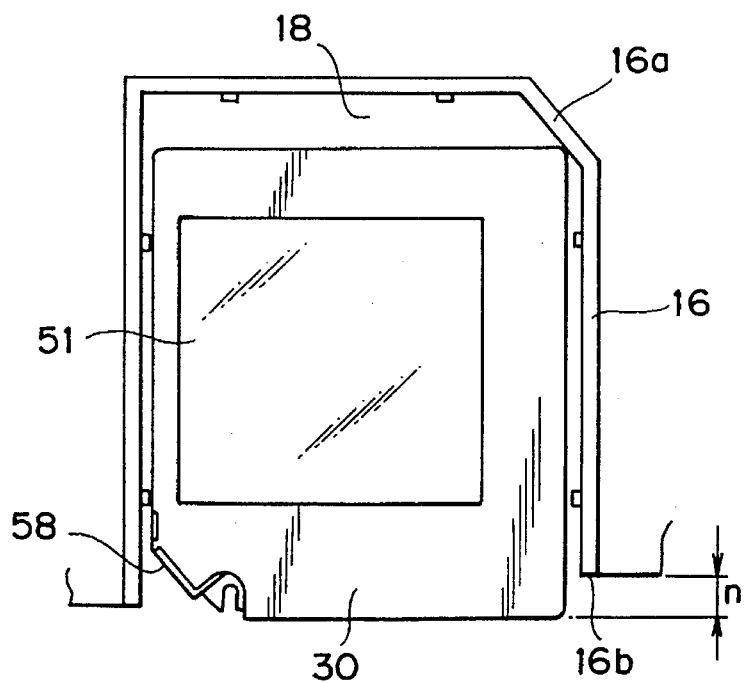
FIG. 37B is a view depicting how a cartridge is accommodated erroneously in a cell.

Should the cartridge 30 be entered with its cutout 58 facing the outside into the cell 18, as shown in FIG. 37B, a corner of the cartridge 30 hits the cutout detecting portion 16a which keeps the cartridge 30 from being inserted all the way. In that case, the cartridge 30 protrudes by a distance n from the edge 16b of the partition 16 of the cell 18. It follows that detecting the distance n between the protruding edge of the cartridge 30 and the partition edge 16b signals the detection of a faulty cartridge entry. This is the principle on which the faulty cartridge entry detecting mechanism operates. How the mechanism illustratively works will now be described with reference to FIGS. 38 through 45C.

Figure 38:
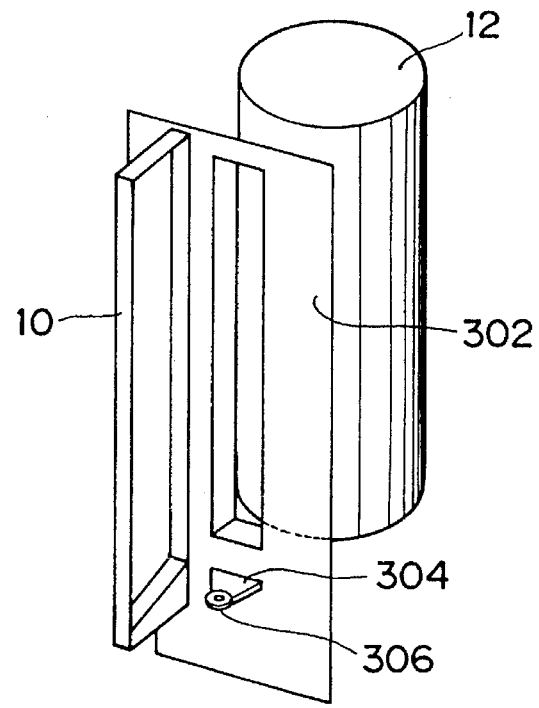
FIG. 38 is a schematic perspective view illustrating part of a faulty cartridge entry detecting mechanism;.
Figure 39:
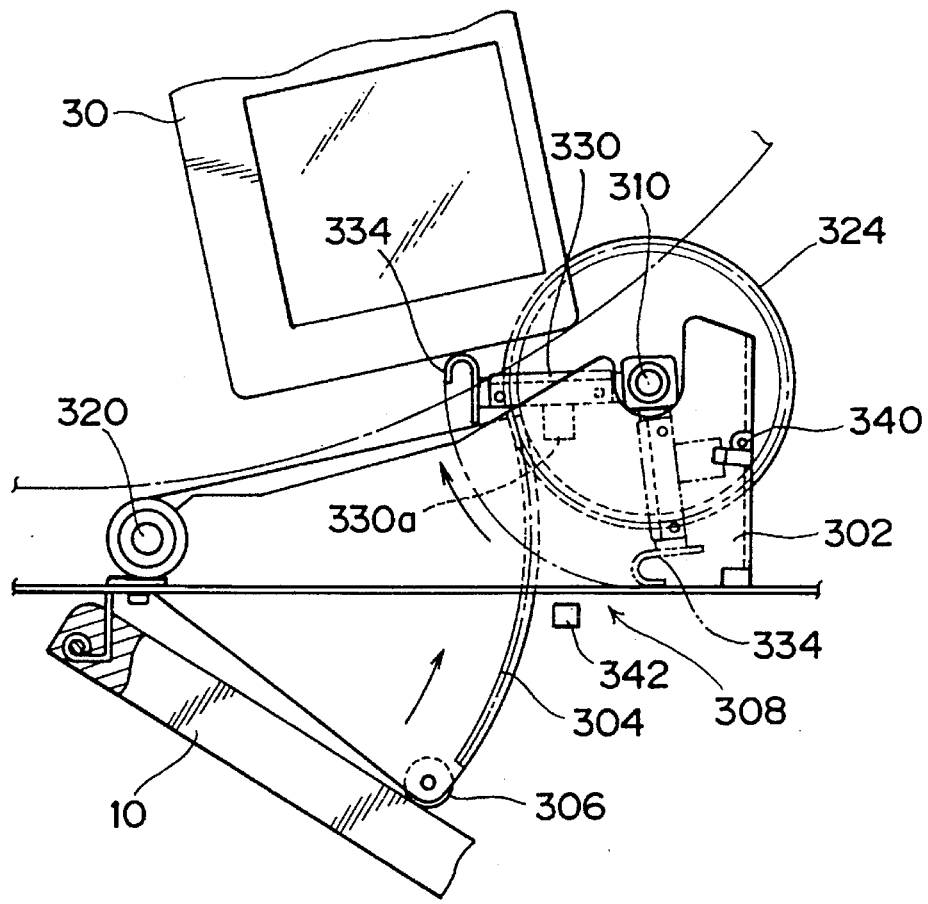
FIG. 39 is a schematic plan view of the faulty cartridge entry detecting mechanism with its rocking arm omitted.
Figure 40:
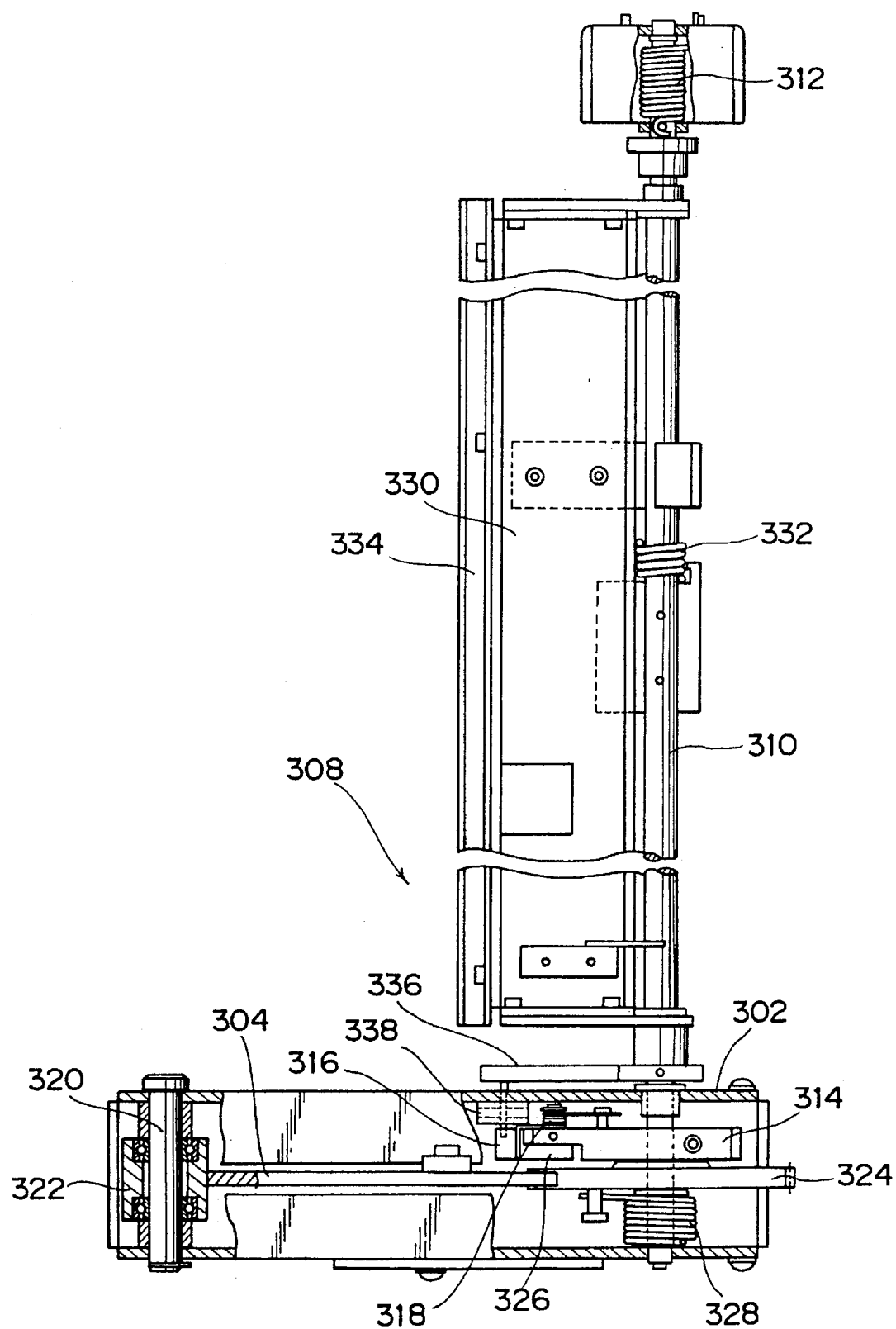
FIG. 40 is a partial sectional front view of the faulty cartridge entry detecting mechanism.

In FIG. 40, a driving shaft 310, mounted rotatably, is biased counterclockwise by a torsion coil spring 312. The driving shaft 310 is thus pushed to a predetermined angular position defined by a stopper, not shown, and held therein. A rocking arm 314 is fixed to the driving shaft 310. The tip of the rocking arm 314 is equipped with a latch pawl 316 in rotatable fashion. The latch pawl is pushed by a torsion coil spring 318 to a predetermined angular position and held therein. A gear 304 is attached rotatably via a bearing 322 to a shaft 320 fixed to an apparatus frame 302. A roller 306 is attached rotatably to the corner of the gear 304 that contacts the door 10, as illustrated in FIGS. 38 and 39. A gear 324 engaging with the gear 304 is attached rotatably to the driving shaft 310. A torsion coil spring 328 pushes the gear 324 to a predetermined angular position defined by a stopper, not shown, and keeps it therein. The torsion coil spring 328 transmits the torque of the gear 324 to the driving shaft 310.

Figure 41:
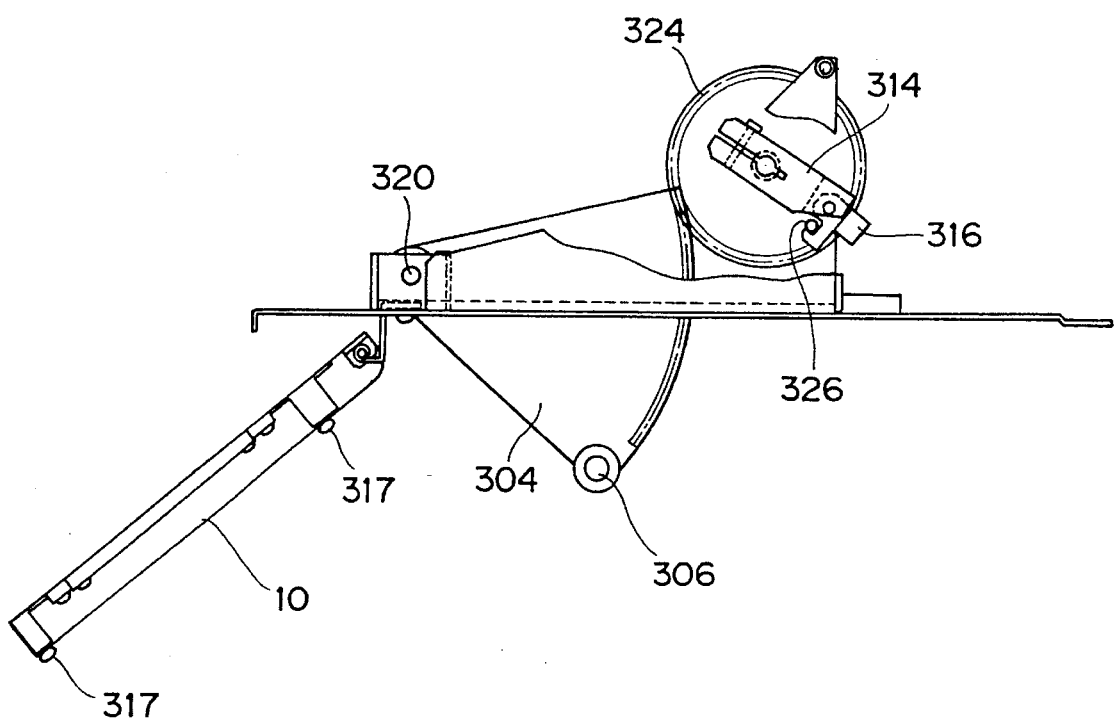
FIG. 41 is a schematic plan view of the faulty cartridge entry detecting mechanism with its actuator omitted, the figure highlighting how a latch attached to the rocking arm and a lock pin are engaged with each other.

As clearly shown in FIG. 41, a lock pin 326 is fixed to the gear 324, the pin 326 coupling the rocking arm 314 to the gear 324 by engaging with the latch pawl 316 of the rocking arm 314. An actuator 330, attached rotatably to the driving shaft 310, is pushed by a torsion coil spring 332 to a predetermined angular position defined by a stopper, not shown, and held therein. The torsion coil spring 332 transmits the torque of the driving shaft 310 to the actuator 330 to rotate the latter. A detecting piece 334 is furnished along the entire length of the tip of the actuator 330. The detecting piece 334 extends along the whole length of the cell columns in the cell drum 12. A faulty entry of at least a single cartridge is detected upon contact between the cartridge and the detecting piece. A latch release pawl 338 is attached rotatably to the apparatus frame 302, the pawl 338 rotating around a horizontal axis. A pushing member 336 is fixed to the actuator 330. When the actuator 330 is rotated beyond a predetermined angle, the pushing member 336 pushes the latch release pawl 338 downward, as portrayed in FIG. 42A.

Figure 43:
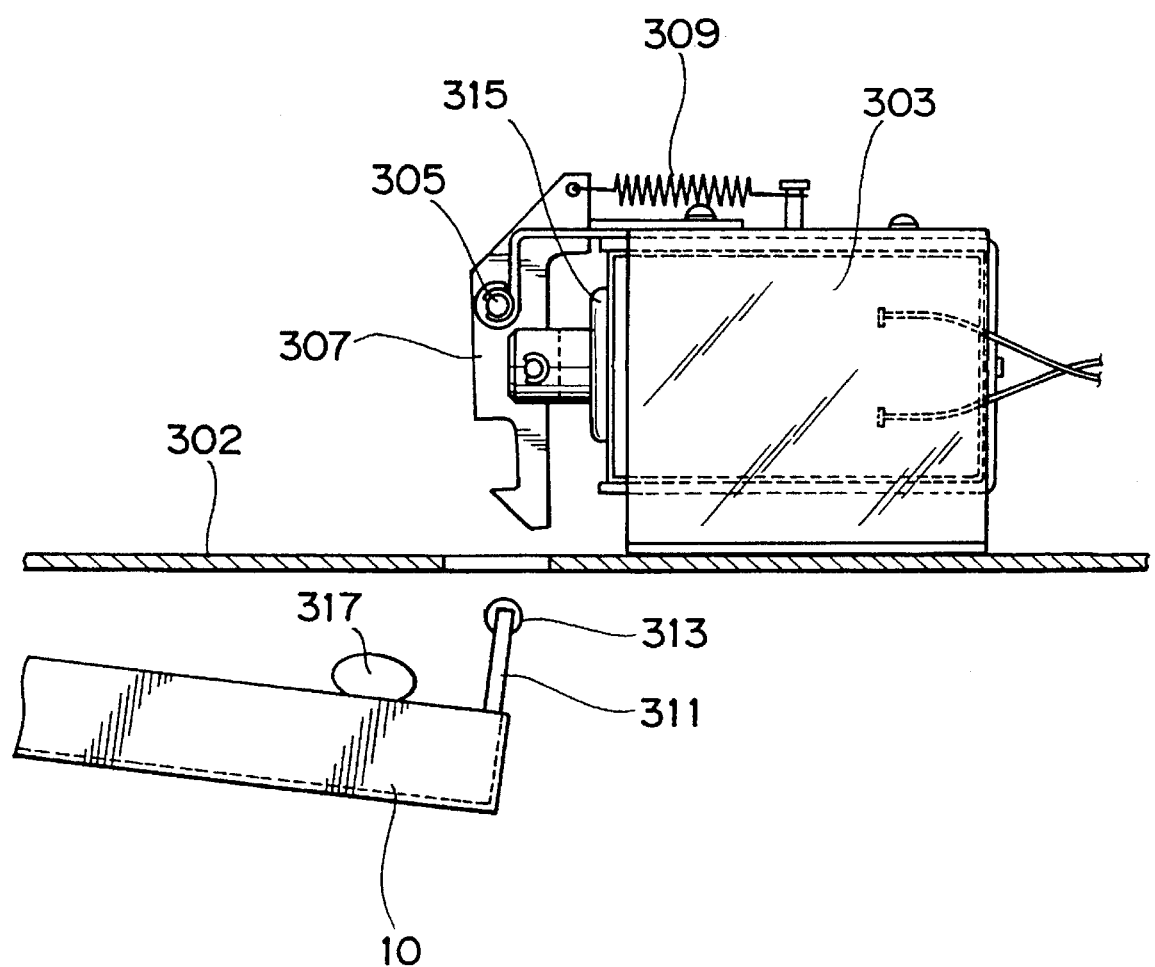
FIG. 43 is a partial sectional plan view of a door locking mechanism.

In FIG. 43, a lock pawl 307 is attached pivotably with a shaft 305 to a bracket 303 fixed to the apparatus frame 302. A coil spring 309 biases the lock pawl 307 clockwise. A roller 313 is attached rotatably to the tip of a lock member 311 fixed to the door 10. Closing the door 10 engages the roller 313 with the lock pawl 307; the lock is effected automatically when the door 10 is fully closed. Since the lock pawl 307 is held biased clockwise by the coil spring 309, the door 10 is locked with the roller 313 engaged with the lock pawl 307 the moment the door 10 is closed.

To unlock the door 10 requires magnetizing momentarily a solenoid 315 attached to the bracket 303. When magnetized momentarily, the solenoid 315 causes the lock pawl 307 to turn counterclockwise and release the roller 313, thereby unlocking the door 10. A plurality of elastic cushions 317 are bonded to the door 10, as shown in FIG. 41. When the door 10 is closed, the cushions 317 are deformed elastically upon contact with the apparatus frame 302. When the door 10 is unlocked, the restoring force of the elastic cushions 317 allows the door 10 to open automatically.

Figure 44A:
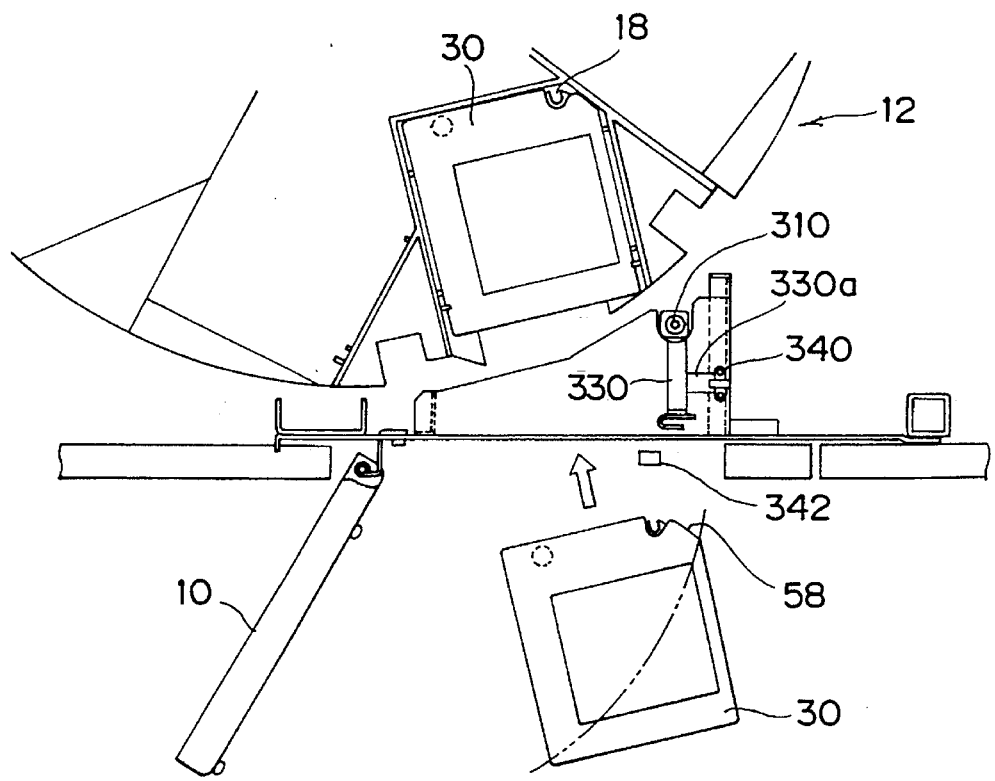
FIGS. 44A through 44C are schematic views illustrating how a cartridge is entered normally.
Figure 44B:
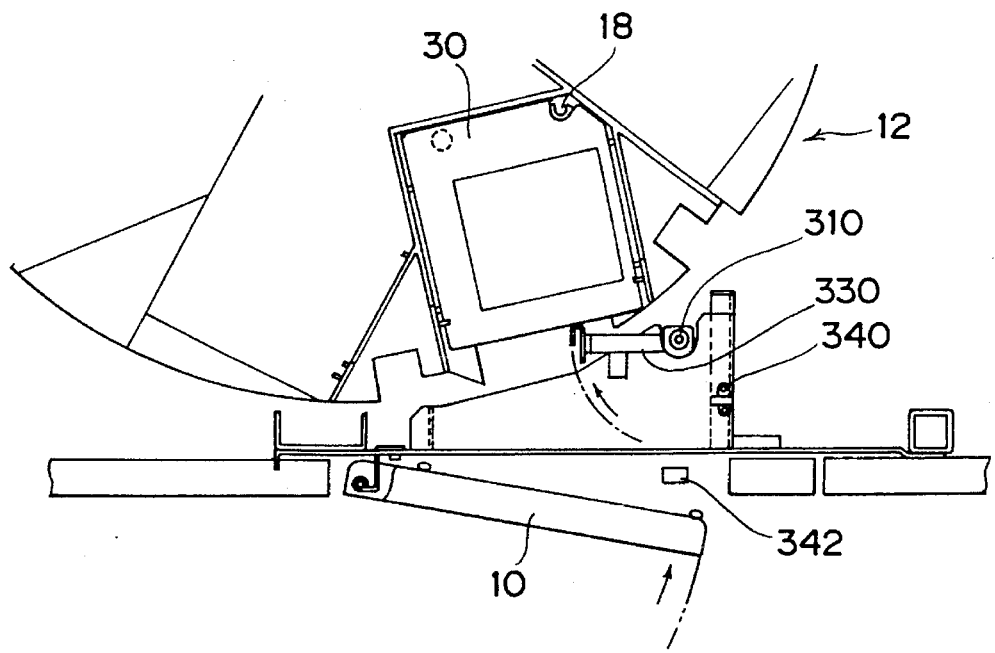

In operation, the actuator 330 is in its home position in FIG. 44A, and a flag 330a fixed to the actuator 330 is inserted in a home position sensor 340 made of a transmission type photo sensor. A door sensor 342, made of a transmission type photo sensor, detects the closure of the door 10. As depicted in FIG. 44A, the door 10 is first opened to have the cartridge 30 entered in normal attitude into the cell 18. When the door 10 is closed, as illustrated in FIGS. 39 and 44B, the driving shaft 310 turns clockwise via the gears 304 and 324, which causes the actuator 330 attached to the driving shaft 310 to rotate clockwise as well. In FIG. 44B where the cartridge 30 is entered normally in the cell 18, the detecting piece 334 at the tip of the actuator 330 comes into contact with the cartridge 30. At this point, the pushing member 336 rotates to the position of FIG. 42A where the latch release pawl 338 is pushed thereby downward. Here, the door 10 is yet to be closed completely. Pushing further the door 10 causes the gear 304 to rotate the gear 324.

Figure 44C:
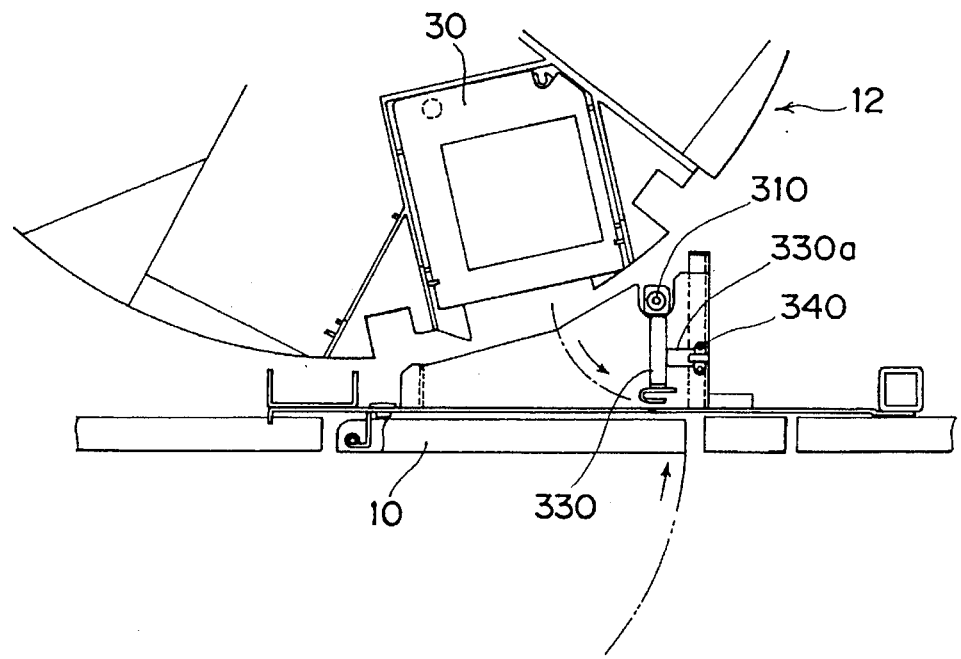

With the gear 324 turned further, the latch pawl 316 coupling the gear 324 to the rocking arm 314 hits the latch release pawl 338 that was pushed down by the pushing member 336. This causes the latch pawl 316 to disengage from the lock pin 326 and separates the gear 324 from the rocking arm 314. Only the gear 324 is allowed to turn further clockwise, while the driving shaft 310 is rotated in reverse by the torsion coil spring 312 to reach its home position, as shown in FIG. 44C. The flag 330a is inserted into the home position sensor 340 to turn it on. When the door 10 is locked in its closed position, the door sensor 342 is turned on. When both the home position sensor 340 and the door sensor 342 are turned on, the cartridge 30 is judged to be entered normally in the cell 18.

Figure 42A:
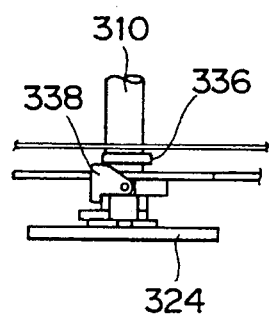
FIG. 42A is a schematic view showing the relationship between a latch release pawl and a latch release pawl pushing member in effect when a cartridge is entered normally.
Figure 42B:
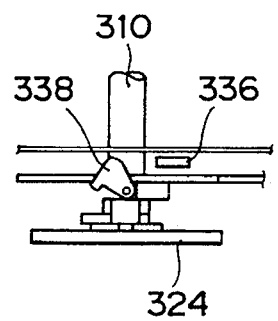
FIG. 42B is a schematic view depicting the relationship between the latch release pawl and the latch release pawl pushing member in effect when a cartridge is entered erroneously.
Figure 45A:
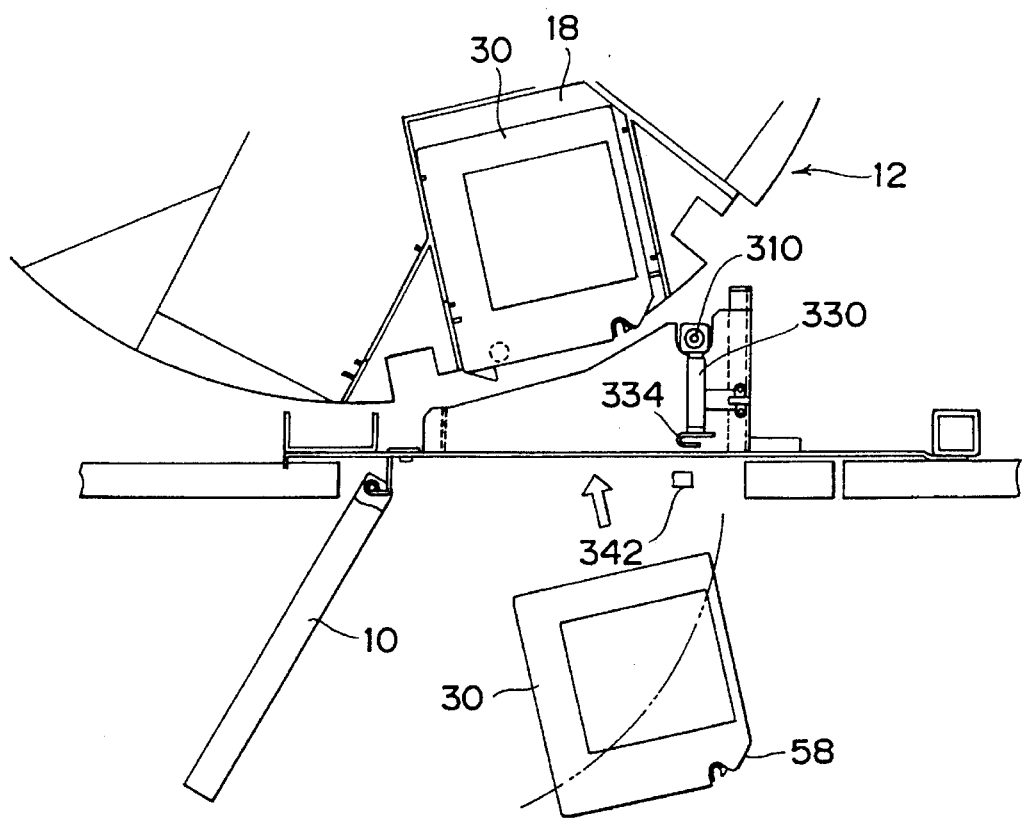
FIGS. 45A through 45C are schematic views portraying how a cartridge is entered erroneously.
Figure 45B:
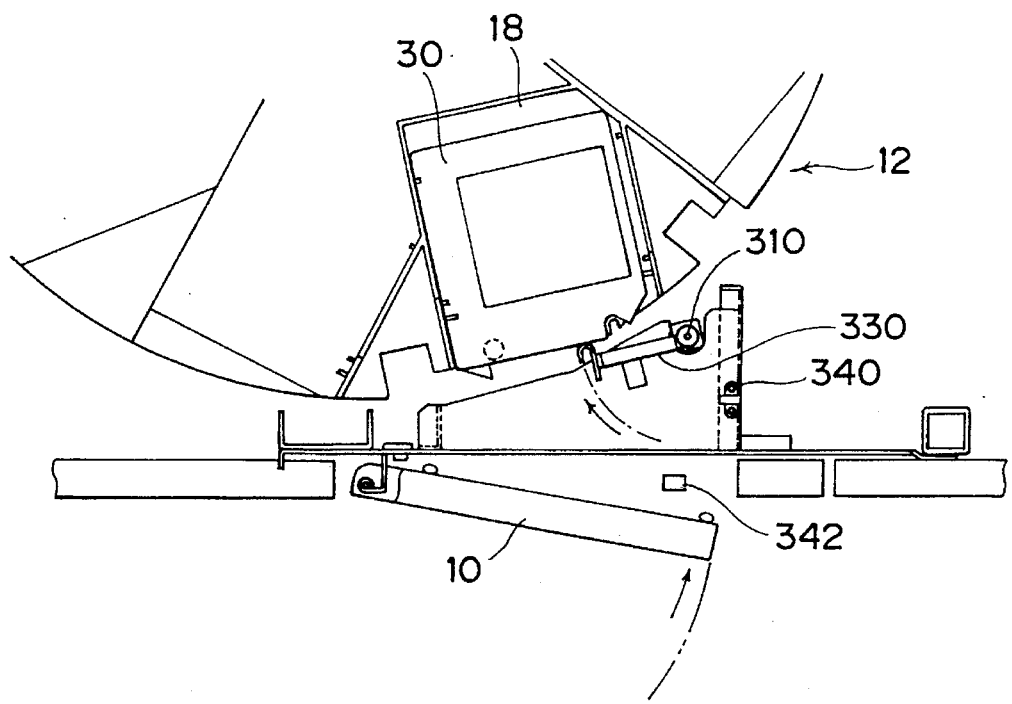

Suppose that the cartridge 30 is entered in the reverse direction into the cell 18, as shown in FIG. 45A. In that case, closing the door 10 halfway causes the detecting piece 334 at the tip of the actuator 330 to collide with the cartridge 30, as portrayed in FIG. 45B. Because the position of the cartridge 30 in this state is shallower than in the normally entered state, the pushing member 336 cannot rotate sufficiently to push down the latch release pawl 338, as depicted in FIG. 42B. Pushing in the door 10 further allows the torque of the gear 304 to rotate the gear 324 more. Because the gear 324 is coupled to the rocking arm 314 by the latch pawl 316, the driving shaft 310 rotates. However the actuator 330, having hit the cartridge 30, cannot rotate here and the pushing member 336 is held stopped.

Figure 45C:
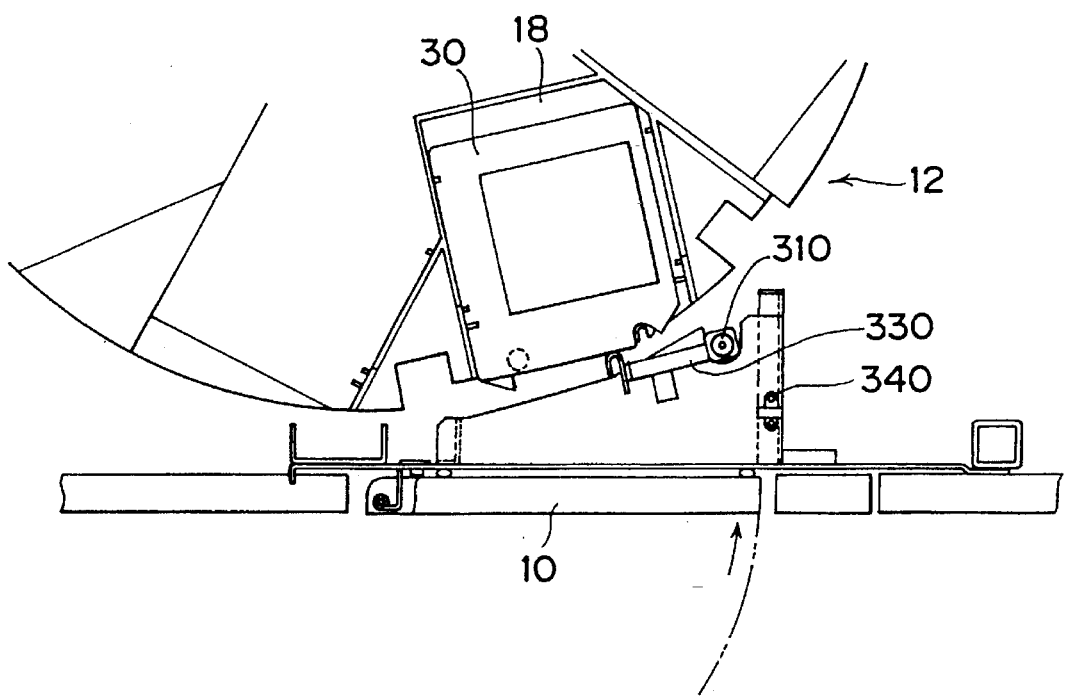

Because the latch release pawl 338 is not pushed down by the pushing member 336, the latch pawl 316 of the rocking arm 314 stays engaged with the lock pin 326. The gear 324 and driving shaft 310 rotate further in the door pushing direction until the door is closed and automatically locked. The coil spring 332 coupling the actuator 330 elastically to the driving shaft 310 acts as a buffer. That is, the actuator 330 remains stationary as the driving shaft 310 rotates. As a result, the door 10 is fully closed but the actuator 330 does not return to its home position, as shown in FIG. 45C. Thus when the door sensor 342 is turned on and the home position sensor 340 is turned off, the cartridge 30 is judged to have been entered erroneously into the cell 18.

FIG. 46 is a schematic plan view showing an alternative faulty cartridge entry detecting mechanism. With the preceding faulty cartridge entry detecting mechanism 308, the gear 304 pushed by the door 10 rotates the gear 324. With the door 10 opened, the greater part of the gear 304 protrudes out of the apparatus frame 302. The alternative faulty cartridge entry detecting mechanism 308' dispenses with the gear 304 and has the gear 324 rotated using a gear 346 fixed to the output shaft of a motor 344. The remaining components of the alternative mechanism 308' are the same as those of the preceding mechanism 308.

When the motor 344 is turned, the detecting piece 334 at the tip of the actuator 330 collides with the cartridge 30 entered in the cell 18 and signals a faulty cartridge entry. In FIG. 46, reference character A indicates the state of normal cartridge entry; B denotes an abnormal state of cartridge entry; and H stands for the home position of the actuator 330. The motor 344 is activated illustratively when the door sensor 342 detects the closure of the door 10. Because the motor 344 rotates the actuator 330, the mechanism 308' can keep the actuator 330 at a constant operating speed while simplifying the entire apparatus structure.

Figure 47:
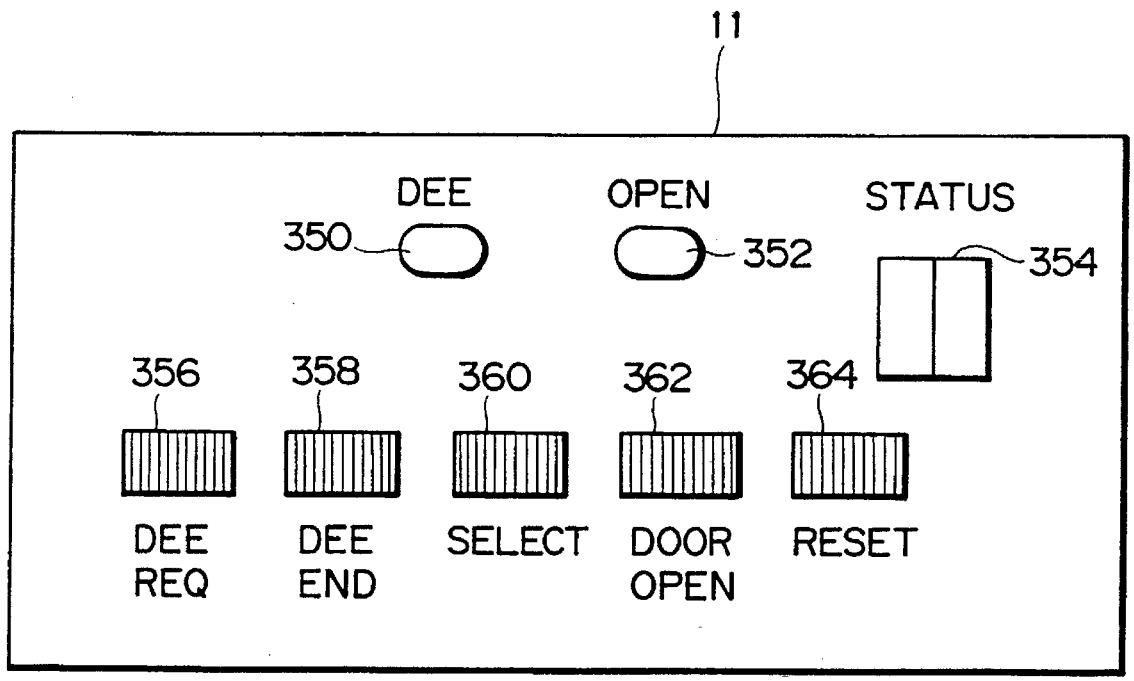
FIG. 47 is a view of an operation panel for cartridge switching operations.

The constitution of the operation panel 11 for cartridge switching operations will now be described with reference to FIG. 47. A DEE lamp 350 is a light-emitting diode which, when glowing, indicates cartridge switching is in progress. An OPEN lamp 352 is a light-emitting diode indicating that the door 10 is ready to be opened. A STATUS display 354 is a light-emitting diode arrangement showing a column number of the cell drum 12.

A cartridge switching request switch (DEE REQ) 356 is used to start cartridge switching, and a cartridge switching end switch (DEE END) 358 when pushed ends cartridge switching. A cartridge holding cell selecting switch (SELECT) 360 is used to select a cartridge holding cell 18. A door opening switch (DOOR OPEN) 362 when pushed opens the door 10. An error reset switch (RESET) 364 is used to reset an error that may occur during cartridge switching.

Figure 48:
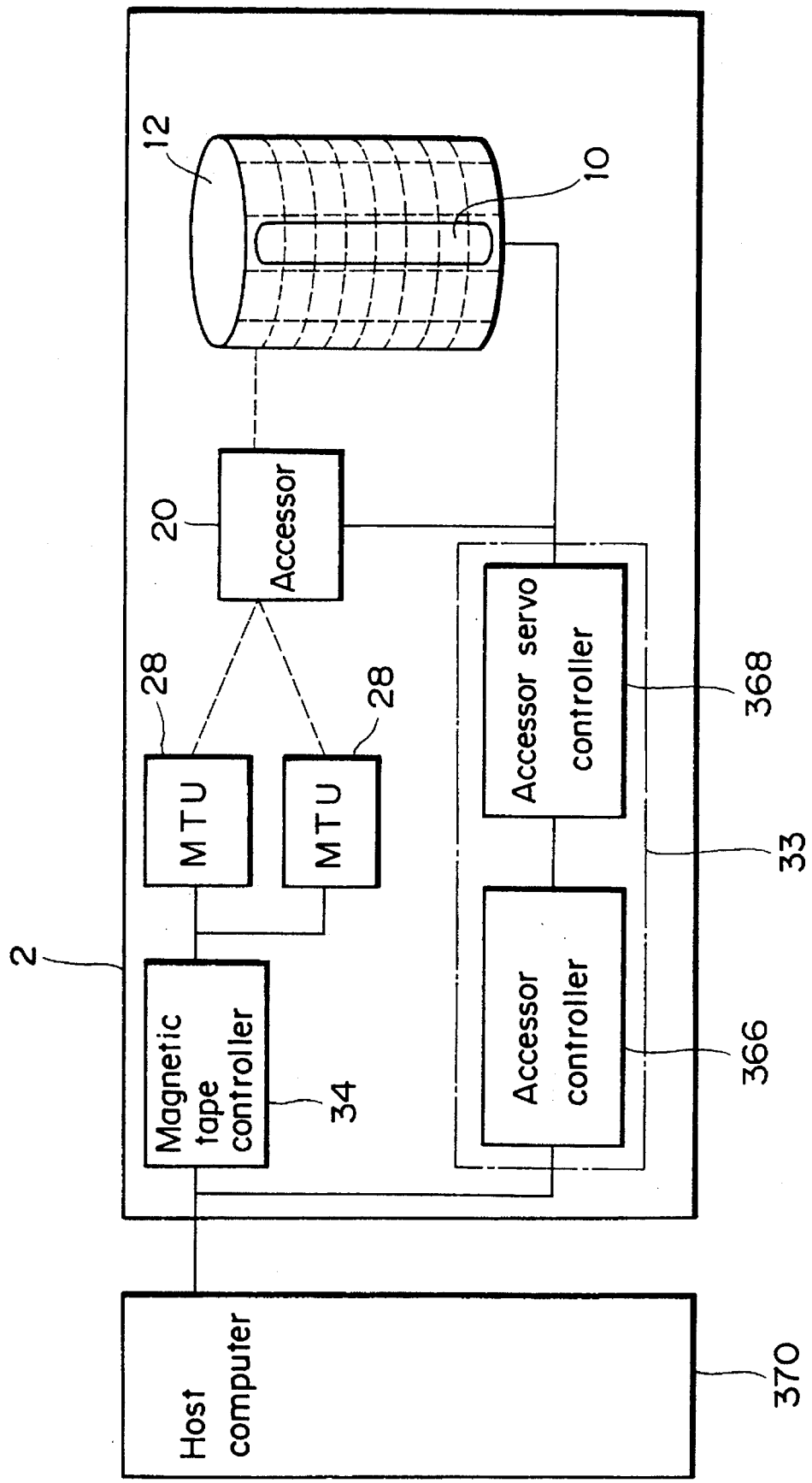
FIG. 48 is a block diagram of a typical control system for controlling the magnetic tape library apparatus embodying the invention.

FIG. 48 is a block diagram of a typical control system for controlling the magnetic tape library apparatus 2 embodying the invention. In FIG. 48, a magnetic tape controller (i.e., director) 34 controls the magnetic tape drive unit 28 in writing and reading data to and from magnetic tapes. An accessor controller unit 33 comprises an accessor controller 366 and an accessor servo controller 368. The accessor controller 366 communicates with a host computer 370 and receives and processes signals from the various sensors and switches configured. The accessor servo controller 368 controls the operation of the accessor 20, the activation and deactivation of the cell motor 15, the opening and closure of the door 10, and the operation of the cartridge entry/exit mechanism 32.

Figure 49:
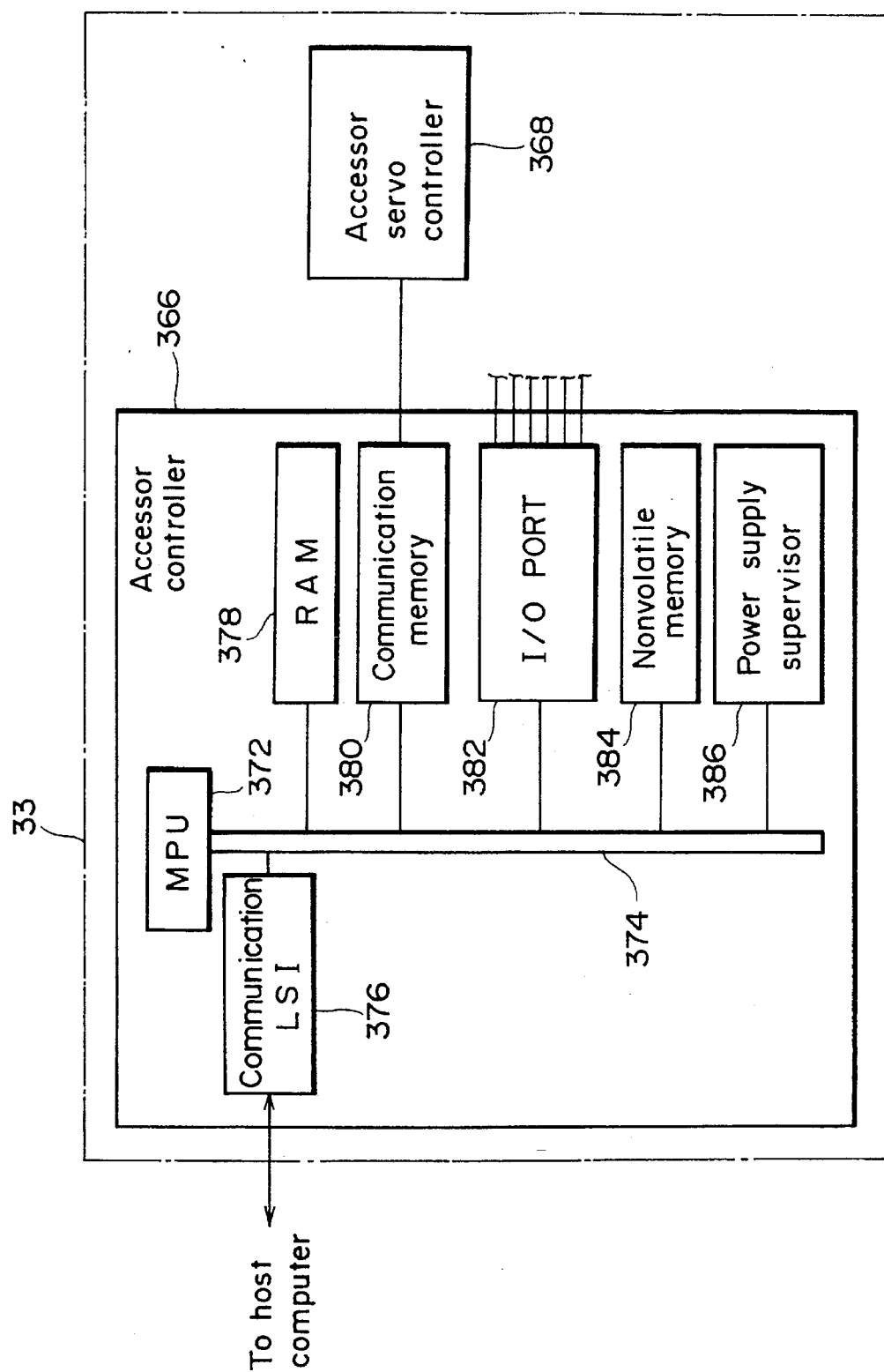
FIG. 49 is a block diagram of an accessor controller unit.

As shown in FIG. 49, the accessor controller 366 comprises an MPU 372 connected via a bus 374 to a communication LSI 376, a RAM 378, a communication memory 380, an I/O port 382, a nonvolatile memory 384 and a power supply supervisor 386. The nonvolatile memory 284 retains data about that cell column of the cell drum 12 in which cartridges are switched manually as the door 10 is opened. When the door sensor 342 detects the opening of the door 10, the data about the cell column in the cartridge switching position of the cell drum 12 are stored in the nonvolatile memory 384. The power supply supervisor 386 detects the activation and deactivation of the power supply to the apparatus.

Figure 50:
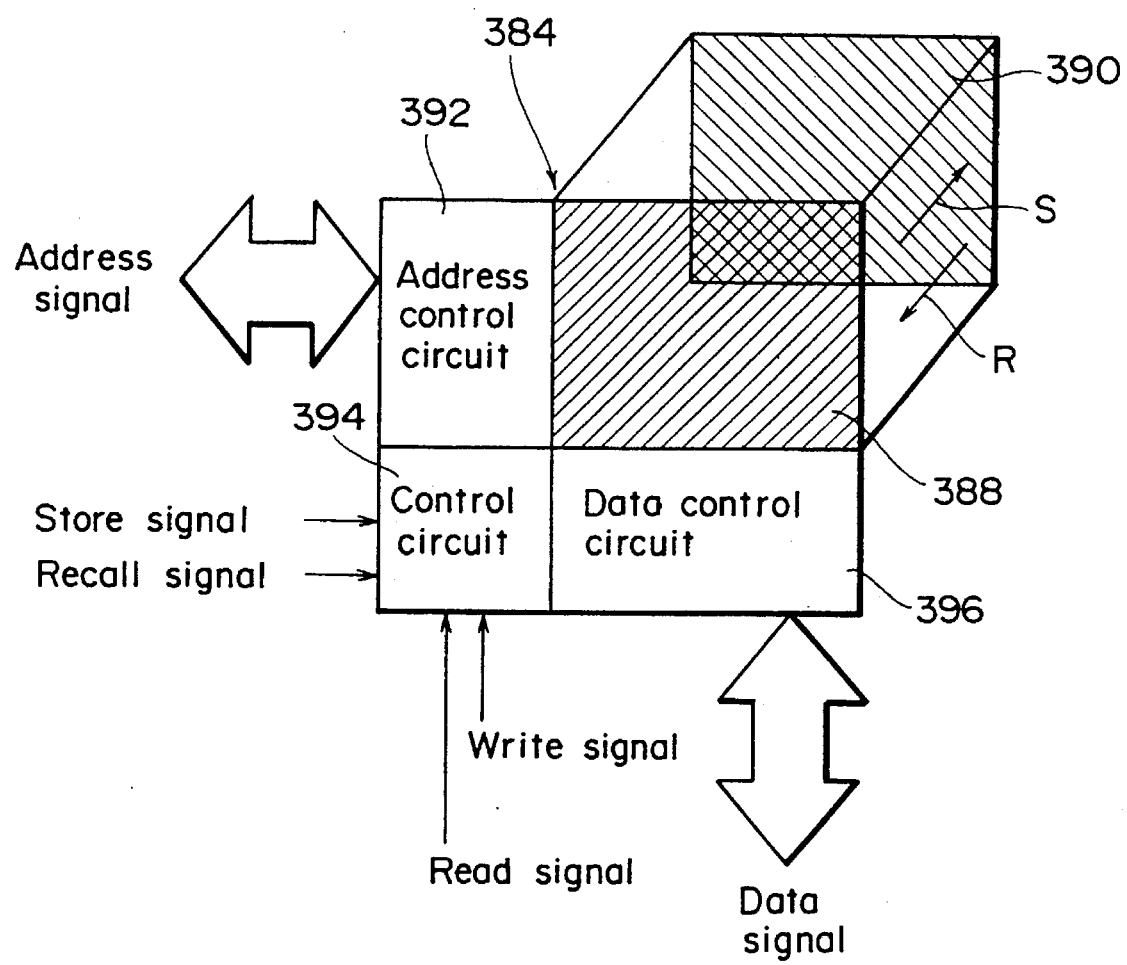
FIG. 50 is a schematic diagram of a nonvolatile memory.

As depicted in FIG. 50, the nonvolatile memory 384 includes a static random access memory array (S-RAM array) 388 and an electrically erasable and programmable read only array (EEPROM array) 390. The S-RAM array 388 is connected with an address control circuit 392 that receives address signals, a control circuit 394 that receives various control signals, and a data control circuit 396 to and from which data signals are input and output.

In response to a store signal entered in the control circuit 394, the nonvolatile memory 384 of the above constitution can store instantaneously to the EEPROM array 390 (in arrowed direction S) the data written in the S-RAM array 388, the data being based on the address signal, data signal and write signal supplied. Conversely, in response to a recall signal entered in the control circuit 394, the nonvolatile memory 384 can retrieve instantaneously to the S-RAM array 388 (in arrowed direction R) the data stored in the EEPROM array 390.

While the magnetic tape library apparatus 2 is operating normally, the detection of a magnetic tape cartridge switching operation based on the signal from the door sensor 342 prompts the data on the cell column in which cartridges were switched to be stored into the S-RAM array 388. When the power supply supervisor 386 detects the deactivation of the power supply to the apparatus, the data stored in the S-RAM array 388 are saved into the EEPROM array 390 in response to the store signal. Later, when the power supply is again activated, the data on the cell column in which the cartridges were switched are read from the EEPROM array 390 and sent to the host computer 370 in accordance with the recall signal.

A cartridge switching table such as one in FIG. 51 is provided in the nonvolatile memory 384. When cartridges are switched, this table is used to accommodate the data about the cell column in which the cartridges are switched. For example, hexadecimal data "FF" are stored to represent each cell column in which the cartridges were switched. The other cell columns in which no cartridges were switched are represented by data "00" stored. With this scheme illustratively in effect, the table of FIG. 51 indicates that cartridges were switched in the second and the third cell columns.

Figure 52:
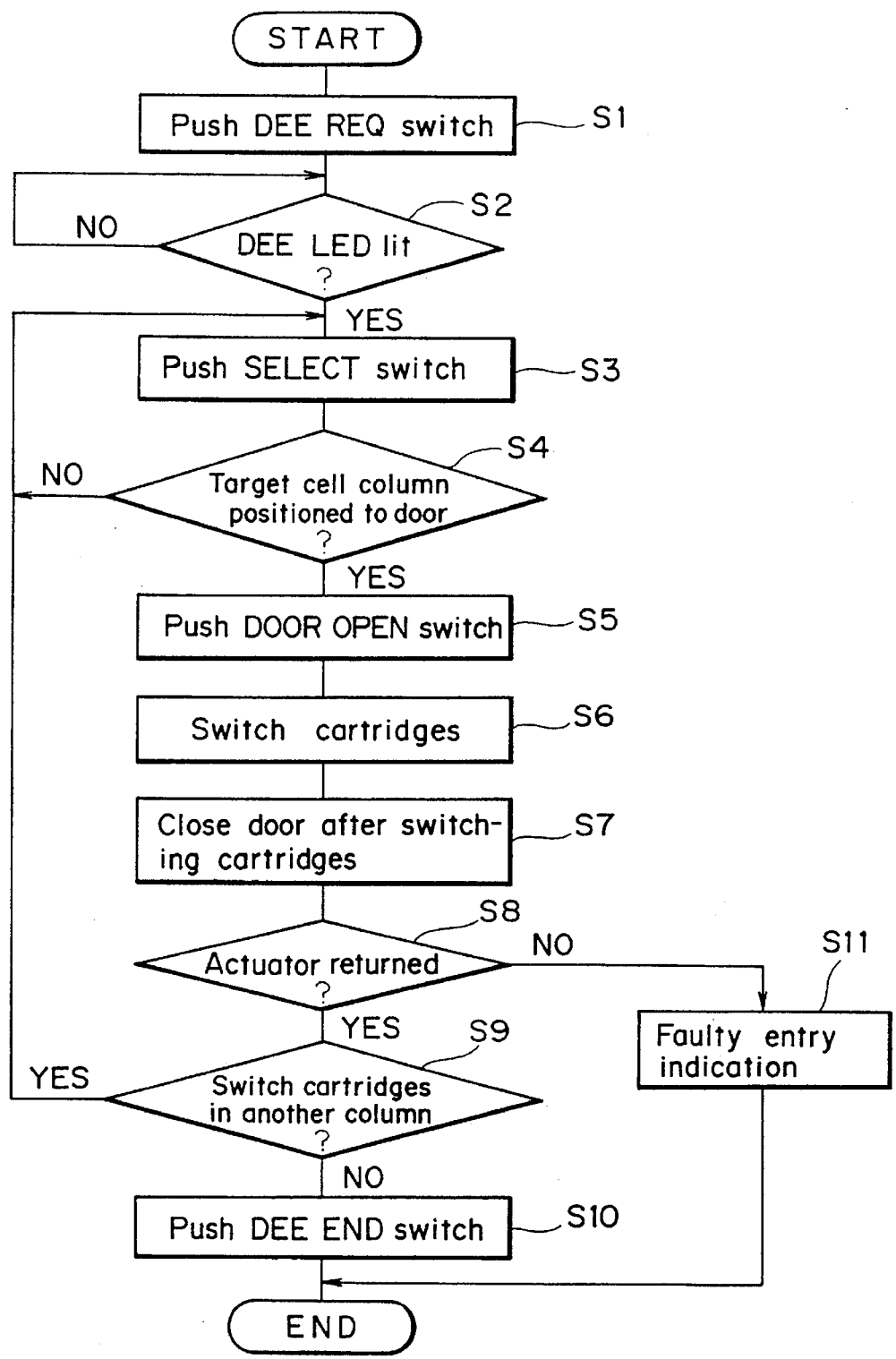
FIG. 52 is a flowchart of steps for switching cartridges according to the invention.

How cartridges are switched in a given cell column of the cell drum 12 will now be described with reference to FIGS. 52 through 55. Referring to FIG. 52, a large number of cartridges are entered or ejected manually all at once as follows. In step S1, the operator pushes the DEE REQ switch 356 on the operation panel 11 for cartridge switching. Pushing the DEE REQ switch 356 transmits an interrupt request to the MPU 372 of the accessor controller 366. Upon completion of the interruption, the DEE lamp 350 glows in step S2. Viewing the STATUS display 354, the operator verifies which cell column currently is facing the door 10. If the indicated cell column is not the target cell column, the operator pushes the SELECT switch 360 in step S3. The cell columns of the cell drum 12 rotate by one column every time the SELECT switch 360 is pushed. The operator pushes the SELECT switch 360 as many times as necessary. In step S4, the operator checks to see if the target cell column now faces the door 10. The check of step S4 is accomplished by viewing the STATUS display 354 and by visually observing through the window 10a of the door 10.

With the target cell column positioned behind the door 10, the OPEN lamp 352 glows. In step S5, the operator pushes the DOOR OPEN switch 362. This magnetizes the solenoid 315 to unlock the door 10, allowing the door to open. When the door sensor 342 detects the opening of the door 10, the detection signal from the door sensor 342 is input to the accessor controller 366. In turn, the accessor servo controller 368 causes the lock mechanism 301 of FIG. 35 to lock mechanically the cell drum 12 in rotation. That is, opening the door 10 results in locking the cell drum 12 mechanically.

With the door 10 opened, the operator enters or ejects necessary cartridges into or from the target cell column in step S6. With all cartridges entered or ejected, the operator closes the door 10 in step S7. Closing the door 10 activates the door sensor 342. In step S8, a check is made to see if the actuator 330 has returned to its home position. That is, step S8 checks to see if the home position sensor 340 is turned on.

When the actuator 330 is found in step S8 to have returned to its home position, with all cartridges normally entered in the cells, a decision is made in step S9 as to whether or not to switch cartridges in another cell column. If cartridges need to be switched in another cell column, step S3 is reached again. The operator then pushes the SELECT switch 360 as many times as needed, and steps S4 through S8 are repeated. If it is decided that no cartridges need to be switched in any other cell column in step S9, step S10 is reached in which the operator pushes the DEE END switch 358 to terminate the cartridge switching operation. If a faulty cartridge entry is detected in step S8, with the home position sensor 340 held off, step S11 is reached. In step S11, an error indication on the operation panel warns the operator of the cartridge entry failure. A buzzer or the like may be activated simultaneously to reinforce the warning to the operator. Having verified the error indication, the operator reopens the door 10 to rearrange the cartridges in the cells.

How the host computer performs its processing will now be described with reference to FIG. 53. In step S21, the host computer 370 checks to see if a cartridge switching end notice has been received from the accessor controller 366. If the end notice is found to be received, step S22 is reached. In step S22, the host computer 370 receives from the magnetic tape library apparatus 2 the data on the cell column in which cartridges were switched. More specifically, when the operator pushes the DEE END switch 358, the signal from the switch 358 enters the accessor controller 366 via the I/O port 382, and the cartridge switching end notice is sent to the host computer 370 via the communication LSI 376. In this manner, the host computer 370 receives the data on the cell column in which the cartridges were switched.

On receiving the cell column data, the host computer 370 tells the accessor 20 to read bar codes off the cartridges 30 in the cell column in question. The command is sent to the accessor 20 via the accessor controller 366 and accessor servo controller 368. In step S23, the accessor 20 gains access to each cell 18 to extract the cartridge therefrom.

In step S24, a check is made to see if the cartridge 30 exists in the cell 18 accessed. The check of step S24 is accomplished by use of the cartridge sensor 250 of FIG. 24. If the cartridge 30 is found in the cell in step S24, step S25 is reached. In step S25, the hand 25 of the accessor 20 grips the cartridge 30 and takes it out of the cell. The bar code reader 252 reads the bar code off the cartridge 30 extracted, and the cartridge 30 is returned to its cell 18. The bar code data read by the bar code reader 252 off the cartridge 30 are stored into the cartridge data table of the host computer 370 via the accessor controller 366. If no cartridge is found in the accessed cell in step S24, step S26 is reached. In step S26, the absence of cartridge is written to the cartridge data table of the host computer 370. In step S27, a check is made to see if the bar codes of all cartridges in the column cell have been read. If the bar code reading is found to be incomplete, steps S23 through S26 are repeated. When the bar code reading is completed on all cells involved, control returns to the normal processing.

Figure 54:
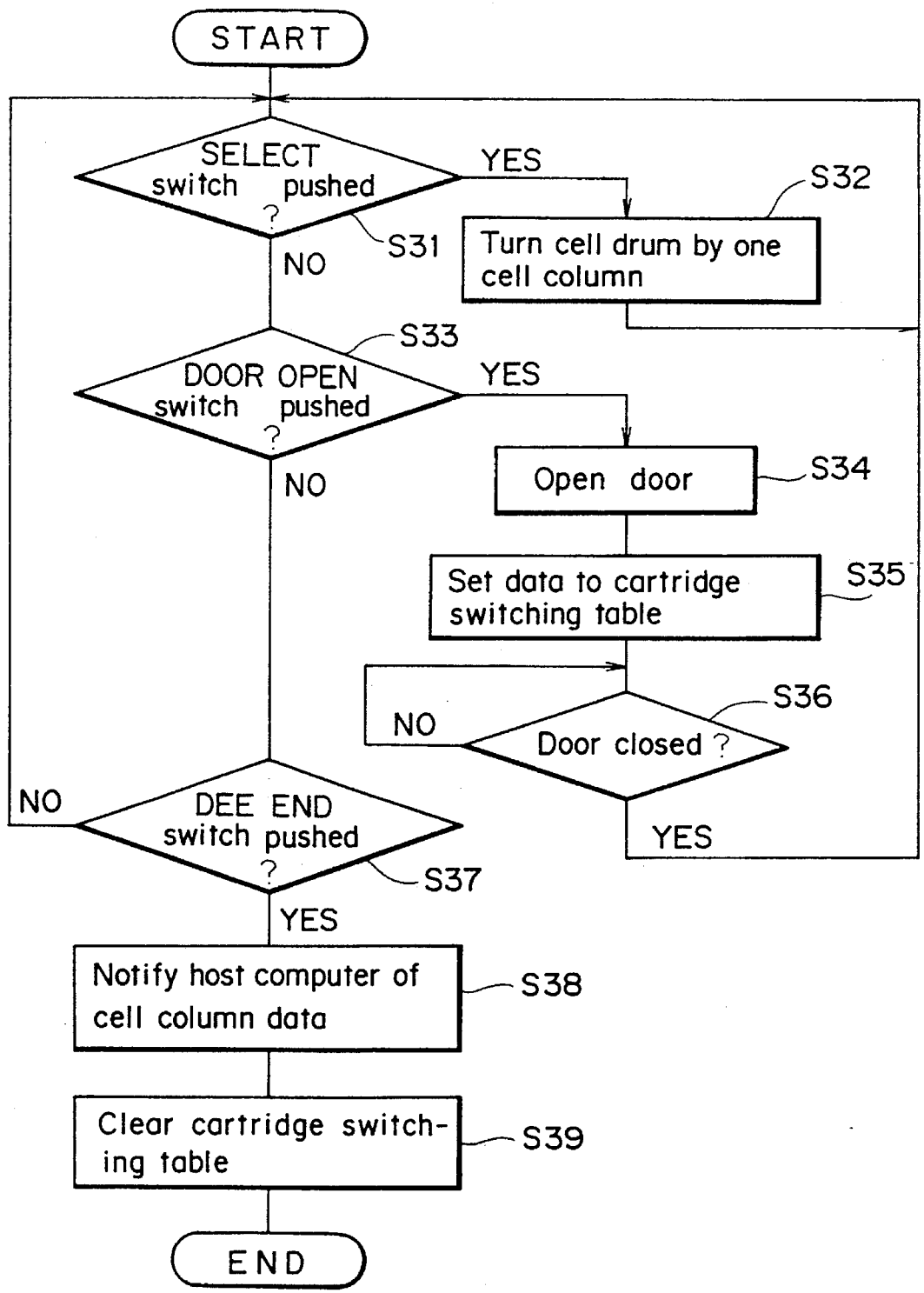
FIG. 54 is a flowchart of steps carried out by the accessor controller in switching cartridges.

How the accessor controller unit 33 works will now be described with reference to the flowchart of FIG. 54. In step S31, a check is made to see if the operator has pushed the SELECT switch 360. Pushing the SELECT switch 360 once turns the cell drum 12 by one cell column in step S32. Steps S31 and S32 are repeated as many times as needed until the target cell column comes immediately behind the door 10.

With the target cell column positioned to the door 10, the OPEN lamp 352 glows. In response, the operator pushes the DOOR OPEN switch 362. When the DOOR OPEN switch 362 is judged to be pushed in step S33, the solenoid 315 is magnetized to unlock the door 10. This allows the door 10 to be opened in step S34. The opening of the door 10 is detected by the door sensor 342. In step S35, cartridge switching data are set to the cartridge switching table 385 of FIG. 51 in the nonvolatile memory 384. Then the closure of the door 10 is awaited in step S36.

When the door 10 is judged to be closed in step S36 and when the DEE END switch 358 is judged to be pushed in step S37, step S38 is reached. In step S38, the host computer 370 is notified of the data about the cell column in which the cartridges were switched. In step S39, the cartridge switching table 385 in the nonvolatile memory 384 is cleared.

Figure 55:
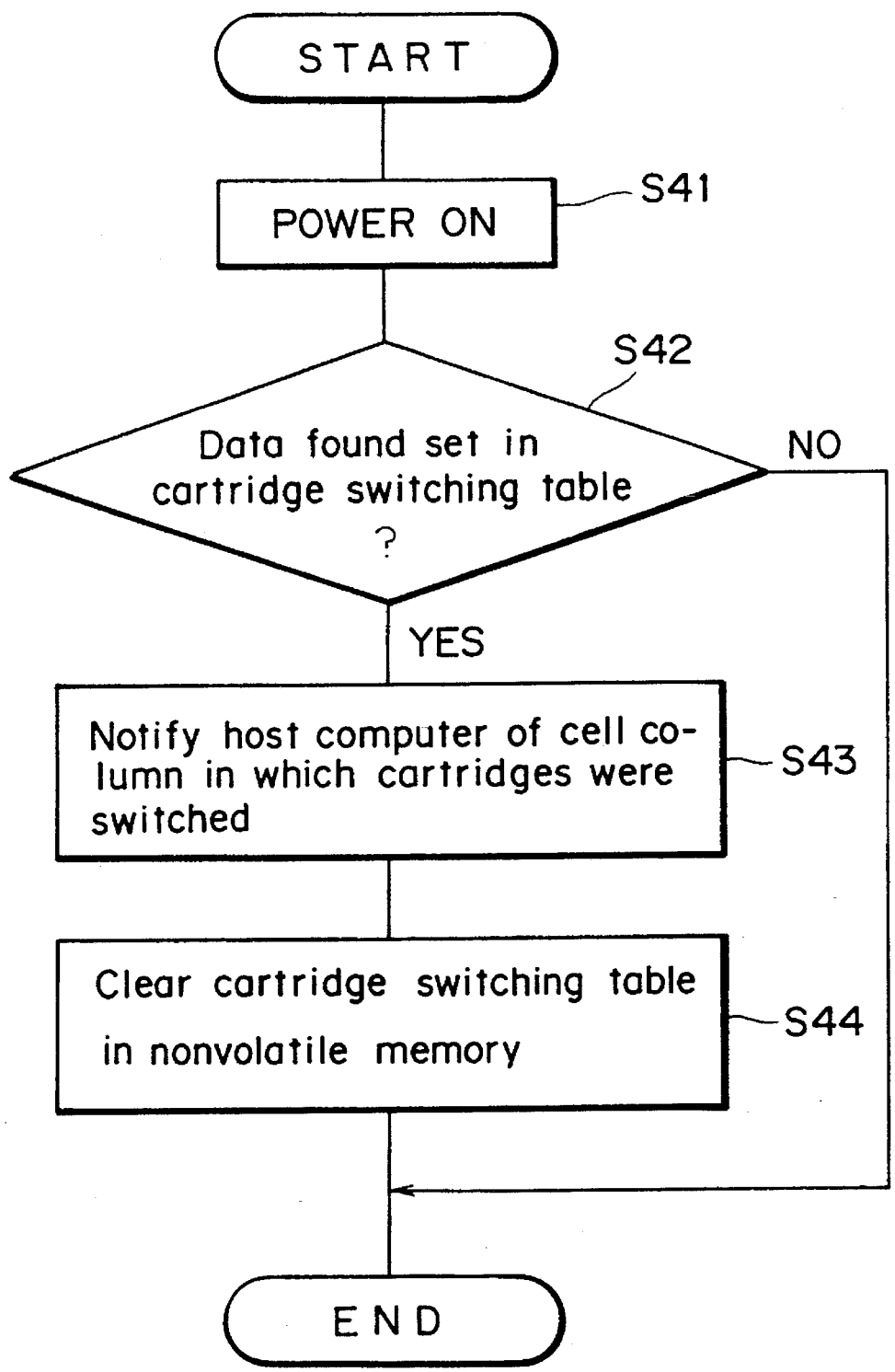
FIG. 55 is a flowchart of steps effected by the accessor controller when power is applied.

Described below with reference to the flowchart of FIG. 55 is how the accessor controller 366 works when the apparatus is turned on after removal of power. In step S41, the apparatus is turned on, with a recall signal generated. The recall signal prompts the cartridge switching data to be read from the EEPROM array 390. In step S42, a check is made to see if the applicable cell column data, i.e., the data about the cell column in which the cartridges were switched, are set in the cartridge switching table 385. If the applicable cell column data are found to be set, step S43 is reached. In step S43, the host computer 370 is notified of the cell column in which the cartridges were switched. In step S44, the cartridge switching table 385 in the nonvolatile memory 384 is cleared.

Figure 56:
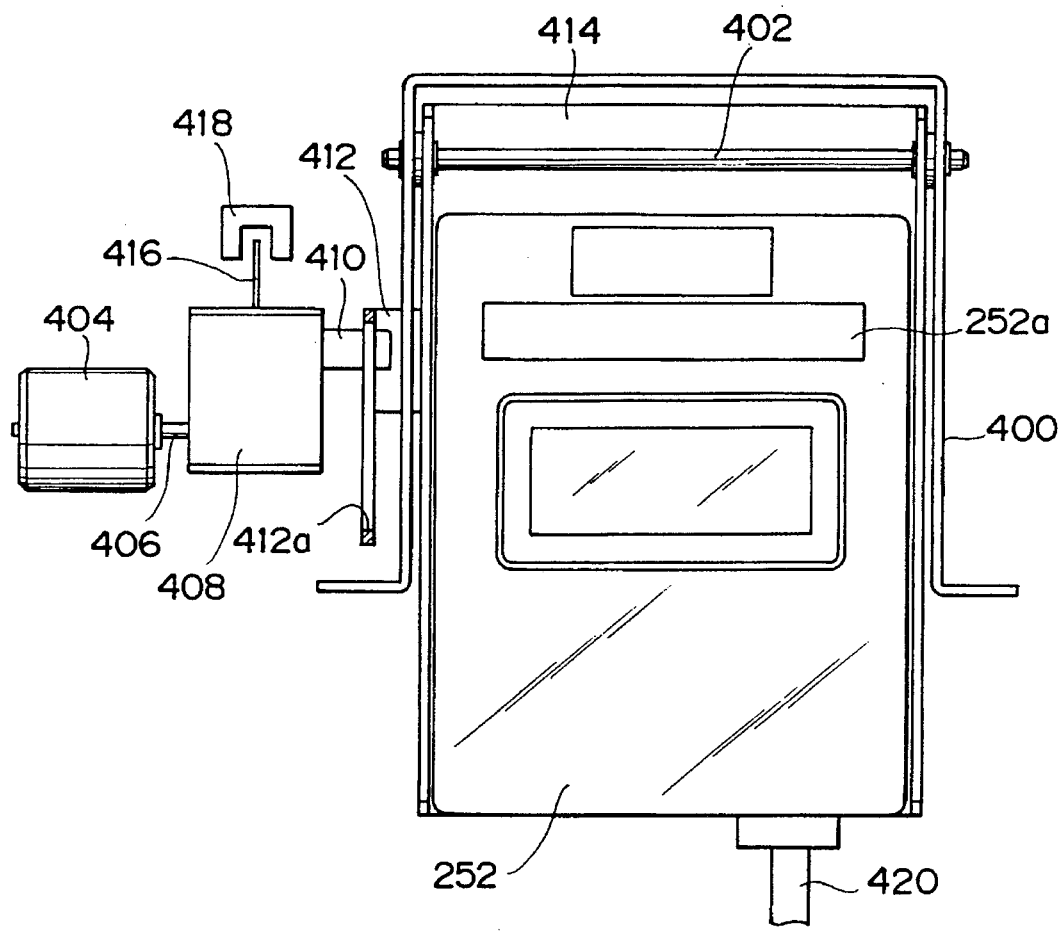
FIG. 56 is a front view of a bar coder reader and a bar code reader swinging mechanism.
Figure 57:
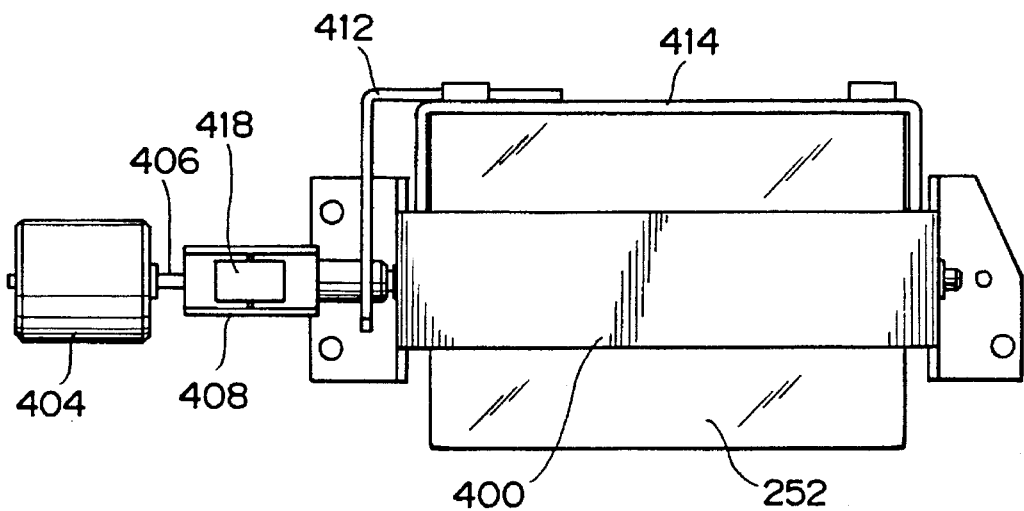
FIG. 57 is a plan view of the components shown in FIG. 56.

Referring again to FIG. 24, the base 230 of the hand mechanism 26 is equipped with the bar code reader 252 for reading a bar code off each cartridge 30. The constitution of the bar code reader 252 will now be described with reference to FIGS. 56 through 58. The bar code reader 252 is mounted fixedly on a U-shaped attaching member 414. A U-shaped support member 400 is fixed to the base 230 of the hand mechanism 26. The support member 400 is equipped with the attaching member 414 to which the bar code reader 252 is attached pivotably with a shaft 402. One end of an arm 412 is fixed to the attaching member 414; the other end of the arm 412 has an oblong hole 412a formed vertically therein.

One end of an eccentric shaft 408 is fixed eccentrically to an output shaft 406 of a motor 404. One end of a member 410 is fixed eccentrically to the other end of the eccentric shaft 408. The other end of the member 410 is inserted in the oblong hole 412a of the arm 412. A flag 416 is fixed to the eccentric shaft 408. A bar code sensor 418 made of a transmission type photo sensor is furnished in position for detecting the flag 416. The motor 404 is illustratively a stepping motor fixed to the base 230 of the hand mechanism 26 via a bracket, not shown. A cord 420 connects the bar code reader 252 to the accessor controller 366.

Figure 58:
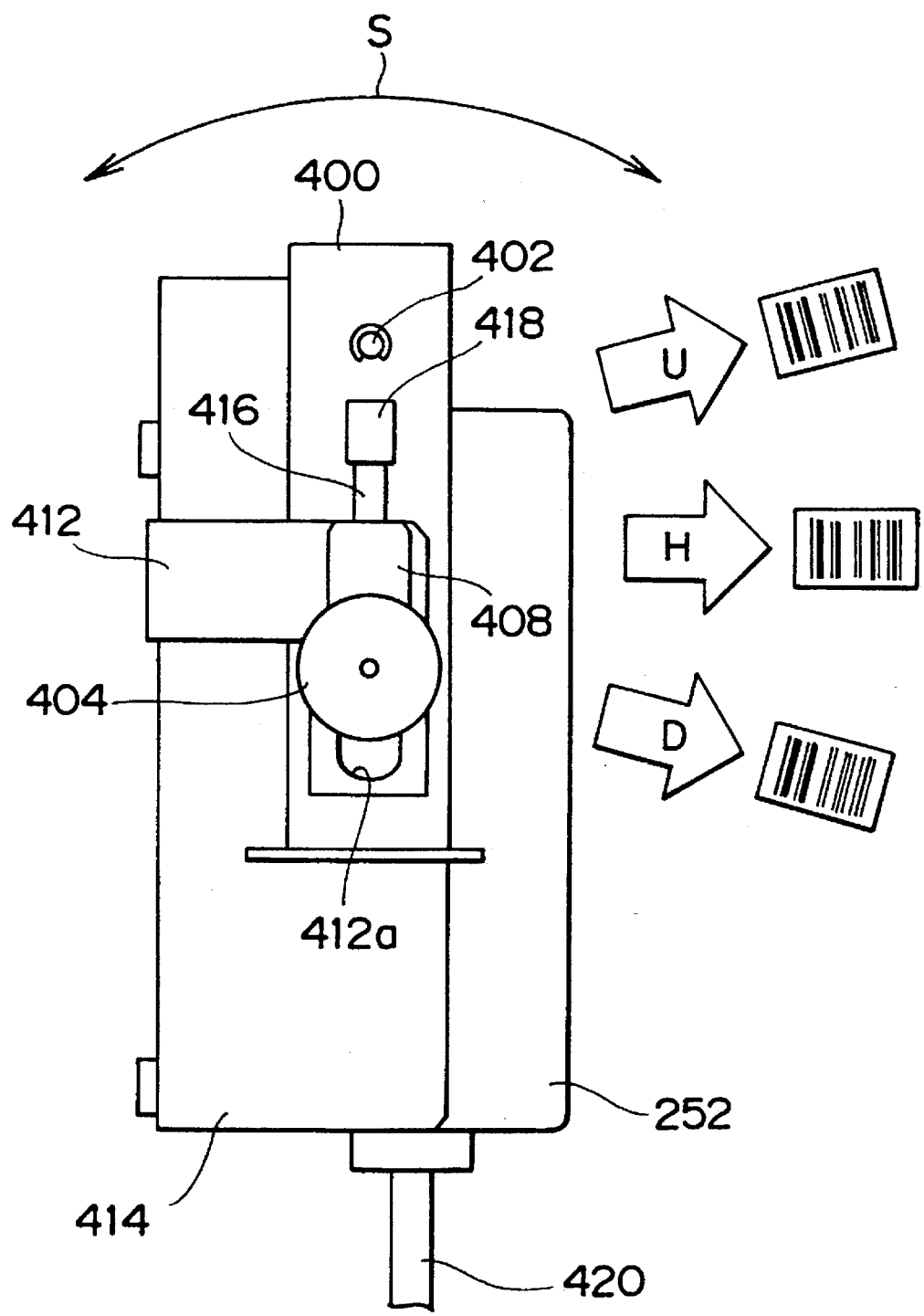
FIG. 58 is a left-hand side view of the components shown in FIG. 56.
Figure 59A:
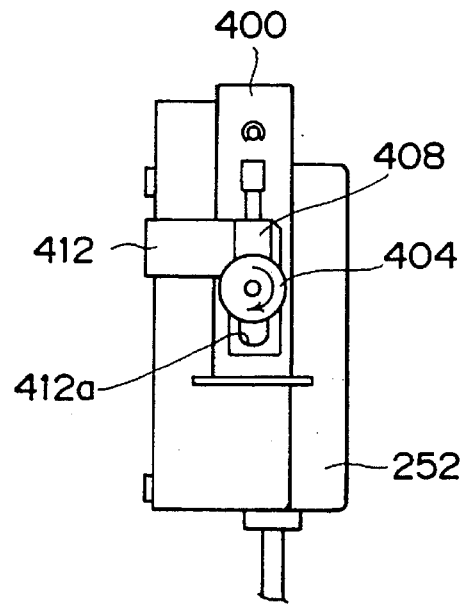
FIGS. 59A through 59E are views depicting how the bar code reader is swung.
Figure 59B:
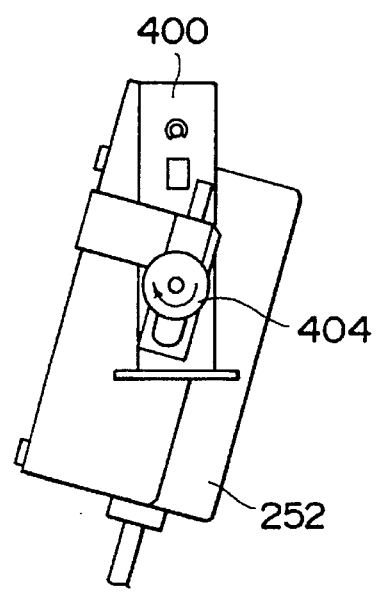

In operation, rotating the motor 404 clockwise in FIG. 58 causes the member 410 attached to the eccentric shaft 408 to move slidingly inside the oblong hole 412a of the arm 412. In so moving, the member 410 pushes the arm 412 to the right in FIG. 58. As a result, the bar code reader 252 rotates clockwise about the output shaft 406 of the motor 404, and the state of FIG. 59B is attained. When the eccentric shaft 408 is turned by 90 degrees from the state shown in FIG. 56 and FIG. 59A, the member 410 moves slidingly down to the approximate middle of the oblong hole 412a of the arm 412 while pushing the latter. At this time, a maximum clockwise rotation angle of the bar code reader 252 is attained.

Figure 59C:
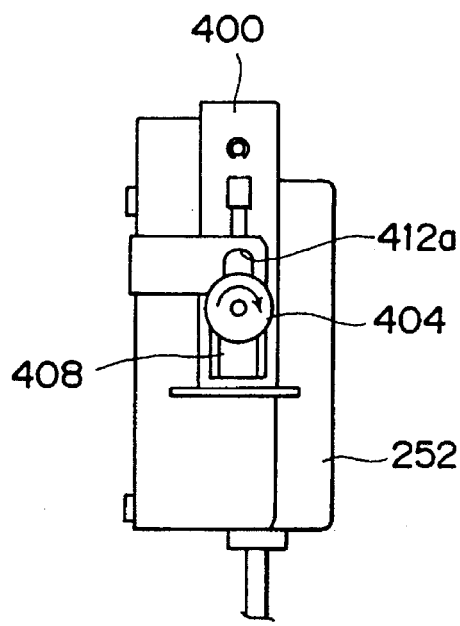
Figure 59D:
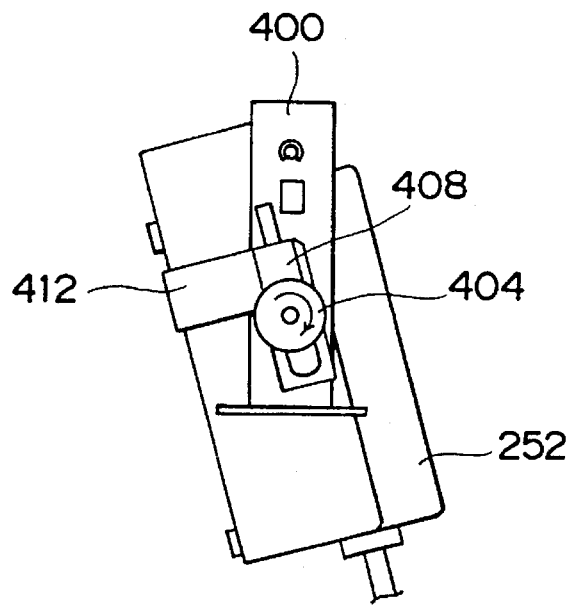

Thereafter, turning the motor 404 further clockwise causes the bar code reader 252 to rotate counterclockwise about the output shaft 406 of the motor 404. A 180-degree revolution of the eccentric shaft 408 results in the state of FIG. 59C. A further 270-degree clockwise revolution of the motor 404 causes the bar code reader 252 to reach the maximum counterclockwise rotation angle shown in FIG.

Figure 59E:
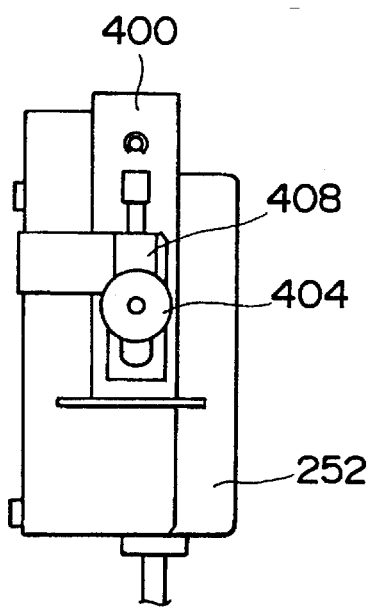

59D. One complete turn of the eccentric shaft 408 allows the bar code reader 252 to return to its home position shown in FIG. 59E. Each turn of the eccentric shaft 408 is ascertained by the bar code sensor 418 detecting the flag 416.

As described, the bar code reader 252 swings about the output shaft 406 of the motor 404 in the direction S shown in FIG. 58. With the bar code reader 252 held horizontally, a window 252a emits a laser beam horizontally in the arrowed direction H to scan the bar code of the cartridge 30. When the bar code reader 252 is swung clockwise, the laser beam is emitted downward in the arrowed direction D to scan the cartridge bar code; when the bar code reader 252 is swung counterclockwise, the laser beam is emitted upward in the arrowed direction U to scan the cartridge bar code. Because the bar code reader 252 of the invention is attached swingingly to the base 230 of the hand mechanism 26, the reader 252 can read the bar code off the cartridge 30 even if the cartridge 30 gripped by the grip hand 25 is slightly out of alignment with normal attitude.

How the bar code reader 252 reads a bar code will now be described with reference to the flowchart of FIG. 60. When the grip hand 25 grips the cartridge 30 and retracts it to a predetermined position, a sensor, not shown, detects the completion of the cartridge retracting motion. A detection signal from the sensor causes step S51 to be entered. In step S51, the bar code reader 252 is driven in stationary condition (i.e, without swinging) to read the bar code off the cartridge 30. In step S52, a check is made to see if the bar code has been read. If the bar code is read successfully, the bar code reading operation is terminated.

If the bar code was not read successfully, step S53 is reached. In step S53, the bar code motor 404 is rotated to swing the bar code reader 252 in the arrowed direction S. In step S54, an attempt is made to read the bar code off the cartridge 30 while the motor 404 is rotating. In step S55, a check is made to see if the bar code has been read. The read operation of step S54 is repeated until the bar code has been successfully read. In step S56, the bar code sensor 418 attempts to detect the flag 416. In step S57, a check is made to see if the flag 416 is detected. When the bar code sensor 418 detects the flag 416, step S58 is reached. In step S58, a braking instruction is fed to the motor 404 to stop it. As described, if the cartridge bar code is not read while the motor 404 is in stopped state, this bar code reading method allows the bar code reader 252 to read the bar code while the eccentric shaft 408 completes a single turn.

Another control method by which the bar code reader 252 reads the bar code will now be described with reference to the flowchart of FIG. 61. Steps S61 through S65 of this method are the same as steps S51 through S55 of the preceding method of FIG. 60. The difference is that under this alternative control method, the motor 404 is stopped in step S66 by supplying it with a braking instruction in synchronism with a signal indicating the successful completion of the bar code reading detected in step S65. In step S67, the number of motor steps is counted from the time the braking instruction is given to the motor 404 until the motor is actually stopped. The bar code motor 404 is then turned in reverse exactly by the number of the motor steps counted. That is, step S67 represents the corrective action for moving the bar code reader 252 back to the position where the bar code was read. In step S68, the bar code reader 252 is stopped in the optimum position. With the bar code reader 252 optimally positioned, there is no need to activate the bar code motor 404 next time a bar code is to be read off the cartridge 30.

Figure 60:
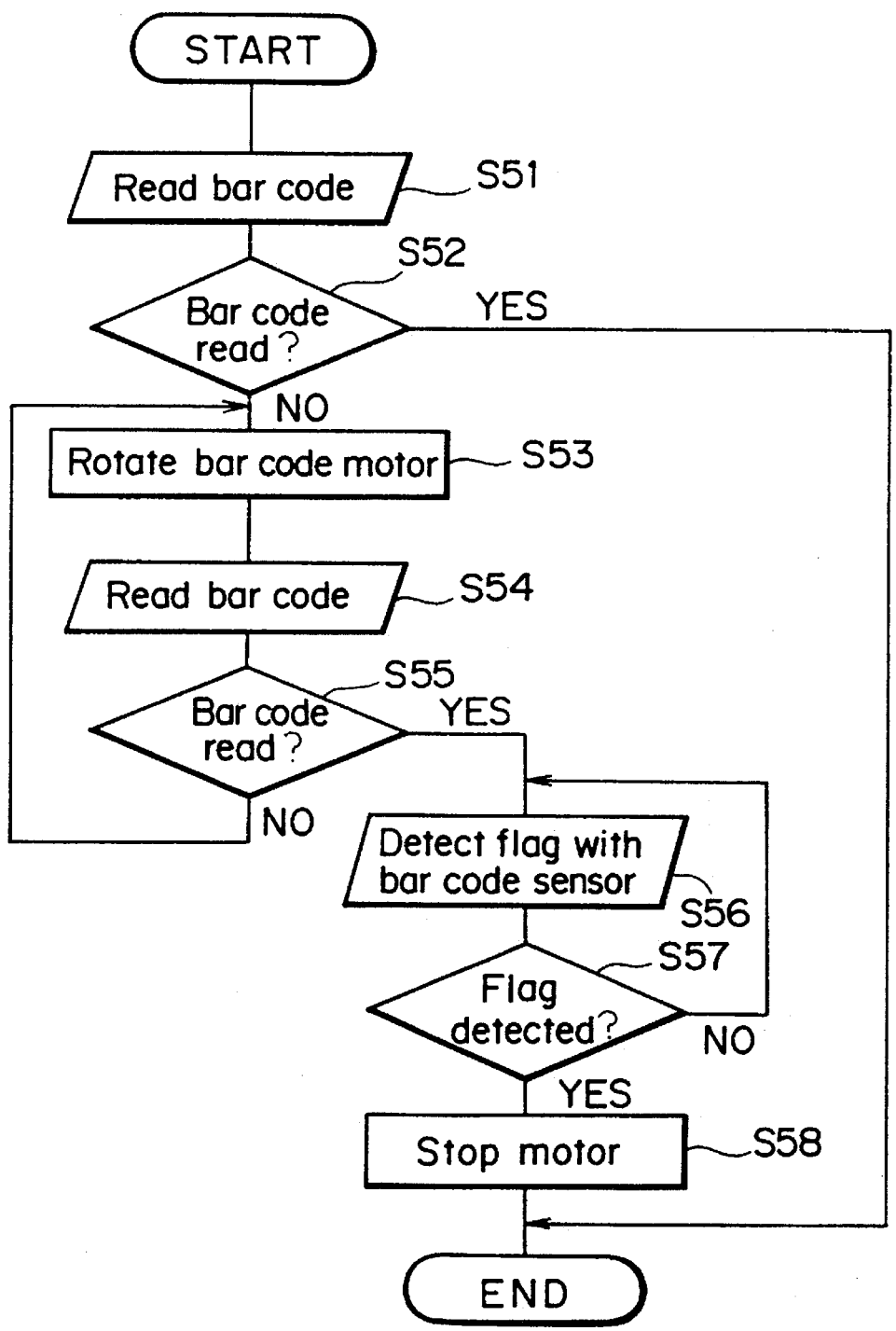
FIG. 60 is a flowchart of steps for controlling a motor that swings the bar code reader.
Figure 61:
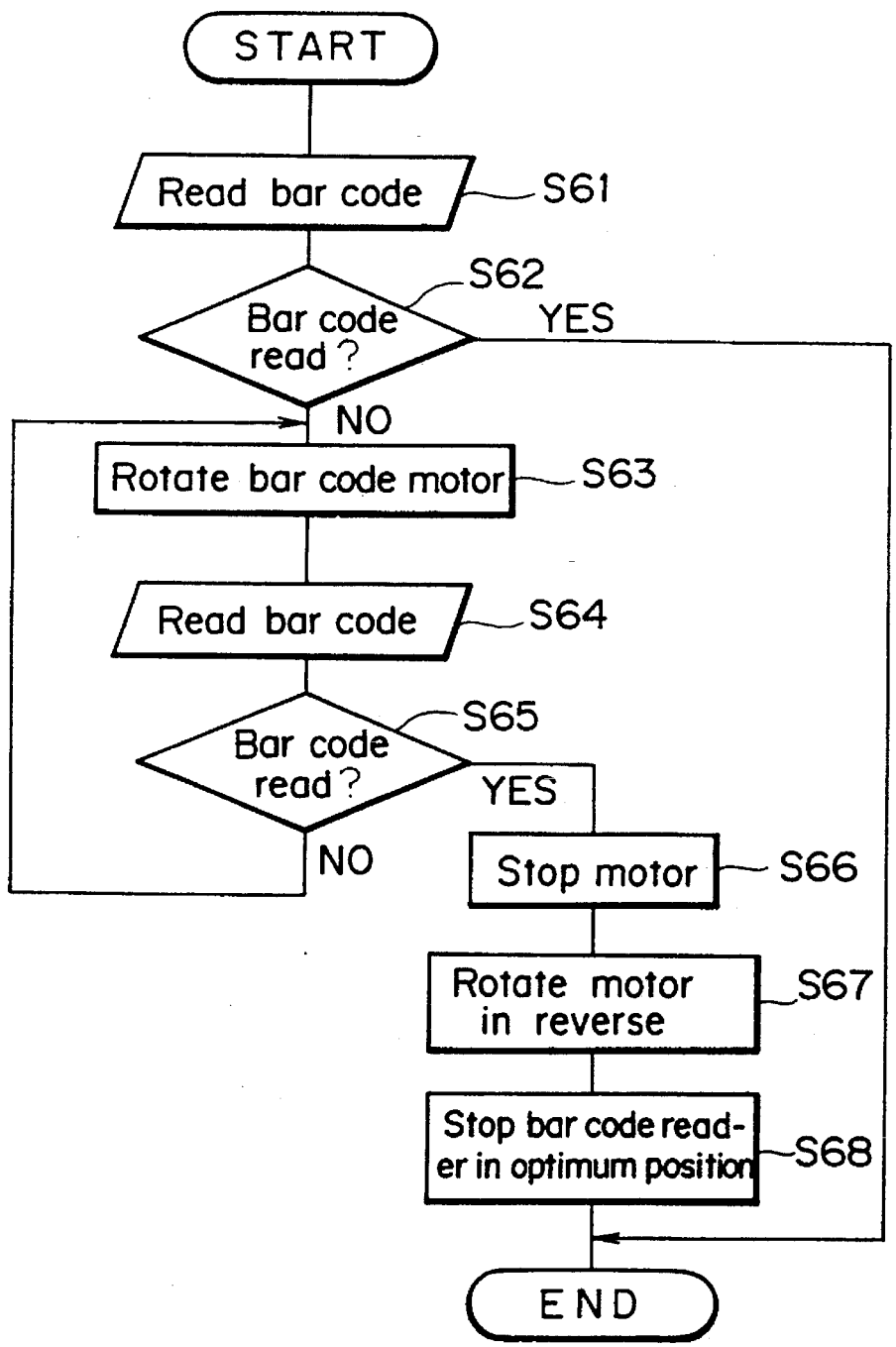
FIG. 61 is a flowchart of steps for controlling in an alternative manner the motor that swings the bar code reader.

Under the preceding bar code reading method of FIG. 60, the eccentric shaft 408 must always make one complete turn if the bar code reader 252 in its stopped position cannot read the bar code. By contrast, under the alternative bar code reading method of FIG. 61, the eccentric shaft 408 need not execute one complete revolution, with the bar code reader 252 stopped in its swing motion at the position where the bar code was read off the cartridge 30. The latter method improves the possibility of the bar code reader 252 being optimally positioned for further bar code reading. Thus the bar code reader 252 need not be rotated when reading the next bar code.

The fact that the bar code reader 252 is attached to the hand mechanism 26 offers the following advantages: Suppose that the door 10 (for direct cartridge entry and exit) is opened to let a large number of cartridges enter into a given cell column of the cell drum 12. In that case, the prior art magnetic tape library apparatus typically has the accessor take the cartridges one by one out of the cell column in question, gets the cartridge entry unit equipped with the bar code reader to read the bar code off each cartridge, and brings each cartridge back to the appropriate cell. According to the invention, the hand mechanism having the bar code reader 252 gains access directly to the cells of the column wherein the cartridges were switched, as in step S23 of FIG. 53. If the cell accessed contains a cartridge, the grip hand 25 draws the cartridge 30 into a predetermined position of the hand mechanism 26, and the bar code reader 252 reads the bar code off the cartridge 30.

Figure 53:
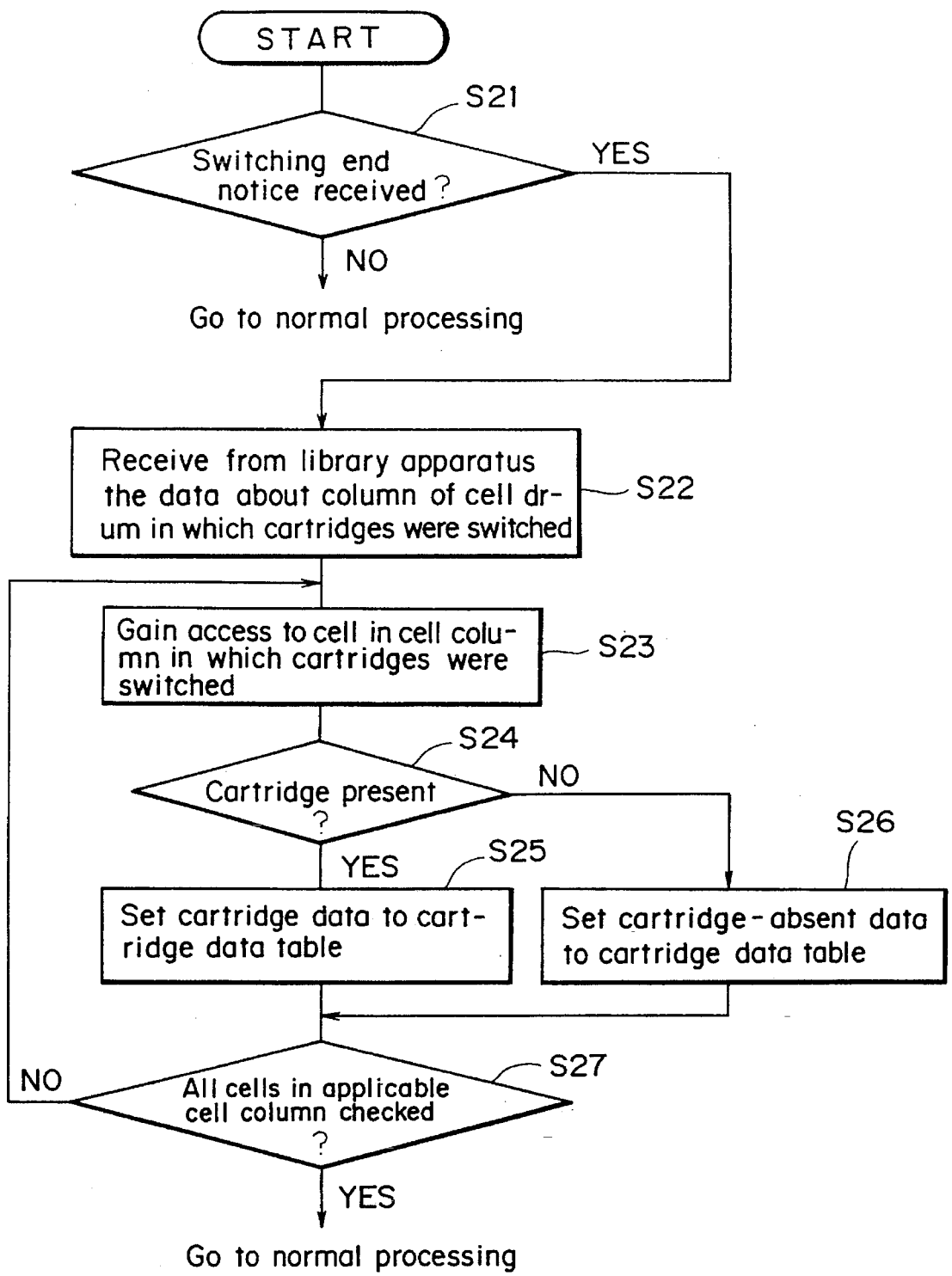
FIG. 53 is a flowchart of steps carried out by a host computer in switching cartridges.

The bar code data read by the bar code reader 252 off the cartridge 30 are written to the cartridge data table of the host computer 370, as in step S25 of FIG. 53. With its bar code read, the cartridge is brought back to the cell from which it was extracted earlier by the grip hand 25.

The baud rate and other settings for the bar code reader 252 are established by commands from the accessor controller 366. These settings are written to the nonvolatile memory inside the bar code reader 252. The baud rate of the bar code reader 252 needs to coincide with that of the accessor controller 366 for communication therewith. Illustratively, the initial baud rate for the two units is set to 9,600. The bar code reader 252 communicates with the accessor controller 366 at the baud rate of 9,600. In case the baud rate preset in the nonvolatile memory of the bar code reader 252 is lost due to electrical noise or other disturbances, the prior art bar code reader is incapable of having the accessor controller set the necessary baud rate for communication therebetween.

This problem is resolved by the automatic baud rate setting circuit of the bar code reader according to the invention. This baud rate setting circuit will now be described with reference to FIGS. 62 and 63. The accessor controller 366 comprises an MPU 372, a baud rate varying circuit 422 and an interface 382. The bar code reader 252 comprises an interface 424, a decoding control circuit 426 for decoding bar codes, and a laser emission/reception circuit 428. The bar code reader 252 further includes a nonvolatile memory 432 for storing baud rates and other settings, a baud rate write control circuit 430, and a baud rate setting circuit 434 for setting the baud rate for the interface 424 in accordance with the baud rate in the nonvolatile memory 432.

Figure 63:
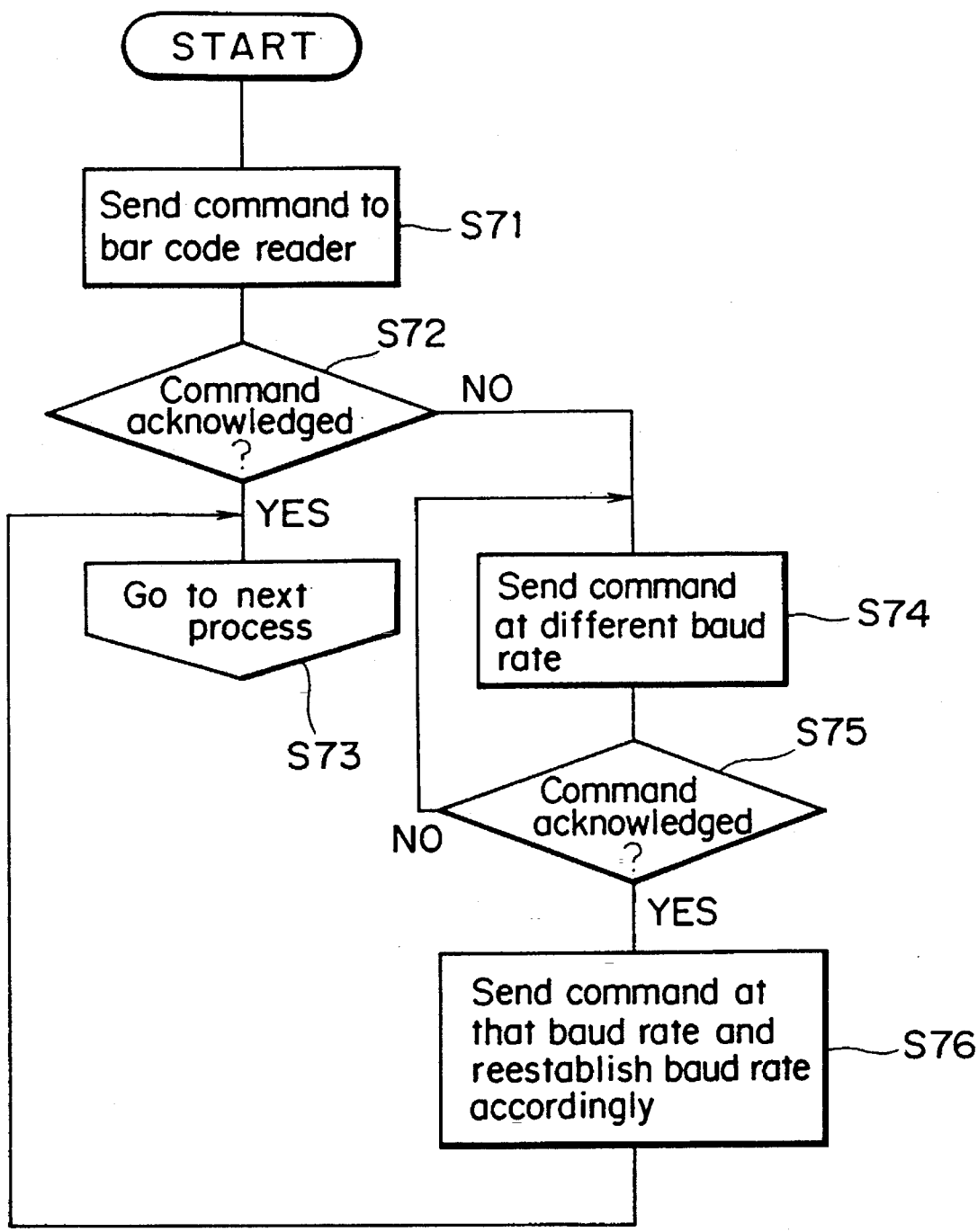
FIG. 63 is a flowchart of steps for automatically setting a baud rate for the bar code reader.

Described below with reference to the flowchart of FIG. 63 is how to reestablish the desired baud rate that has been lost from the nonvolatile memory 432 of the bar code reader 252. In step S71, the accessor controller 366 transmits a communication command at a baud rate of 9,600 to the bar code reader 252. In step S72, a check is made to see if the bar code reader 252 has acknowledged the command. If the command is acknowledged, the processing is judged to be normal and control is passed on to the next process. If the command is not acknowledged in step S72, step S74 is reached. In step S74, communication commands are transmitted at different baud rates such as 300, 600, etc. The baud rate is varied in step S74 until the command is acknowledged by the bar code reader 252 in step S75. For example, if the command is acknowledged at a baud rate of 4,800, a baud rate setting command at the baud rate of 4,800 is issued to set the baud rate in the nonvolatile memory 432 to 9,600.

Figure 62:
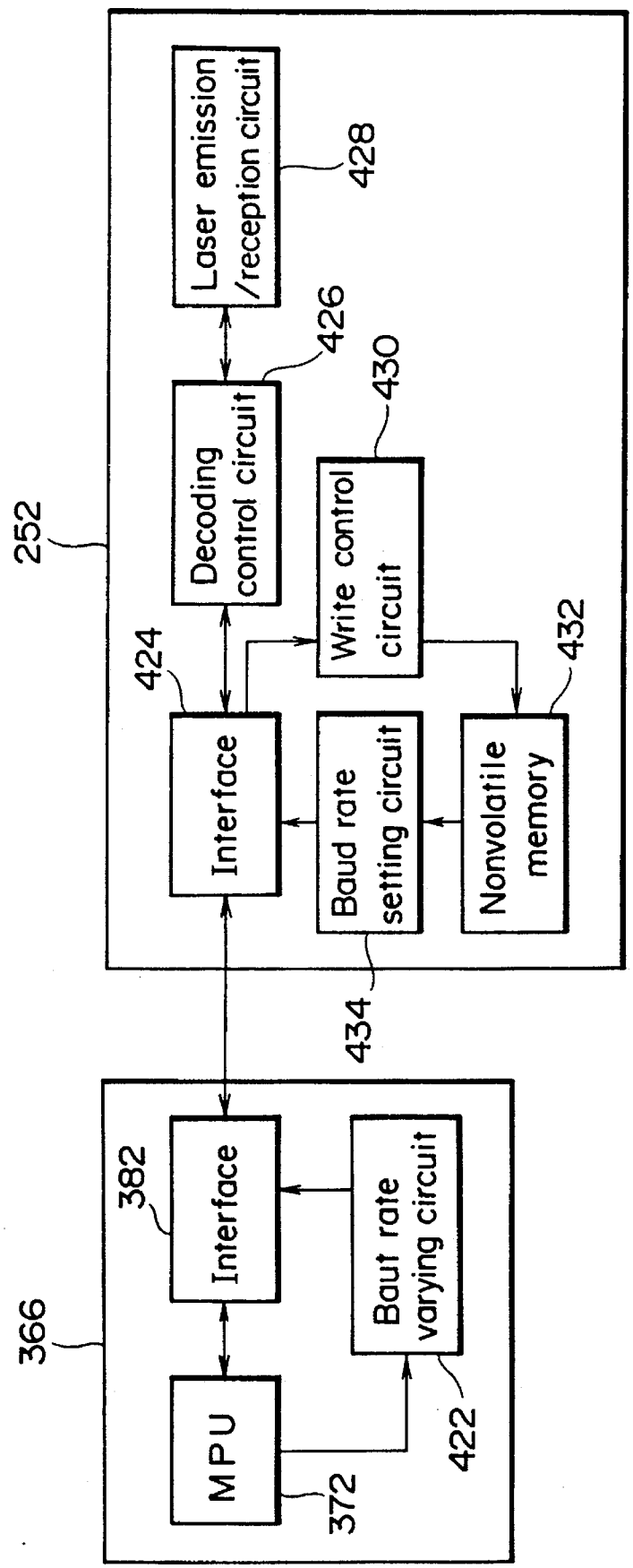
FIG. 62 is a block diagram of an automatic baud rate setting circuit of the bar code reader.

More specifically, in the setup of FIG. 62, the accessor controller 366 sends to the bar code reader 252 at the baud rate of 4,800 the command telling the latter to set its baud rate to 9,600. The command is input to the write control circuit 430 via the interface 424. In turn, the write control circuit 430 writes the baud rate of 9,600 to the nonvolatile memory 432. With the baud rate of 9,600 written in the nonvolatile memory 432, the baud rate setting circuit 434 reads that baud rate and sets the baud rate of the interface 424 to 9,600 accordingly. Now that the baud rate of the interface 424 is set for the desired baud rate of 9,600, the bar code reader 252 can communicate with the accessor controller 366 at that baud rate.

Although the description above contains many specificities, these should not be construed as limiting the scope of the invention but as merely providing illustrations of some of the presently preferred embodiments of this invention. For example, the invention applies not only to the above-described magnetic tape library apparatus handling magnetic tape cartridges but also to other library apparatuses dealing with general recording medium cartridges including optical disc cartridges.

Thus the scope of the invention should be determined by the appended claims and their legal equivalents, rather than by the examples given.

What is claimed is:

1. A library apparatus comprising:

a housing;

a cell unit having a plurality of cell columns each including a plurality of cells, each cell for accommodating a recording medium cartridge having a bar code attached thereto;

a recording medium drive unit for writing and reading data to and from a recording medium cartridge;

a cartridge entry unit for entering recording medium cartridges into said library apparatus;

a cartridge exit unit for ejecting recording medium cartridges from inside said library apparatus;

an accessor for transporting cartridges between said cell unit, said recording medium drive unit, said cartridge entry unit and said automatic cartridge exit unit, said accessor including a hand mechanism for gripping a cartridge in a substantially horizontal manner, said hand mechanism including a base attached swingingly about a vertical axis, and grip means for gripping the recording medium cartridge at opposite side surfaces thereof, said grip means being movably mounted on said base between an advanced position and a retracted position and being swingable about a vertical axis;

a bar code reader attached to said hand mechanism for reading the bar code off each recording medium cartridge, said bar code reader reading the bar code off the recording medium cartridge at a first horizontally rotated position after said grip means gripping the cartridge has moved to said retracted position;

swing means for rotating said bar code reader about a horizontal axis; and control means for activating said swing means to controlledly rotate said bar code reader about said horizontal axis; and for controlling said bar code reader to read the bar code off the recording medium again at a second and different horizontally rotated position when a first try of reading the bar code has failed at said first horizontally rotated position.

2. A library apparatus according to claim 1, further comprising a door for allowing a large number of recording medium cartridges to enter all at once into the cells of a given cell column of said cell unit, said door being attached pivotably to said housing adjacent to said cell unit.

3. A library apparatus according to claim 1 wherein:

said control means automatically activates said swing means to continue controlled rotation of said bar code reader about said horizontal axis to effect bar code reading at additional horizontally rotated positions when previous attempts at reading the bar code have failed.

4. A library apparatus comprising:

a housing;

a cell unit having a plurality of cell columns each including a plurality of cells, each cell accommodating a recording medium cartridge having a bar code attached thereto;

a recording medium drive unit for writing and reading data to and from a recording medium cartridge;

a cartridge entry unit for entering recording medium cartridges into said library apparatus;

an automatic cartridge exit unit for automatically ejecting recording medium cartridges from inside said library apparatus;

an accessor for transporting cartridges through said cell unit, said recording medium drive unit, said cartridge entry unit and said automatic cartridge exit unit, said accessor including a hand mechanism for gripping a cartridge in a substantially horizontal manner;

a door for allowing a large number of recording medium cartridges to enter all at once into the cells of a given cell column of said cell unit, said door being attached pivotably to said housing adjacent to said cell unit;

a base attached swingingly about a vertical axis; and grip means for gripping the recording medium cartridge movably mounted on said base between an advanced position and a retracted position, said grip means being swung about a horizontal axis; and swing means for swinging said bar code reader about a horizontal axis; wherein said bar code reader reads the bar code off the recording medium cartridge after said grip means gripping the cartridge has moved to said retracted position; and said swing means comprises
support means fixedly secured to said base for supporting said bar code reader swingingably;
an arm fixedly secured at one end to said bar code reader, said arm having at the other end thereof an oblong hole formed vertically therein;
a driving motor having an output shaft;
an eccentric shaft fixed eccentrically to the output shaft of said driving motor; and
a member fixedly secured at one end to said eccentric shaft and having the other end inserted in the oblong hole of said arm.

5. A library apparatus according to claim 4, wherein said swing means further comprises sensor means for detecting one complete turn of said eccentric shaft.

6. Library apparatus according to claim 5, wherein said bar code reader reads the bar code off each recording medium cartridge when said sensor means detects one complete turn of said eccentric shaft rotated by said swing means.

7. A library apparatus according to claim 5, wherein said bar code reader reads the bar code off each recording medium cartridge while being swung by said swing means, said motor is stopped in response to a braking instruction generated upon completion of the bar code reading, and then said motor is rotated in reverse for a predetermined time.

8. A library apparatus comprising:

a housing;

a cell unit having a plurality of cell columns each including a plurality of cells, each cell for accommodating a recording medium cartridge having a bar code attached thereto;

a recording medium drive unit for writing and reading data to and from a recording medium cartridge;

a cartridge entry unit for entering recording medium cartridges into said library apparatus;

a cartridge exit unit for ejecting recording medium cartridges from inside said library apparatus;

an accessor for transporting cartridges between said cell unit, said recording medium drive unit, said cartridge entry unit and said cartridge exit unit, said accessor including a hand mechanism for gripping a cartridge in a substantially horizontal manner;

a bar code reader attached to said hand mechanism for reading the bar code off each recording medium cartridge, said bar code reader being rotatable to a second and different horizontally rotated position when a first try of reading the bar code has failed at a first horizontally rotated position; and accessor control means for controlling said accessor, said accessor control means including baud rate varying means for varying a baud rate to establish a data communication baud rate;

said bar code reader comprising a nonvolatile memory for storing baud rates, write control means for writing to said nonvolatile memory a desired baud rate relevant to the data communication with said accessor control means in accordance with commands therefrom, said baud rate varying means transmitting different baud rates to said bar code reader until compatible data communication is established, said write control means using said established baud rate to write said desired baud rate to said nonvolatile memory, and baud rate setting means for setting said bar code reader at said desired baud rate written in said nonvolatile memory.

9. A library apparatus according to claim 8, further comprising a door for allowing a large number of recording medium cartridges to enter all at once into the cells of a given cell column of said cell unit, said door being attached pivotably to said housing adjacent to said cell unit.

10. A library apparatus comprising:

a housing;

a cell unit having a plurality of cell columns each including a plurality of cells, each cell for accommodating a recording medium cartridge having a bar code attached thereto;

a recording medium drive unit for writing and reading data to and from a recording medium cartridge;

a cartridge entry unit for entering recording medium cartridges into said library apparatus;

an automatic cartridge exit unit for automatically ejecting recording medium cartridges from inside said library apparatus;

an accessor for transporting cartridges between said cell unit, said recording medium drive unit, said cartridge entry unit and said automatic cartridge exit unit, said accessor including a hand mechanism for gripping a cartridge in a substantially horizontal manner, said hand mechanism including a base attached swingingly about a vertical axis, a pair of fingers each having a gripping end for gripping the recording medium cartridge at opposite side surfaces thereof, said fingers being movably mounted on said base between an advanced position and a retracted position and being swingable about a vertical axis, each of said fingers having a pushing end for pushing the recording medium cartridge into the cell when the recording medium cartridge is inserted into the cell by said accessor, and a tray movably mounted on said base between an advanced position and a retracted position, said tray supporting the recording medium cartridge when the recording medium cartridge is gripped by said fingers;

a bar code reader attached to said hand mechanism for reading the bar code off each recording medium cartridge, said bar code reader reading the bar code off the recording medium cartridge after said grip means gripping the cartridge has moved to said retracted position; and swing means for rotating said bar code reader about a horizontal axis, said swing means rotating said bar code reader to a second and different horizontally rotated position when a first try of reading the bar code has failed at a first horizontally rotated position.

11. A library apparatus comprising:

a housing;

a cell unit having a plurality of cell columns each including a plurality of cells, each cell for accommodating a recording medium cartridge having a bar code attached thereto;

a recording medium drive unit for writing and reading data to and from a recording medium cartridge;

a door for allowing a large number of recording medium cartridges to enter all at once into the cells of a given cell column of said cell unit, said door being attached pivotably to said housing adjacent to said cell unit;

an accessor for transporting cartridges between said cell unit and said recording medium drive unit, said accessor including a hand mechanism for gripping a cartridge in a substantially horizontal manner, said hand mechanism including a base attached swingingly about a vertical axis, and grip means for gripping the recording medium cartridge at opposite side surfaces thereof, said grip means being movably mounted on said base between an advanced position and a retracted position and being swingable about a vertical axis;

a bar code reader attached to said hand mechanism for reading the bar code off each recording medium cartridge, said bar code reader reading the bar code off the recording medium cartridge at a first horizontally rotated position after said grip means gripping the cartridge has move to said retracted position;

swing means for swinging said bar code reader about a horizontal axis; and control means for activating said swing means to controlledly rotate said bar code reader about said horizontal axis; and for controlling said bar code reader to read the bar code off the recording medium again at a second and different horizontally rotated position when a first try of reading the bar code has failed at said first horizontally rotated position.

12. A library apparatus according to claim 11, wherein said swing means further comprises sensor means for detecting an amount of rotational movement of said swing means.

13. A library apparatus according to claim 12, wherein said bar code reader reads the bar code off each recording medium cartridge when said sensor means detects a predetermined rotational amount of said swing means.

14. A library apparatus comprising:

a housing;

a cell unit having a plurality of cell columns each including a plurality of cells, each cell for accommodating a recording medium cartridge having a bar code attached thereto;

a recording medium drive unit for writing and reading data to and from a recording medium cartridge;

a door for allowing a large number of recording medium cartridges to enter all at once into the cells of a given cell column of said cell unit, said door being attached pivotably to said housing adjacent to said cell unit;

an accessor for transporting cartridges between said cell unit and said recording medium drive unit, said accessor including a hand mechanism for gripping a cartridge in a substantially horizontal manner, a bar code reader attached to said hand mechanism for reading the bar code off each recording medium cartridge said bar code reader being rotatable to a second and different horizontally rotated position when a first try of reading the bar code has failed at a horizontally rotated position, and accessor control means for controlling said accessor, said accessor control means including baud rate varying means varying a baud rate to establish a communication baud rate;

said bar code reader comprising a nonvolatile memory for storing baud rates, write control means for writing to said nonvolatile memory a desired baud rate for communication with said accessor control means in accordance with commands therefrom, said baud rate varying means transmitting different baud rates to said bar code reader unit communication is established, said write control means using said established communication baud rate to write said desired baud rate to said nonvolatile memory, and baud rate setting means for setting said bar code reader at said desired baud rate written in said nonvolatile memory.

15. A library apparatus according to claim 14, further comprising:

swing means for swinging said bar code reader about a horizontal axis.

16. A library apparatus comprising:

a housing;

a cell unit having a plurality of cell columns each including a plurality of cells, each cell accommodating a recording medium cartridge having a bar code attached thereto;

a recording medium drive unit for writing and reading data to and from a recording medium cartridge;

a cartridge entry unit for entering recording medium cartridges into said library apparatus;

a cartridge exit unit for ejecting recording medium cartridges from inside said library apparatus;

an accessor for transporting cartridges through said cell unit, said recording medium drive unit, said cartridge entry unit and said automatic cartridge exit unit, said accessor including a hand mechanism for gripping a cartridge in a substantially horizontal manner, said hand mechanism including a base attached swingingly about a vertical axis, and grip means for gripping the recording medium cartridge at opposite side surfaces thereof, said grip means being movably mounted on said base between an advanced position and a retracted position and being swingable about a vertical axis;

a bar code reader attached to said hand mechanism for reading the bar code off each recording medium cartridge, said bar code reader reading the bar code off the recording medium cartridge at a first horizontally rotated position after said grip means gripping the cartridge has moved to said retracted position;

swing means for rotating said bar code reader about a horizontal axis to a second and different horizontally rotated position when a first try of reading the bar code has failed at a first horizontally rotated position; and control means for activating said swing means to controlledly rotate said bar code reader about said horizontal axis.

* * * * *

UNITED STATES PATENT AND TRADEMARK OFFICE
CERTIFICATE OF CORRECTION

PATENT NO. : 5,581,522
DATED : December 3, 1996
INVENTOR(S) : Sibuya et al.

It is certified that error appears in the above-indentified patent and that said Letters Patent is hereby corrected as shown below:

On the Title Page:

Under "[56] References Cited" for "Foreign Patent Documents" insert --1-311491, 12/1989, Japan; 2-278327, 11/1990, Japan; 3-162763, 7/1991, Japan; 3-259451, 11/1991, Japan; 3-2360951, 11/1991, Japan; 4-195484, 7/1992, Japan; 3-121547, 12/1991, Japan--.

UNITED STATES PATENT AND TRADEMARK OFFICE
CERTIFICATE OF CORRECTION

PATENT NO. : 5,581,522
DATED : December 3, 1996
INVENTOR(S) : Sibuya et al.

It is certified that error appears in the above-indentified patent and that said Letters Patent is hereby corrected as shown below:

Column 4, line 5, delete "FIG. A" and insert --FIG. 16A--.

Column 5, line 24, delete "and".

Column 5, line 25, delete "coder" and insert --code--.

Column 29, line 36, after "has failed at a", insert --first--.

Signed and Sealed this

Fourth Day of November, 1997

Attest:

Attesting Officer

BRUCE LEHMAN
Commissioner of Patents and Trademarks